United States Patent [19]

Krinock

[11] Patent Number: 4,516,269

[45] Date of Patent: May 7, 1985

[54] AUTOMATIC EQUALIZATION FOR A SIMULCAST COMMUNICATION SYSTEM

[75] Inventor: Jerome V. Krinock, Detroit, Mich.

[73] Assignee: Michigan Consolidated Gas Company, Detroit, Mich.

[21] Appl. No.: 448,830

[22] Filed: Dec. 10, 1982

[51] Int. Cl.$^3$ .................... H04B 3/50; H04B 1/62; H04B 3/04; H04B 17/02
[52] U.S. Cl. ............................. 455/51; 179/2 EB; 375/13; 455/35; 455/56; 455/67
[58] Field of Search ............... 455/31, 35, 50, 51, 455/52, 53, 56, 63, 69-71, 67, 33; 375/13; 179/2 EB, 2 E

[56] References Cited

U.S. PATENT DOCUMENTS

| | | |
|---|---|---|
| 1,711,560 | 5/1929 | Espenschied et al. |
| 2,033,271 | 3/1936 | Aiken . |
| 2,094,113 | 9/1937 | Affel . |
| 4,047,009 | 9/1977 | Challen . |
| 4,223,405 | 9/1980 | Hattori et al. ............ 455/105 |
| 4,255,814 | 3/1981 | Osborn .................... 455/51 |
| 4,301,539 | 11/1981 | Kage ..................... 455/51 |

OTHER PUBLICATIONS

Jerome V. Krinock, "Automatic Equalization for Simulcasting", May 23, 1982.
G. D. Gray, "The Simulcasting Technique: An Approach to Total-Area Radio Coverage," *TEEE Tr. Veh. Tech.*, vol. 28, p. 117, May 1979.
S. Thro, "System Configurations for Wide Area Trunking," *Mobile Times*, p. 22, Jul. 1981.
M. Henze, J. D. Parsons, P. A. Ratliff, M. J. Withers, "Diversity Techniques for Mobile Radio Reception," *IEEE Tr. Veh. Tech.*, vol. 24, p. 75, 8-76.
D. S. Dewire, "Prec. Carrier Freq. Cont. & Mod. Phase Equal. of Base Trans. in a Mobile Radio System.," *IRE Tr. Veh. Comm.*, vol. 9, p. 54, May 1960.
R. E. Langseth, "Some Effects of Delay and Mod.-Index Mismatch on Cochannel FM Interference," *IEEE Tr. Veh. Tech.*, vol. 20, p. 124, Nov. 1971.

A. V. Oppenheim, R. W. Schafer, Digital Signal Processing, Prentice-Hall, Englewood Cliffs, N.J., 1975.
R. B. Blake, et al., "Voice-Frequency Transmission for Special-Service Telephone Circuits," *Bell Sys. Tech. J.*, vol. 60, p. 1585, Sep. 1981.
American Microsystems, Inc., "S2811 Signal Processing Peripheral Advanced Product Description," Santa Clara, CA, Sep. 1981.
R. W. Lucky, H. R. Rudin, "Generalized Automatic Equalization for Communication Channels," *Proc. IEEE*, vol. 54, p. 439, Mar. 1966.
B. Widrow, et al., "Stationary and Nonstationary Learning Characteristics of the LMS Adaptive Filter," *Proc. IEEE*, vol. 63, p. 1151, 4/1975, Sec. II-IV.
M. Destino, J. McCool, B. Widrow, "Adaptive Filtering in the Frequency Domain," *Proc. IEEE*, vol. 66, p. 1658, Dec. 1978.
E. R. Ferrara, "Fast Implementation of LMS Adaptive Filtering," *IEEE Tr. Acous., Speech Sig. Proc.*, vol. 28, p. 474, Aug. 1980.

(List continued on next page.)

Primary Examiner—Marc E. Bookbinder
Attorney, Agent, or Firm—Harness, Dickey & Pierce

[57] ABSTRACT

A simulcast communication system for permitting the same audio signal to be simultaneously broadcasted from a plurality of base stations located remotely from a dispatch station used to transmit this audio signal to each of the base stations over conventional telephone lines is described. The simulcast communication system generally comprises first circuit means for equalizing the audio signal transmission characteristics from the dispatch station to each of the base stations in response to at least one test signal broadcasted from each of the base stations, and second circuit means for generating a synchronized squelch signal at each of the base stations in response to a pilot signal transmitted to each of the base stations with the audio signal and a phasing signal transmitted to each of the base stations at the beginning of the audio signal.

21 Claims, 21 Drawing Figures

OTHER PUBLICATIONS

S. C. Tanaka, R. R. Buss, G. P. Weckler, "The Tapped Analog Delay," *IEEE Tr. Parts, Hybrids Packag.*, vol. 12, Jun. 1976.

A. P. Clark, *Advanced Data Transmission Systems*, J. Wiley, N.Y., 1977, pp. 46–73.

C. M. Rader, "FOUREA-A Short Demonstration of the FF1," in *Programs for Digital Signal Processing*, IEEE Press, New York, 1979.

H. L. Van Trees, *Detection, Estimation and Modulation Theory*, J. Wiley, New York, 1968, Eq. (146), p. 59.

D. T. L. Lee, et al., "Recursive Least Squares Ladder Estimation Algorithms", *IEEE Tr. Acous., Speech Sign. Proc.*, vol. 29, p. 627, Jun. 1981.

M. S. Corrington, "Frequency Modulation Distortion Caused by Common-and Adjacent-Channel Interference, " *RCA Rev.*, vol. 7, p. 522, Dec. 1946.

A. Wouk, A Course of Applied Functional Analysis, J. Wiley, New York, 1979, p. 238.

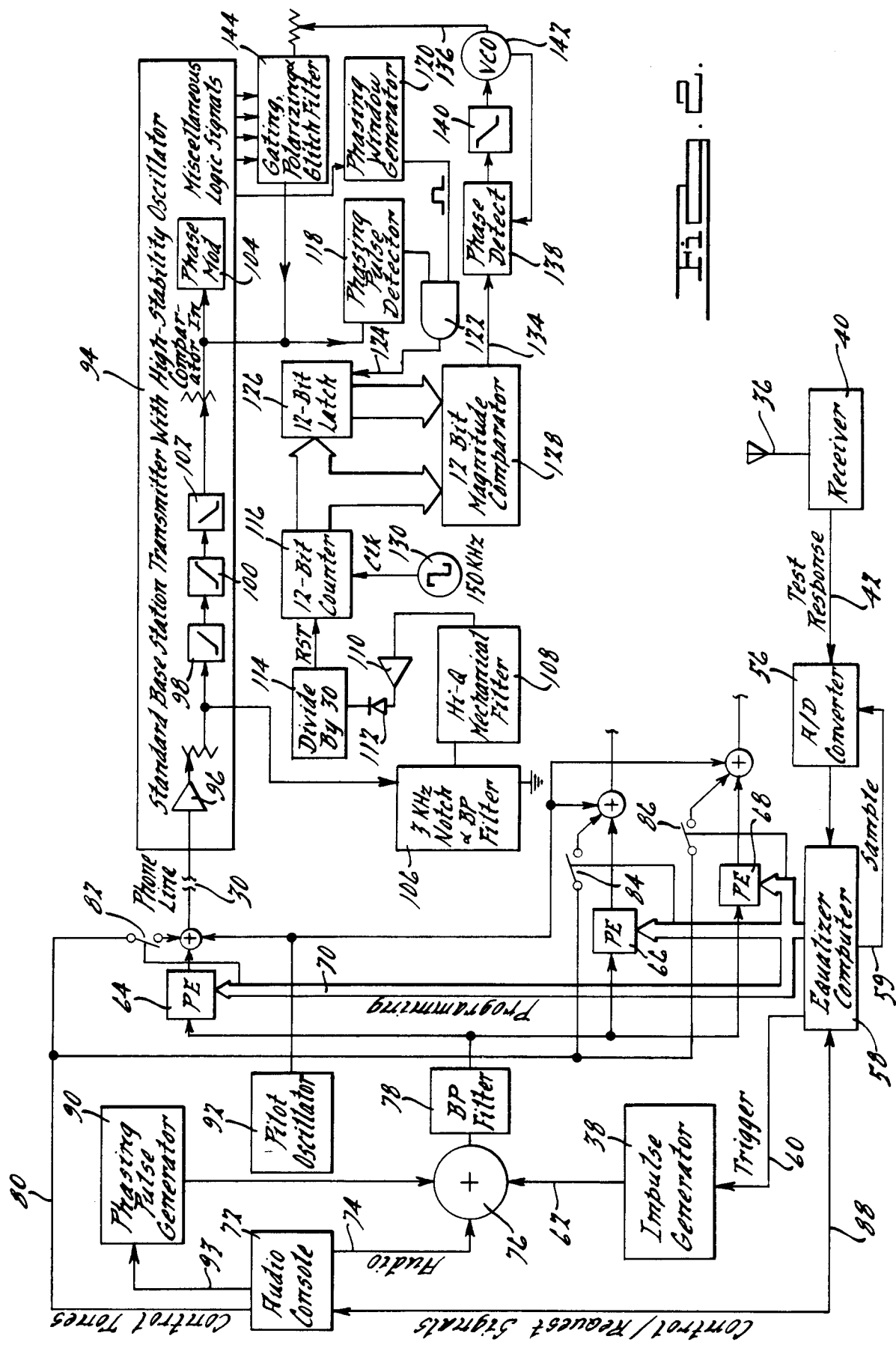

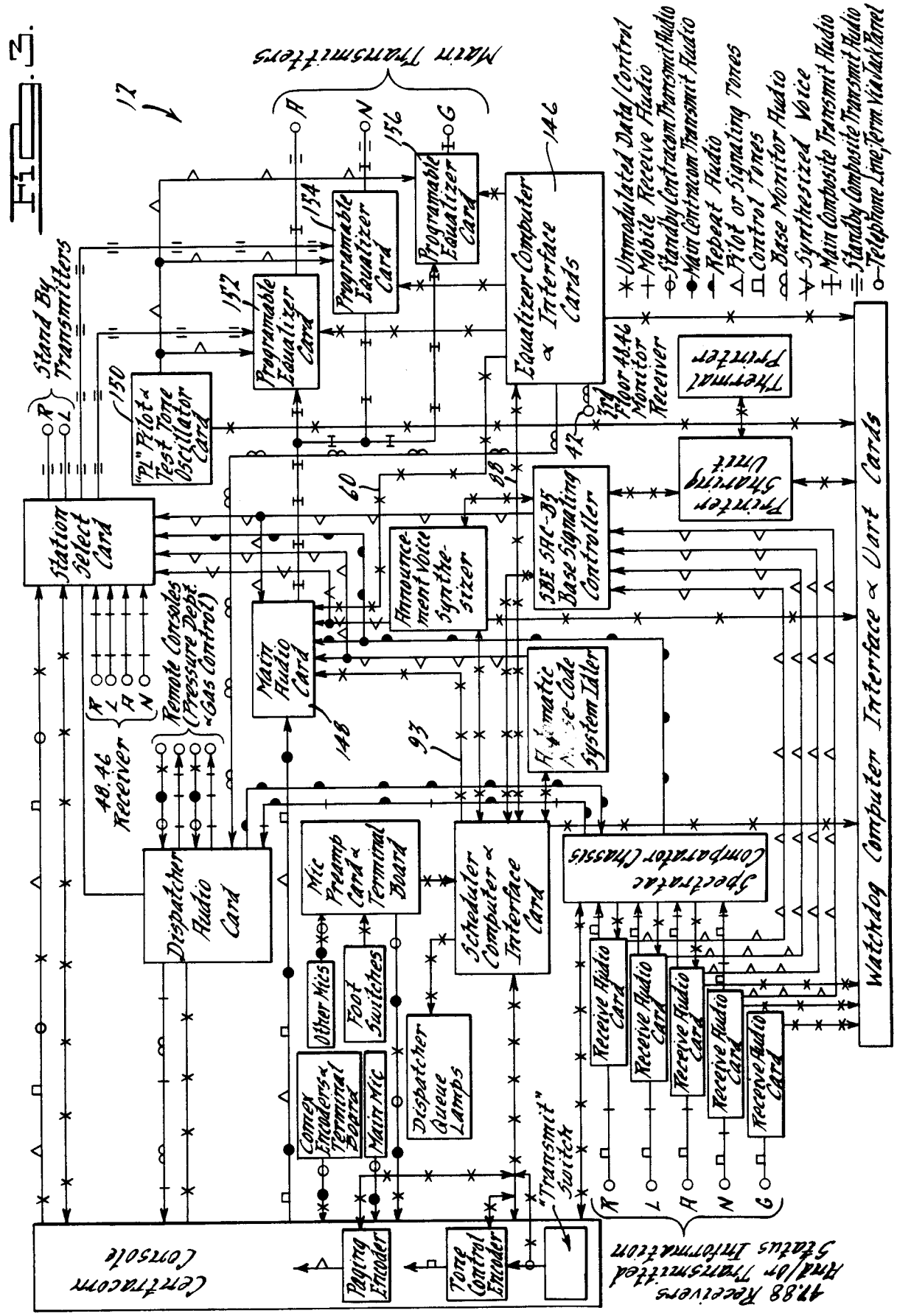

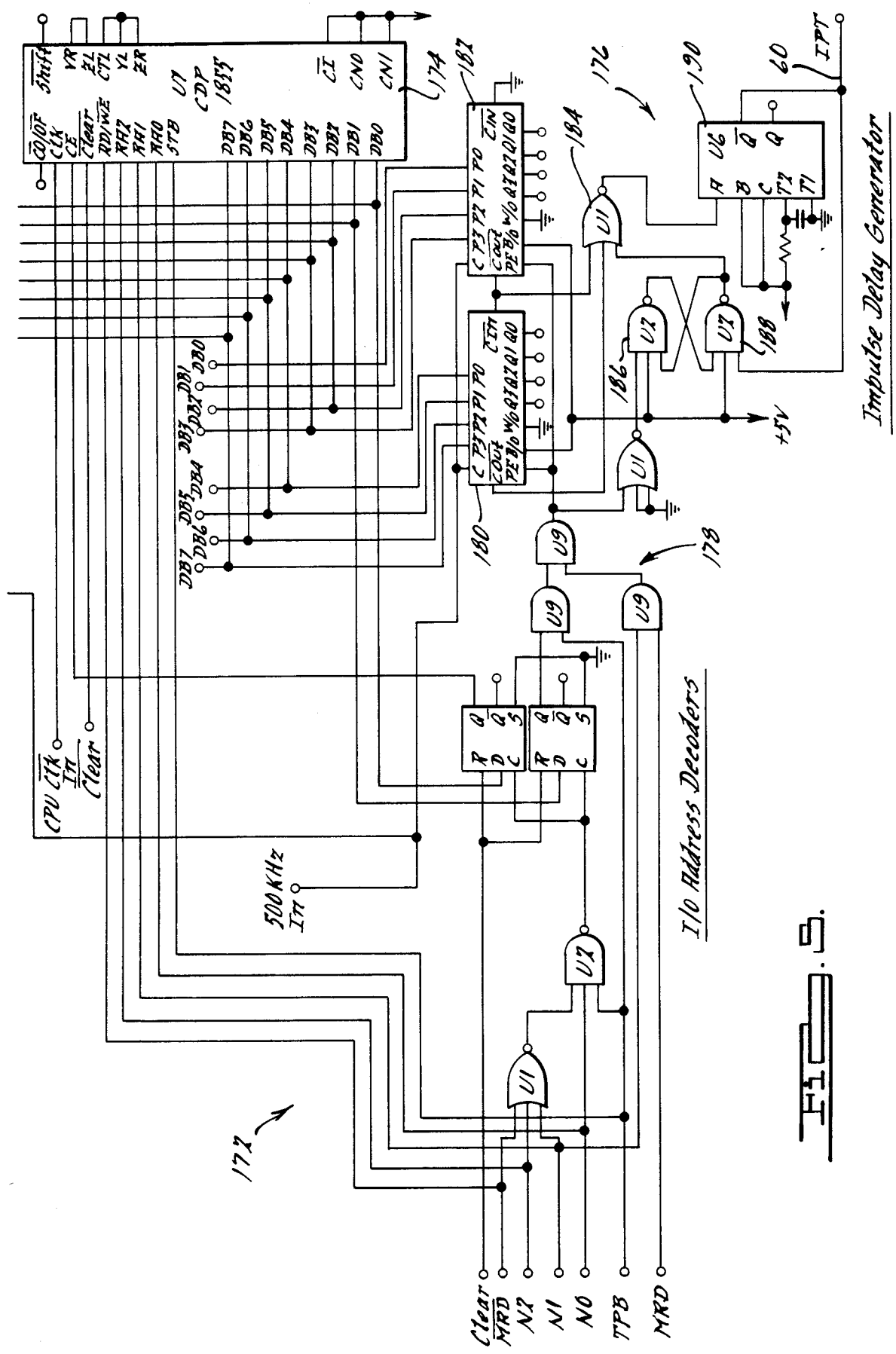

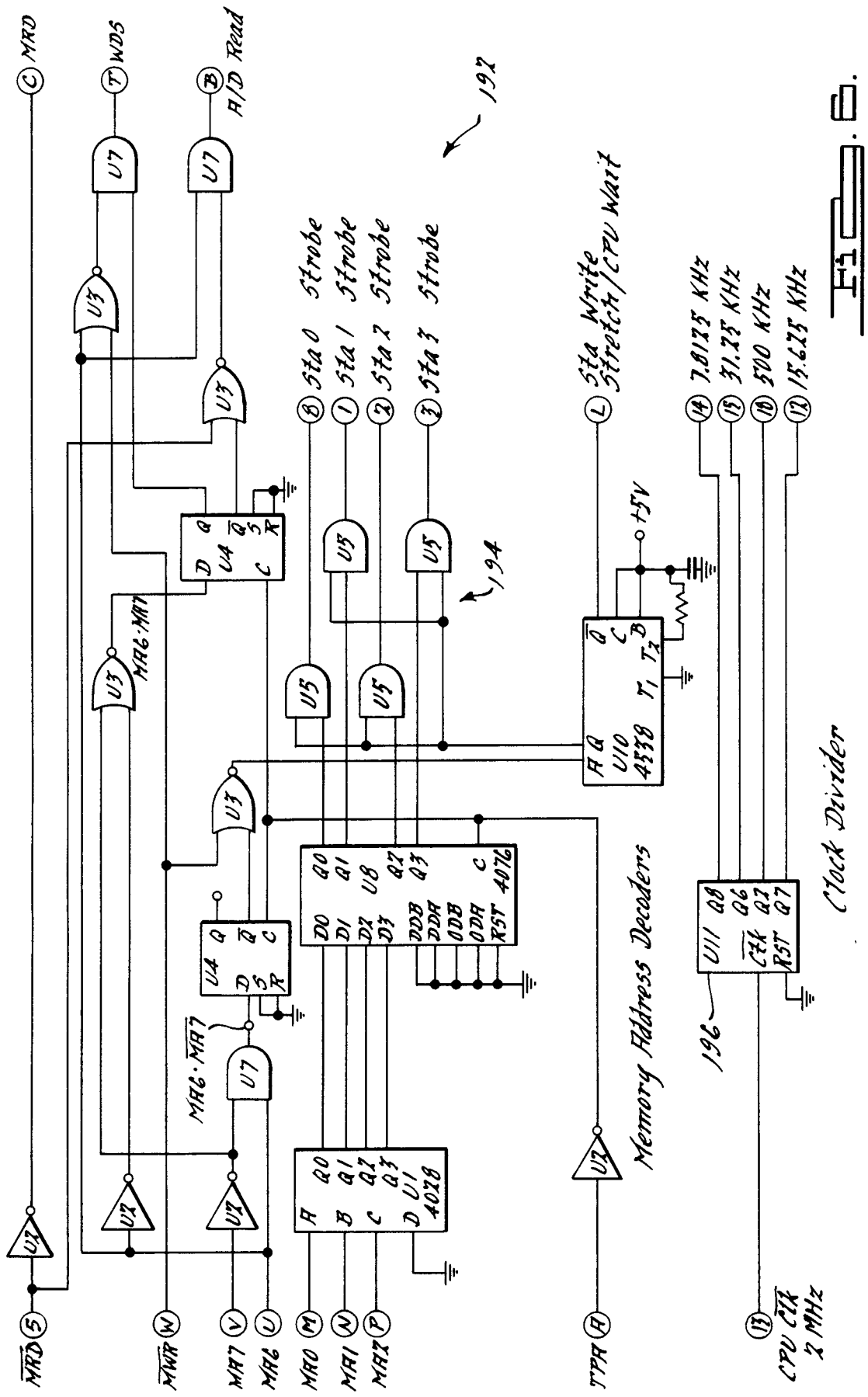

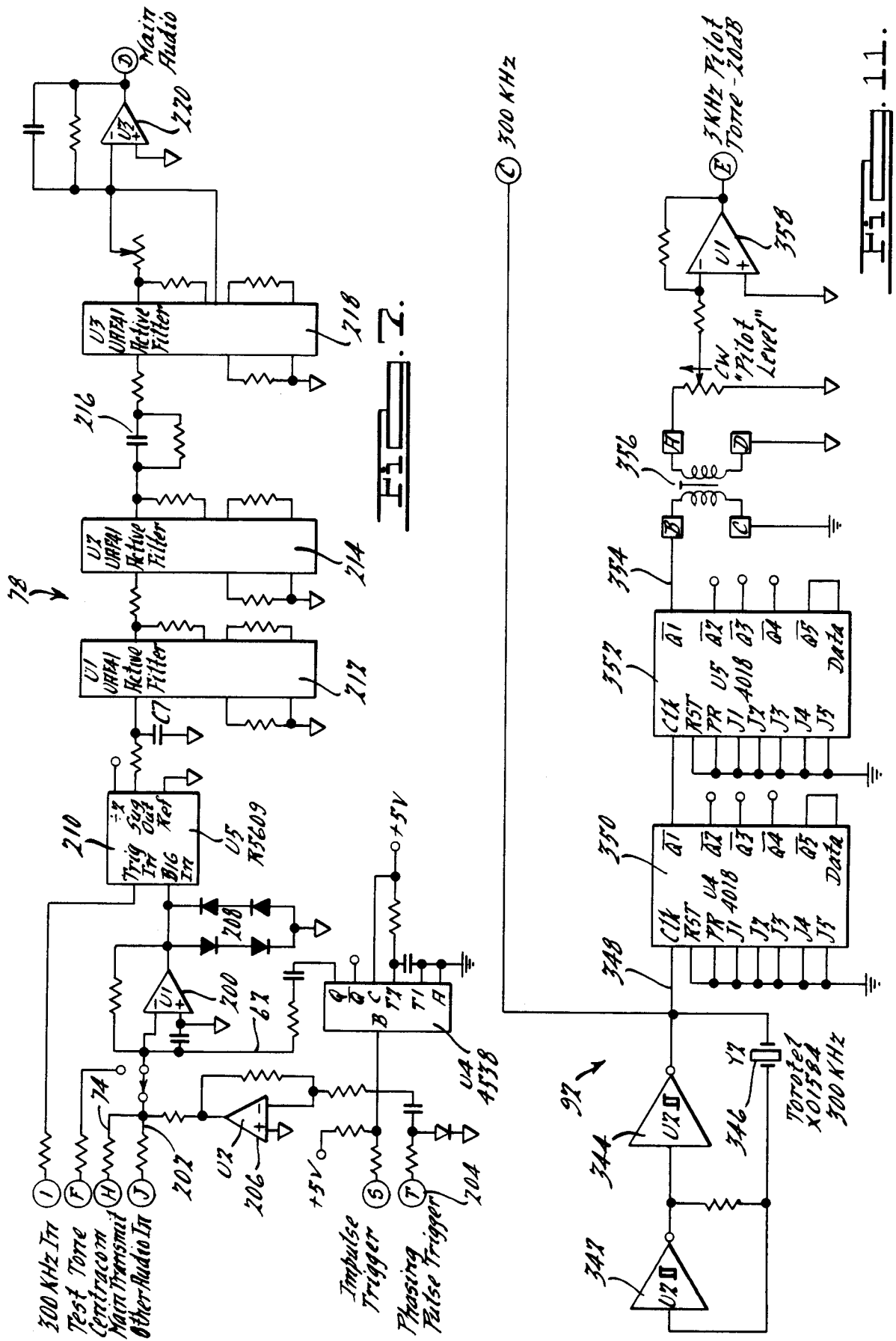

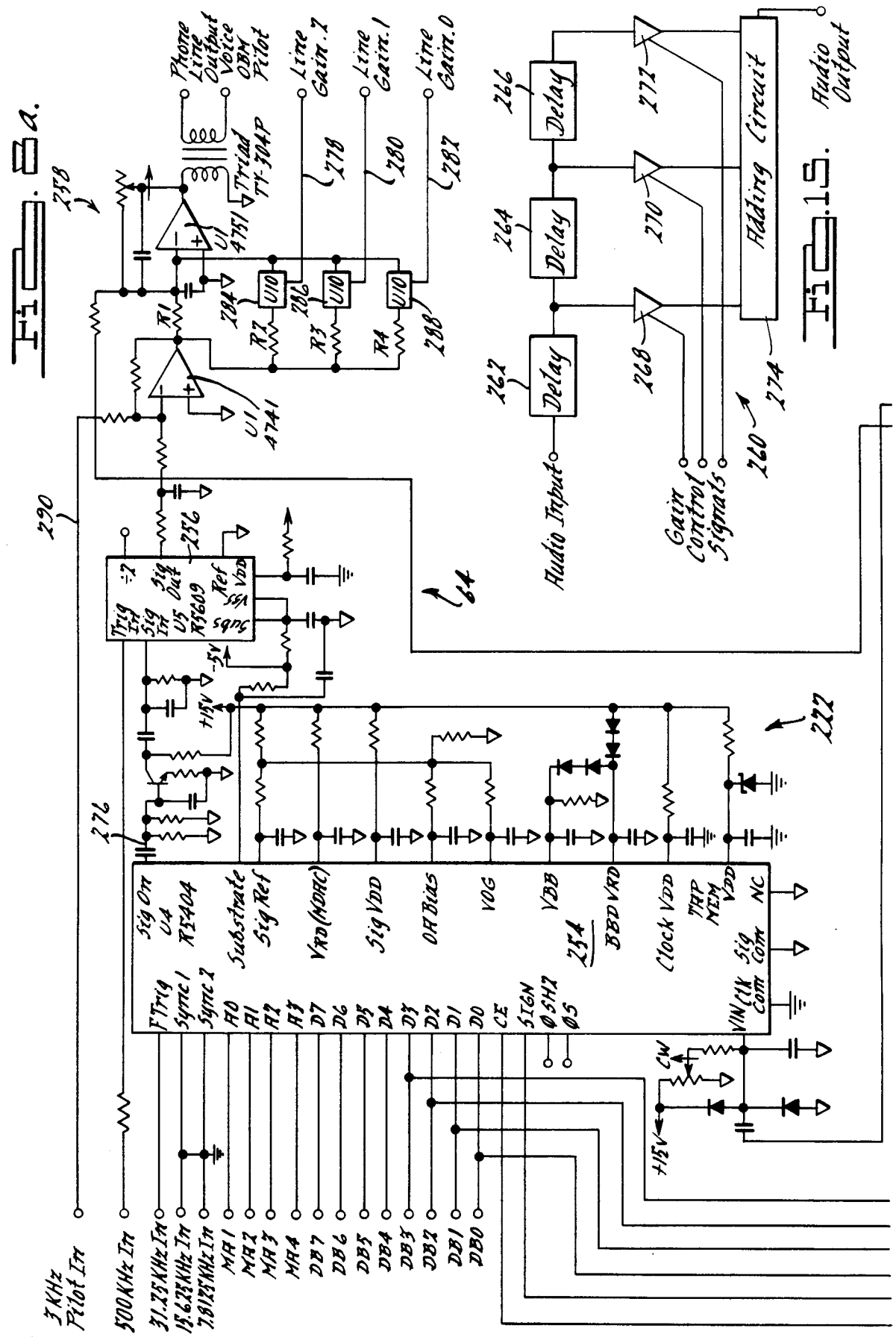

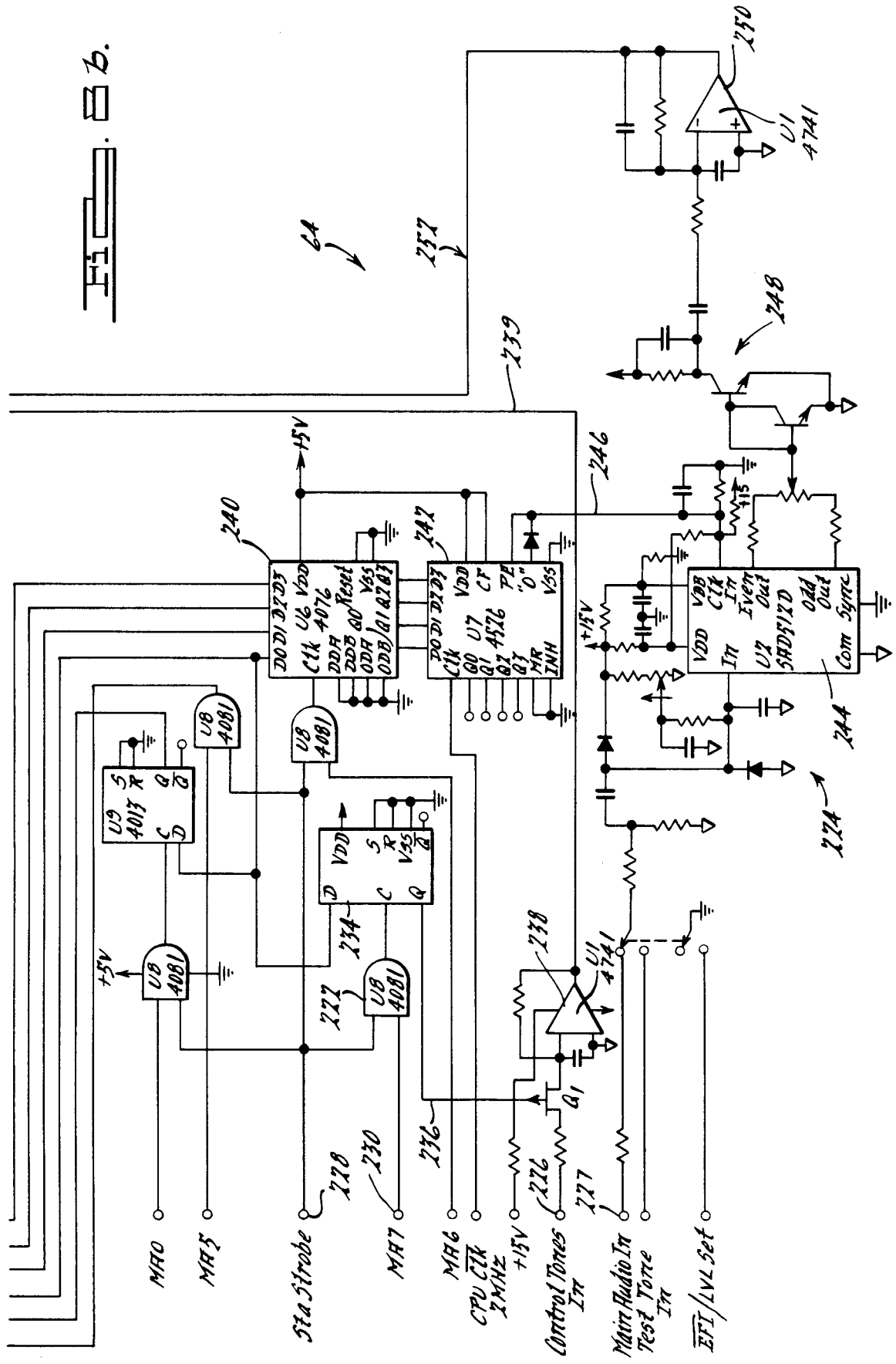

AUTOMATIC EQUALIZATION FOR A SIMULCAST COMMUNICATION SYSTEM

BACKGROUND AND SUMMARY OF THE INVENTION

The present invention relates generally to communication systems, and particularly to communication systems where the same audio signal is to be simultaneously broadcasted from a plurality of remotely located transmitter stations or sites.

Simulcasting is used herein refers to the simultaneous broadcasting of the same audio signal from a plurality of radio transmitter or base stations. While simulcasting itself is not a new technique, previous simulcast communication systems have usually employed privately-owned microwave radio links between each of the base stations and a dispatcher station from which the audio signal is transmitted to the base stations for broadcasting over the air by radio waves. This is because the use of privately-owned microwave links readily allow for stable audio signal time delay and amplitude transmission characteristics without which the radio broadcast of the audio signal from the base stations would be distorted and unintelligible.

With several base stations located remotely from the dispatch station and from each other, the audio signal must necessarily be sent from the dispatch center to the base stations along separate transmission lines or links. If these transmission lines or links have different audio signal transmission characteristics, then the audio signal broadcasted from at least one of the base stations will be distorted with respect to the audio signals broadcasted from the other base stations. For example, one of the transmission lines or links employed may attenuate or otherwise distort portions of the audio signal at certain frequencies, while another of the transmission lines or links employed may attenuate or otherwise distort other portions of the audio signal at different frequencies. Thus, the "amplitude" transmission characteristics of one transmission line or link may not necessarily be the same as the "amplitude" transmission characteristics of another transmission line or link, even if the same type of transmission line or link is employed, and these may change with time.

Additionally, in the typical communication system the base stations will not be located equidistantly from the dispatch center, thereby causing transmission lines or links of different lengths or distances to be employed. These different distances over which the audio signal is transmitted necessarily causes the base stations to receive the audio signal at slightly different times. These time differences will in general cause the base stations to broadcast the audio signal out of time or phase with respect to each other. Accordingly, due to the various distances involved, the "time delay" transmission characteristics of one transmission line or link may be different from the "time delay" transmission characteristics of another transmission line or link, even if the same type of transmission line or link is employed, and these may also change with time.

While it may be possible to have the base stations located sufficiently far apart from each other or the power of their transmitters adjusted such that the audio signal can only be received from one base station at a time, in practice there is generally no well-defined boundary beyond which the audio signal cannot be received from a particular base station. Accordingly, there will be overlapping areas of reception which will depend at least in part upon the local terrain and atmospheric conditions, thereby making these overlapping areas unpredictable from a design standpoint.

Particularly with respect to FM communication systems, where the audio signal is frequency modulated before being broadcasted from the base stations, it is essential that the transmission lines or links employed have equalized transmission characteristics, because the demodulated sum of the two frequency modulated audio signals will not be a linear sum of their audio modulations. Accordingly, in the overlapping areas of reception the output of a receiver tuned to the carrier frequency may be severely distored or unintelligible when transmission lines or links with different amplitude and/or time delay transmission characteristics are employed.

This situation is further exacerbated in mobile radio communication systems which employ a continuous tone-encoded subaudible squelch (CTCSS) signal to enable the receiver contained in one or more of the mobile stations to demodulate the frequency modulated audio signal. If these squelch signals are not synchronized such that they are broadcasted from each of the base stations with the same amplitude, frequency and phase, then in the overlapping areas of reception the receive in a mobile station will demodulate the distortion products of the CTCSS, thereby interfering with desired audio signal.

While microwave links may be employed to obviate the above-identified problems, the high cost and long lead time associated with the microwave system installations necessary to satisfy the technical requirement of simulcasting have inhibited their widespread use. Accordingly, a common solution to these problems is to place the dispatcher behind a radio console from which base stations are selected one at a time to broadcast the frequency modulated audio signal. However, this solution is unnecessarily time consuming and also inhibits mobile stations in one area from monitoring the communications of the mobile stations in another area. A further discussion of the problems involved with simulcasting may be found in a paper entitled "Automatic Equalization for Simulcasting" presented at the May 23, 1982 meeting of the Institute of Electrical and Electronic Engineering Professional Society's Vehicular Technology Group by the applicant of the present invention. This paper is hereby incorporated by reference.

Accordingly, it is a principal object of the present invention to provide a simulcast communication system in which an audio signal may be simultaneously broadcasted from a plurality of base stations which are located remotely from a dispatch station used to transmit the audio signal to the base stations along conventional voice grade telephone lines.

It is a more specific object of the present invention to provide a simulcast communication system which automatically equalizes the audio signal transmission characteristics from the dispatch station to each of the base stations.

It is a further object of the present invention to provide a simulcast communication system which automatically synchronizes the continuous tone-coded subaudible squelch signal generated at each of the base stations.

It is another object of the present invention to provide the automatic equalization circuitry required to convert a conventional FM communication system into a simulcast communication system.

To achive the foregoing objects, the present invention provides first circuit means for equalizing the audio signal transmission characteristics from the dispatch station to each of the base stations in response to at least one test signal broadcasted from each of the base stations, and second circuit means for generating a synchronized squelch signal at each of the base stations in response to a pilot signal transmitted to each of the base stations with the audio signal and a phasing signal transmitted to each of the base stations at the beginning of the audio signal. The first circuit means includes test signal means for generating the test signals. These test signals are transmitted from the dispatch station to the base stations in a predetermined sequence, such that one or more of these test signals are broadcasted from only one base station at a time. The first circuit means also includes digital processing means for determining the audio signal transmission characteristics required to equalize each of the base stations from test response signals which each represent a test signal that has been broadcasted from one of the base stations. The first circuit means further includes programmable equalization means for equalizing the audio signal transmission characteristics from the dispatch station to each of the base stations in response to the digital processing means.

The second circuit means generally includes pilot signal means for generating the pilot signal, phasing signal means for generating the phasing signal, and detection means associated with each of the base stations for detecting the pilot signal and the occurrence of the phasing signal. The second circuit means also includes synchronization means associated with each of the base stations and responsive to the detected pilot and phasing signals, for generating the synchronized squelch signal at each of the base stations. Specifically, this synchronized squelch signal is phase locked to the occurrence of the phasing signal.

The present invention also provides a method of equalizing the audio signal transmission characteristics from the dispatch station to each of the base stations in a communication system where the audio signal is transmitted from the dispatch station to each of the base stations along telephone lines. The present invention further provides a method of generating synchronized squelch signal to be simultaneously broadcasted from a plurality of base stations in a communication system where the audio signal is transmitted from the dispatch station to each of the base stations along telephone lines.

Additional advantages and features of the present invention will become apparent from a reading of the detailed description of the preferred embodiment which makes reference to the following set of drawings in which:

BRIEF DESCRIPTION OF THE DRAWINGS

FIG. 2 is a block diagram of a simulcast communication system in accordance with the present invention.

FIG. 3 is a block diagram of a dispatch station retrofitted with the automatic equalization circuitry according to the present invention.

FIG. 5 is a schematic diagram of an interface circuit to the equalizer computer shown in FIG. 2.

FIG. 6 is a schematic diagram of another interface circuit to the equalizer computer shown in FIG. 2.

FIG. 7 is a schematic diagram of the phasing pulse generator, the impulse generator, and bandpass filter shown in FIG. 2.

FIGS. 8a and b are schematic diagrams of the programmable equalizers shown in FIG. 2.

FIG. 11 is a circuit diagram of the pilot oscillator shown in FIG. 2.

FIG. 15 is a simplified operational diagram of a transversal filter of the type shown in FIG. 8a.

FIG. 16 is a simplified block diagram of another embodiment of a programmable equalizer according to the present invention.

DETAILED DESCRIPTION OF THE PREFERRED EMBODIMENT

Figure 1:
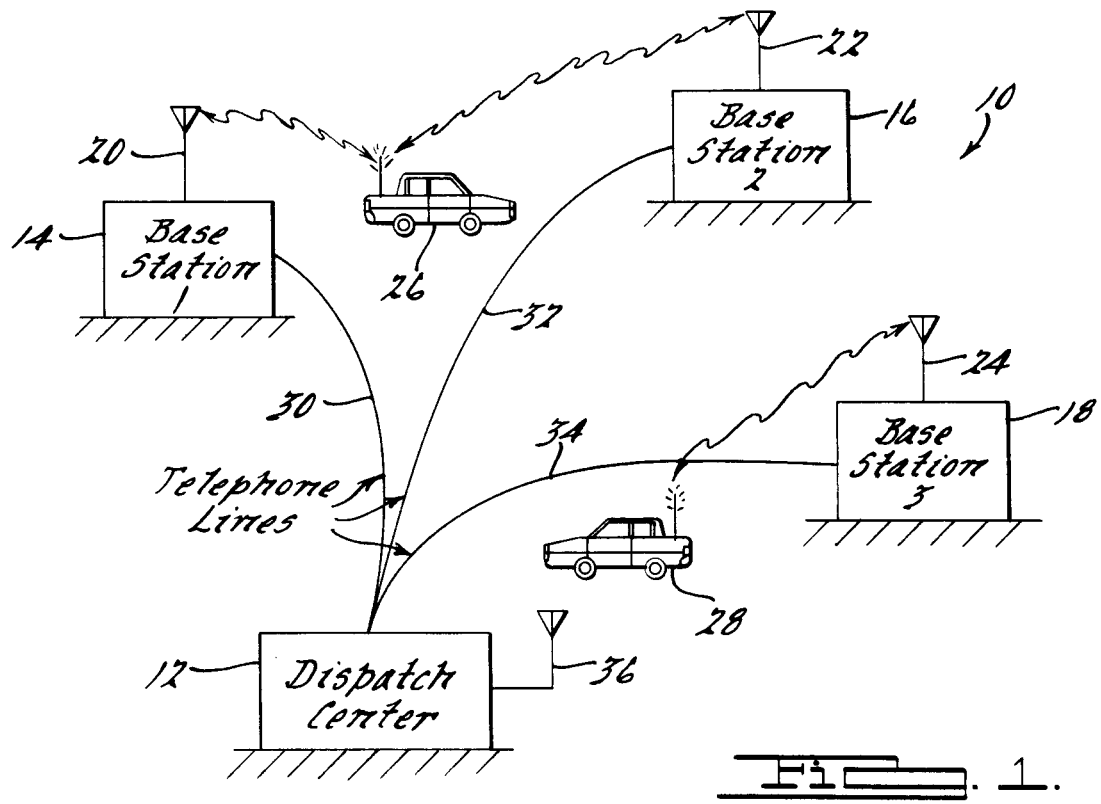
FIG. 1 is a diagrammatic representation of a simulcast communication system in accordance with the present invention.

Referring to FIG. 1, a diagrammatic representation of a simulcast commuication system 10 according to the present invention is shown. The simulcast communication system 10 generally comprises a dispatch center or station 12, and three base stations 14-18. Each of the base stations 14-18 include an antenna for transmitting and receiving radio wave broadcasted audio signals, such as antennaes 20-24. The base stations 14-18 may receive these audio signals from one or more mobile stations such as vehicles 26 and 28, or from the dispatch center 12. While the base stations 14-18 receive audio signals from the mobile stations 26-28 over the air, the base stations receive audio signals from the dispatch center 12 via conventional private telephone lines 30-34. The dispatch center 12 also includes an antenna 36 for receiving radio wave broadcasted audio signals from each of the base stations 14-18. However, it should be noted that the antenna 36 may be located remotely from the dispatch station 12 as long as the broadcasted audio signals from all of the base stations 14-18 are capable of being received.

In accordance with the present invention, an audio signal transmitted from the dispatch center 12 along telephone lines 30-34 to the base stations 34 to the base stations 14-18 is simultaneously broadcasted from these base stations. This will permit all of the mobile stations within the areas of reception from the base stations 14-18 to receive this radio wave broadcasted audio signal at the same time. Thus, there is no need for the dispatcher to know where a particular mobile station is in order to communicate with that mobile station, as in prior systems where the dispatcher had to select a particular base station from which the audio signal would be broadcasted. An additional advantage of this simulcast technique is that the performance and reliability of the communication system are improved. For example, when a mobile station is located such that it will receive the radio wave broadcasted audio signal from two or more base stations, such as mobile station 26, there is a combined probability of reception. Thus, if the mobile station 26 is located behind a building which will inhibit or block the reception of radio waves from the base station 14, it may nevertheless still receive the radio wave broadcasted audio signal from the base station 16.

While in the preferred embodiment each of the base stations 14–18 comprise transmitter/receivers capable of transmitting and receiving frequency modulated (FM) audio signals, it should be appreciated that the principals of the present invention are applicable to other modulation schemes, or stations which are only capable of broadcasting radio wave signals. Thus, for example, in an amplitude modulation (AM) communication system, it is only necessary to equalize the time delay transmission characteristics from the dispatch station 12 to the base stations 14–18. Additionally, the principals of the present invention also apply to communication systems where the audio signals from the dispatch station 12 are only partially transmitted via telephone lines, such as when the communication link between the dispatch center and a base station includes a hop over the telephone company's microwave system. Furthermore, the principals of the present invention also apply to a variety of audio signal types, including but not limited to voice signals, data signals, signaling tones, or any other audio-coded signal.

Referring to FIG. 2, a block diagram of the simulcast communication system 10 is shown. In order to equalize the audio signal transmission characteristics from dispatch station 12 to the base stations 14–18 in accordance with the present invention, at least one test signal is transmitted from the dispatch station to each of the base stations such that only one of the base stations broadcast this test signal at a time. This may be achieved by transmitting the test signal to only one base station at a time, or transmitting the test signal to all of the base stations simultaneously where only one base station is turned on or enabled to receive/transmit the test signal. This test signal is produced by an impulse generator 38 and may be any suitable test signal, such as a pulse signal.

When the test signals are broadcasted from the base stations 14–18, they are received at the dispatch station 12 via antenna 36. The dispatch station 12 includes a receiver 40 which demodulates the radio wave broadcasted test signals, and produces test response signals on conductor 42. Each of these test response signals represent a test signal which has been broadcasted from one of the base stations 14–18.

Before the audio signal transmission characteristics from the dispatch station 12 to each of the base stations 14–18 are equalized, each test respose signal from its respective base station will generally exhibit different characteristics. For example, assume that a first test signal is transmitted to base station 14, then a second test signal is transmitted to a base station 16, and a third test signal is subsequently transmitted to the base station 18. If the base station 14 is located a farther distance from the dispatch station 12 than is the base station 16, then the time from the transmission of the first test signal to its reception at the antenna 36 will be longer than the time from the transmission of the second test signal to its reception at the antenna 36. This time difference represents the difference in the "time delay" transmission characteristics of telephone line 30 with respect to the "time delay" transmission characteristics of the telephone line 32.

Additionally, if the "amplitude" transmission characteristics of the telephone line 30 are different than the "amplitude" transmission characteristics of the telephone line 32, then the first test response signal will exhibit a different waveform than the second test response signal. These differences in the audio signal transmission characteristics from the dispatch 12 to the base stations 14–18 may be best illustrated with reference to FIGS. 9 and 10.

Figure 9:
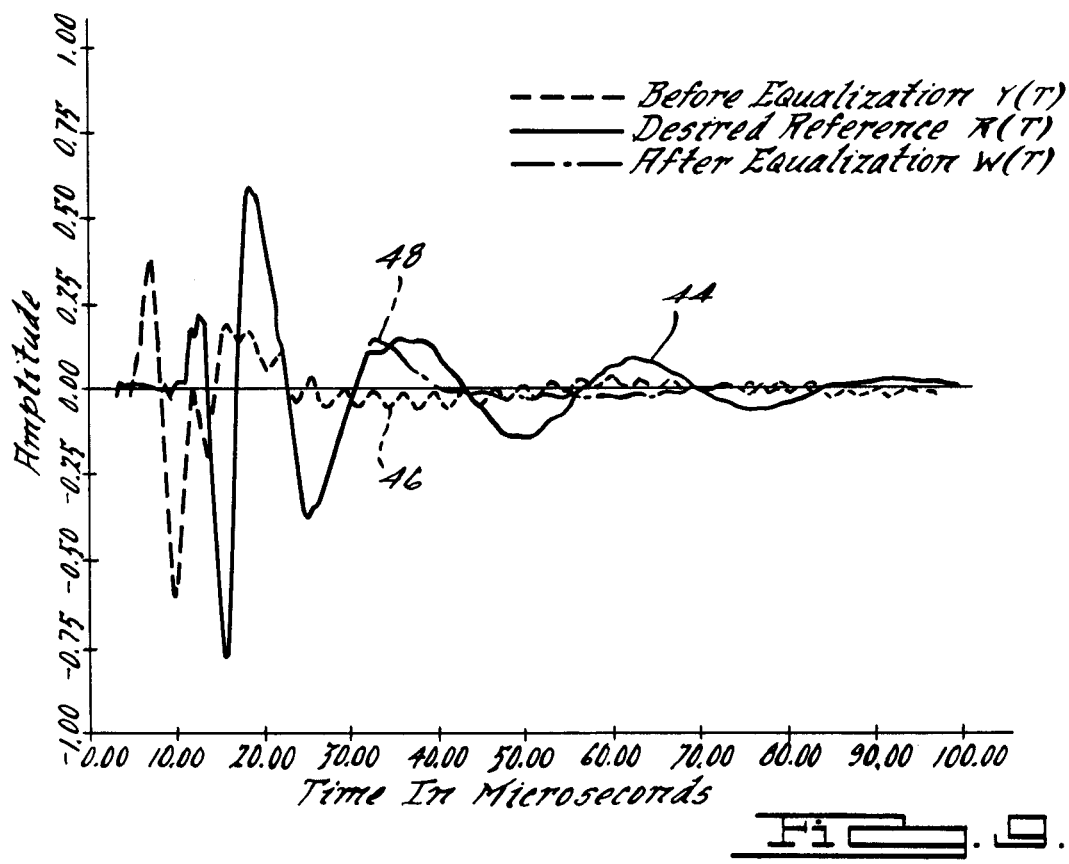
FIG. 9 is a graphical representation of two impulse responses before and after equalization.

FIG. 9 is a graphical representation of two test response signals before the transmission characteristics have been equalized, and two test response signals after the transmission characteristics have been equalized. It should be noted that the first test response signal 44, the reference signal, is displaced in time from the second test response signal 46, and also has a different waveform than the second test response signal. However, after equalization the waveform 48 indicates that the second test response signal now closely follows the first test response signal 44 in both time and shape.

Figure 10:
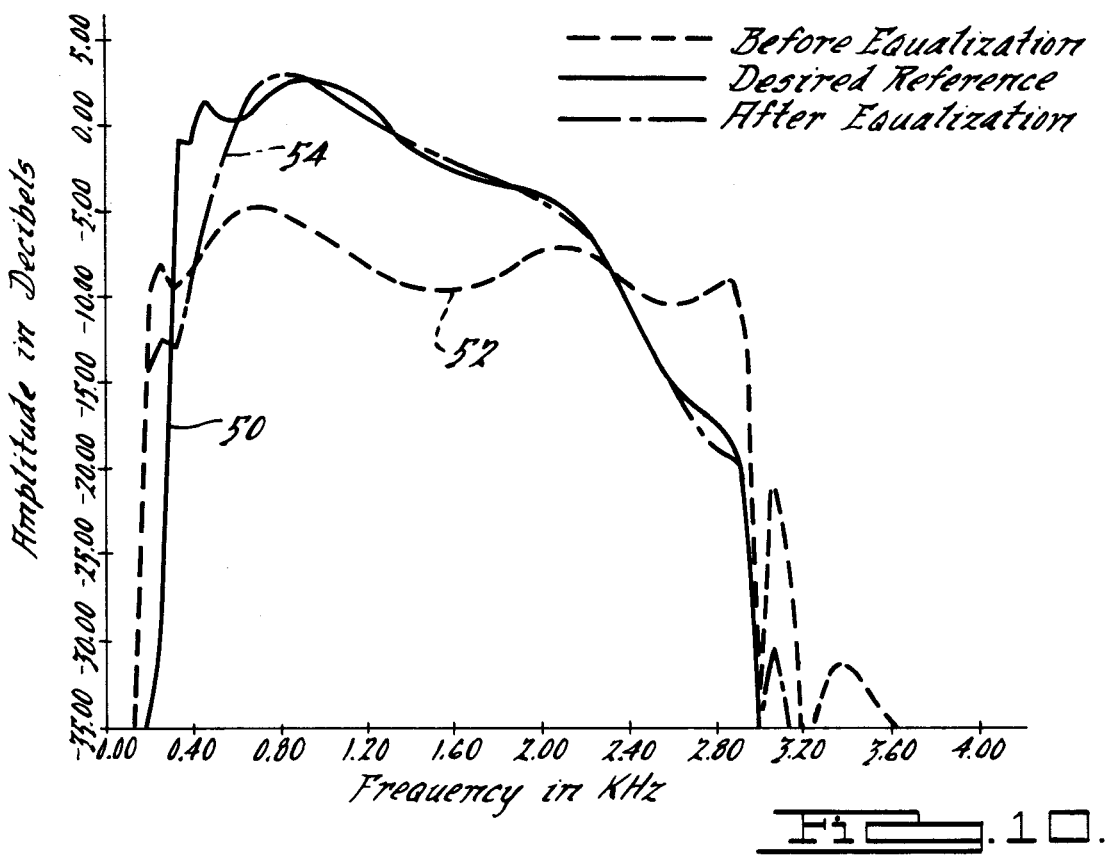
FIG. 10 is a graphical representation of two amplitude responses before and after equalization.

FIG. 10 is a graphical representation of the "amplitude" transmission characteristics of two transmission lines before and after equalization, as determined from the test response signals. The waveform 50 indicates the first or reference amplitude response with respect to frequency, and the waveform 52 indicates the second amplitude response with respect to frequency. It should be appreciated from the waveforms 50 and 52 that the two transmission lines tested will attenuate or otherwise modify the audio signal being transmitted at different frequencies. However, after equalization the waveform 54 indicates that the amplitude response of the second transmission line closely follows that of the reference transmission line.

In accordance with the present invention, one of the base stations 14–18 is preferably designated as a reference base station. This base station is typically the base station with the worst audio signal transmission characteristics or the base station which is located the farthest away from the dispatch station 12. Once this base station is designated as the reference base station, then the transmission characteristics to the other stations will be equalized or matched to the transmission characteristics of the reference base station.

Continuing with the description of FIG. 2, the test response signals on conductor 42 are transmitted to a digital processing means for determining the audio signal transmission characteristics required to equalize each of the base stations to the reference base station. This digital processing means generally comprises an analog to digital converter 56 and an equalizer computer 58. The analog to digital (A/D) converter 56 samples each of the test response signals present on conductor 42 at predetermined times in response to sample command signals from the equalizer computer 58 (via conductor 59), and produces a set of sequential digital sample signals for each of the test response signals. Each set of sequential digital sample signals is representative of the amplitudes of the test response signal at different times. In one embodiment according to the present invention, each set of sequential digital sample signals comprises sixty four sample signals which are taken at intervals of one hundred and twenty eight microseconds. This provides for a total sample length of 8.192 milliseconds. This sample length has been found sufficient to adequately characterize the test response signals when the test signal employed is a pulse of one hundred microseconds in duration, as the response to a test signal of this type has generally been found to decay after several milliseconds.

The equalizer computer 58 includes sufficient random-access memory (RAM) for storing at least one set of the sample signals from the reference base station and at least one set of sample signals from one of the other base stations. Of course, the equalizer computer may contain additional memory for storing at least one set of sample signals from each of the base stations in the communication system, or it may include sufficient memory to store a plurality of sample signal sets from one or more of the base stations. Generally speaking, the equalizer computer 58 needs only have sufficient memory for storing one set of sample signals from the two base stations of which the audio signal transmission characteristics are to be equalized. Accordingly, the equalizer computer 58 need only have a sufficient memory capacity to first equalize the audio signal transmission characteristics for base stations 14 and 16 and then to equalize the audio signal transmission characteristics for stations 14 and 18.

However, due to noise and other transient conditions, it has been found advantageous to obtain a number of sample signal sets from each of the base stations, so that the sample signal sets from each of the base stations may be averaged to increase the accuracy of the equalization process. For example, in one embodiment according to the present invention the equalizer computer 58 causes one hundred and twenty eight trigger command signals to be sent to the impulse generator 38 along conductor 60. Each of these trigger command signals causes the impulse generator 38 to produce a test signal on conductor 62. These one hundred and twenty eight test signals are then transmitted from the dispatch station 12 to one of the base stations where they will be broadcasted. A corresponding set of one hundred and twenty eight test response signals will be received by the antenna 36, sampled by the A/D converter 56, and stored in the equalizer computer 58. The equalizer computer 58 is programmed to store thirty two sets of sample signals and then to obtain an average of these signals. Since one hundred and twenty eight sets of sample signals will be transmitted to the equalizer computer 58, the equalizer computer will obtain four different average or sub-averages of these sample signal sets. These four subaverages are then averaged again to produce one set of averaged sample signals which will be used to define the audio signal transmission characteristics of the transmission line between the dispatch station 12 and the base station being tested.

With a set of averaged sample signals stored for the reference base station (such as base station 14) and a set of averaged sample signals stored for one of the other base stations (such as base stations 16), the equalizer computer determines the audio signal transmission characteristics required to equalize the base station 16 to the reference base station 14 by a two-step process. First, the stored sets of averaged sample signals are cross-correlated to minimize the time delay differences. This is done mathematically by shifting the set of averaged sample signals for the base station 16 in time with respect to the set of averaged sample signals for the reference base station 14 by a predetermined amount, such as in one hundred and twenty eight microsecond increments, until the maximum amplitudes of these signals correspond in time. Secondly, the equalizer computer 58 minimizes the squared error between these two sets of averaged sample signals in order to equalize the "amplitude" transmission characteristics and fine tune the "time delay" transmission characteristics.

As a result of the above identified equalization steps, the equalizer computer 58 causes certain command signals to be directed to individual programmable equalizers 64–68 via the computer data buss 30. These programmable equalizers 64–68 are used for controlling or adjusting the audio signal transmission characteristics from the dispatch station 12 to each of the base stations 14–18 in response to the command signals from the equalizer computer 58. As will be more fully described below, each of the programmable equalizers 64–68 include a programmable filter circuit for adjusting the amplitude transmission characteristics (and finely adjusting the time delay transmission characteristics) for their respective transmission lines, and a programmable delay circuit for coarsely adjusting the time delay transmission characteristics for their respective transmission lines.

The programmable filter circuits in the programmable equalizers 64–68 are responsive to amplitude command signals from the equalizer computer 58 for causing the programmable filter circuits to equalize the amplitude transmission characteristics and fine tune the time delay transmission characteristics of the base stations 14–18. The programmable delay circuits in the programmable equalizer 64–68 are responsive to delay command signals from the equalizer computer 58 for causing the programmable equalizers to coarsely adjust the time delay transmission characteristics of the base stations 14–18. In one embodiment according to the present invention, the equalizer computer 58 is programmed to automatically repeat this equalization process at predetermined intervals, such as once every six hours of operation. However, this repetition rate will be dependent upon the particular implementation of the communication system, as well as the length and type of telephone lines employed.

As illustrated in FIG. 2, the simulcast transmission system 10 also includes an audio console 72 from which audio signals may be originated and transmitted along conductor 74. This audio signal is then passed through a mixer 76 (as are the test signals from conductor 62). The audio signal is also passed through a bandpass filter 78 which is adapted to transmit signals having frequencies between 300 Hz and 3 KHz. The audio signal is then transmitted to each of the programmable equalizers 64–68 which will individually control the timing and filtering of the audio signal before being transmitted along the telephone lines 30–34.

The audio console 72 is also adapted to produce control tones via conductor(s) 80. These control tones are used for example to selectively turn on or off the transmitter contained in the base staions 14–18, and to turn on or off a CTCSS squelch signal to be broadcasted from the base stations. The conductors 80 are coupled to the outputs of the programmable equalizers 64–68 via audio switches 82–86. The audio console 72 is also adapted to transmit control signals to the equalizer computer 58 along conductors 88 and receive request signals from the equalizer computer. These control signals are used for example to prevent the equalizer computer 58 from causing the impulse generator 38 to produce test signals whenever traffic is on the air, such as when the dispatcher depresses the request to call button at the audio console 72. Additionally, the request signals are used by the equalizer computer to inquire whether there is any traffic on the air.

In order to generate a synchronized CTCSS or other type of synchronized squelch signal at each of the base stations 14–18, the simulcast communication system 10 provides for a phasing pulse generator 90 and pilot oscillator 92 at the dispatch station 12. The phasing pulse generator 90 is used to generate a phasing signal to be transmitted to each of the base stations 14–18 at the beginning of the audio signal. The phasing pulse generator 90 operates in response to a transmit signal from the audio console 72 on conductor 93. This transmit signal will be generated by the audio console 72 whenever an audio signal is to be transmitted to the base stations 14–18, such as when the dispatcher depresses the request-to-call button at the audio console. In one embodiment according to the present invention, the phasing pulse generator 90 is comprised in part by a scheduling computer contained in the audio console 72 which is programmed to produce a pulse of a predetermined duration.

The pilot oscillator 92 is used to generate a pilot signal to be transmitted to each of the base stations 14–18 concommitantly with the audio signal. At each of the base stations 14–18 detection means is provided for detecting the occurrence of the pilot and phasing signals. Additionally each of the base stations 14–18 include synchronizing means which is responsive to the detected pilot and phasing signals for generating the synchronized squelch signal. FIG. 2 illustrates a block diagram of the standard base station transmitter circuitry 94 and the detection and synchronizing means for one of the base stations, specifically base station 14. The circuitry illustrated for the base station 14 in FIG. 2 is identical to the circuitry contained in the other base stations 16 and 18, and therefore have not been shown.

The standard base station transmitter circuitry 94 generally includes an amplifier 96, modulation limiter circuits 98–102, and a phase modulator circuit 104. The output of the phase modulator circuit 104 is directed to a radio frequency power amplifier circuit which is connected to a suitable antenna for broadcasting the frequency modulated audio signal.

The detection means at the base station 14 includes first detector circuit means for producing reset signal in response to the pilot signal. The pilot signal is preferrably a continuous tone having a predetermined frequency, such as 3 KHz. The first detector circuit includes a 3 KHz notch and bandpass filter 106 which is adapted to filter out the 3 KHz pilot signal. The output of the filter 106 is connected to a high "Q" mechanical filter 108, which in one embodiment is a reed filter which vibrates at 3 KHz. The output from the filter 108 is then amplified by amplifier 110 and rectified by diode 112, and subsequently sent to a divide-by-thirty circuit 114. The divide-by-thirty circuit 114 is adapted to generate a waveform which is substantially a square wave at a frequency of one hundred Hz whenever the pilot signal is transmitted to the base station 14. The output from the divide-by-thirty circuit 114 is connected to the reset input of a twelve bit counter circuit 116, and therefore provides a reset signal to this counter.

The detection means also includes a second detector circuit for producing a strobe signal in response to the phasing signal. The second detector circuit includes a phasing pulse detector circuit 118 which will detect any pulse signal having an amplitude at least one-half the amplitude of the typical phasing pulse signal. The second detector circuit also includes a phasing window generator circuit 120 which is used to distinguish the phasing signal from other possible pulse signals. When the dispatcher depresses the request to call button at the dispatch center 12, a control tone (1950 Hz) is transmitted to the base station 14 for a predetermined period of time (80 milliseconds). The phasing window generator circuit 120 is responsive to this control tone and operates to generate a pulse of a predetermined duration (22 milliseconds) after the occurrence of the control tone. This pulse is transmitted to an AND gate 122 which will generate the strobe signal on conductor 124 whenever the phasing pulse detector circuit 118 detects a pulse during the window in time defined by the phasing window generator circuit 120.

The synchronization means at the base station 14 includes the counter circuit 116, a twelve bit latch circuit 126 and a twelve bit comparator circuit 128. The operation of this synchronization means may best be described with reference to FIG. 13 which graphically illustrates the output from the counter circuit 116 for each of the base stations 14–18. It should be understood that this graphical representation is simplified for illustrative purposes.

Figure 13:
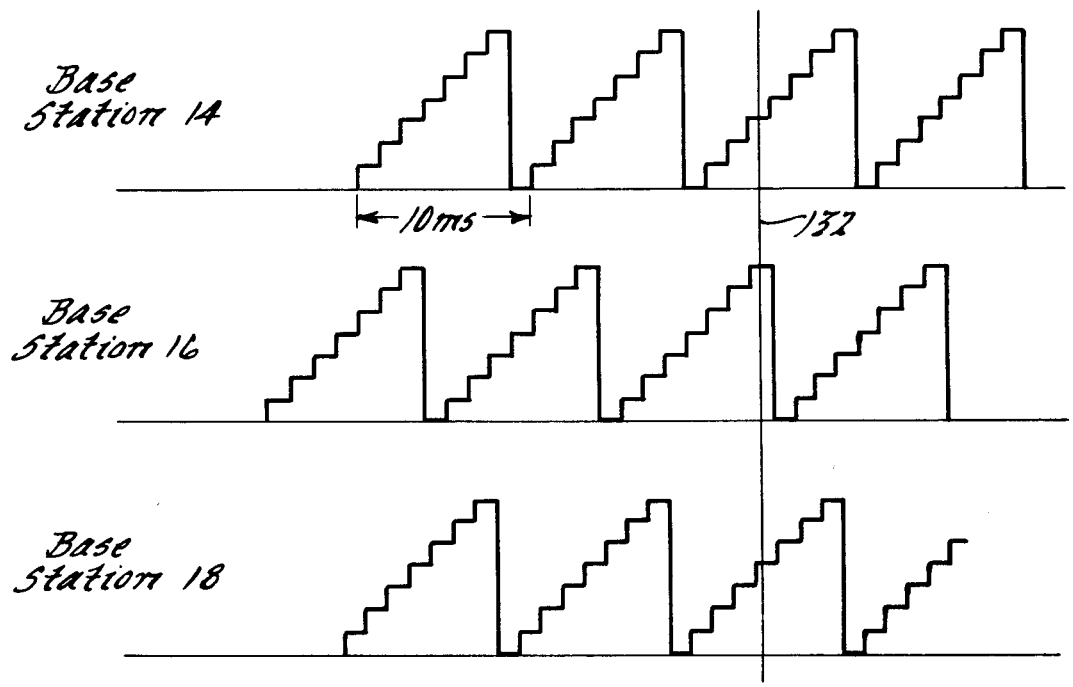
FIG. 13 is a graphical representation of the squelch signal synchronization technique according to the present invention.

Each of the counter circuits 116 in the base stations 14–18 operate under a high frequency oscillator, such as the one hundred and fifty KHz oscillator 130 shown in FIG. 2. When the pilot signal is transmitted to the base stations 14–18 the divide-by-thirty circuits 114 will generate a reset signal every ten milliseconds. Thus, as shown in FIG. 13, the output from each of the counter circuits 116 in the base stations 14–18 increase in steps at the one hundred and fifty KHz rate for a total of ten milliseconds, at which time another reset signal is generated and the counter circuits 116 begin counting again from zero.

Since the pilot signal does not undergo the equalization process, FIG. 3 illustrates that the outputs of each of the counter circuits 116 in the base stations 14–18 are each displaced in time due to the time delay transmission characteristics of the transmission lines employed. However, when the phasing signal is detected, such as at the time indicated by line 132, the strobe signal on conductor 124 causes the latch circuits 126 in each of the base stations 14–18 to store the present output values of the counter circuits 116. Thereafter, the count signal outputs of the counter circuits 116 in each of the base stations 14–18 are compared with the count signals stored in the latch circuits 126 in the respective base stations by the comparator circuits 128. In this way, the comparator circuit 128 in each of the base stations 14–18 will generate a sync signal on conductor 134 at the same time.

The synchronization means in the base station 14 also includes a phase locked loop oscillator circuit for generating the synchronized squelch signal on conductor 136 in response to the sync signal on conductor 134. This oscillator circuit includes a phase detect circuit 138, a filter 140, and voltage controlled oscillator 142. This oscillator circuit is adapted to generate a synchronized squelch signal which in one embodiment comprises a one hundred Hz sine wave. Before this synchronized squelch signal is broadcasted by the base station 14, it is passed through a filter circuit 144, which is adapted to reverse the phase of the synchronized squelch signal momentarily at the end of the audio signal to stop a mechanical reed from vibrating in the mobile stations receiving the audio signal.

Referring to FIG. 3, a block diagram of a dispatch station, such as dispatch station 12, which has been retrofitted with the automatic equalization circuitry according to the present invention is shown. This block diagram identifies the various circuit boards or "cards" previously contained in the dispatch station and six boards which have been added to the dispatch station corresponding to the automatic equalization circuitry. The first three of these circuit boards are contained in block 146 which is entitled "Equalizer Computer and Interface Cards". This block represents one circuit board for the equalizer computer 58 and the two interface cards which will be described with reference to FIGS. 4 and 6. In one embodiment according to the present invention, the equalizer computer 58 comprises and RCA CDP 18S601 "Microboard" microcomputer which provides for an eight bit data bus. However, it should be appreciated that other suitable computers may be employed in the appropriate application.

The dispatch station 12 also includes a main audio card 148 which includes the phasing pulse generator 90, the impulse generator 38, the mixer 76, and the bandpass filter 76 illustrated in FIG. 2. Additionally, the pilot oscillator 92, is contained in the pilot and test tone oscillator card 150. Finally, the programmable equalizers 64–68 are contained in the programmable equalizer cards 152–156.

Figure 4:
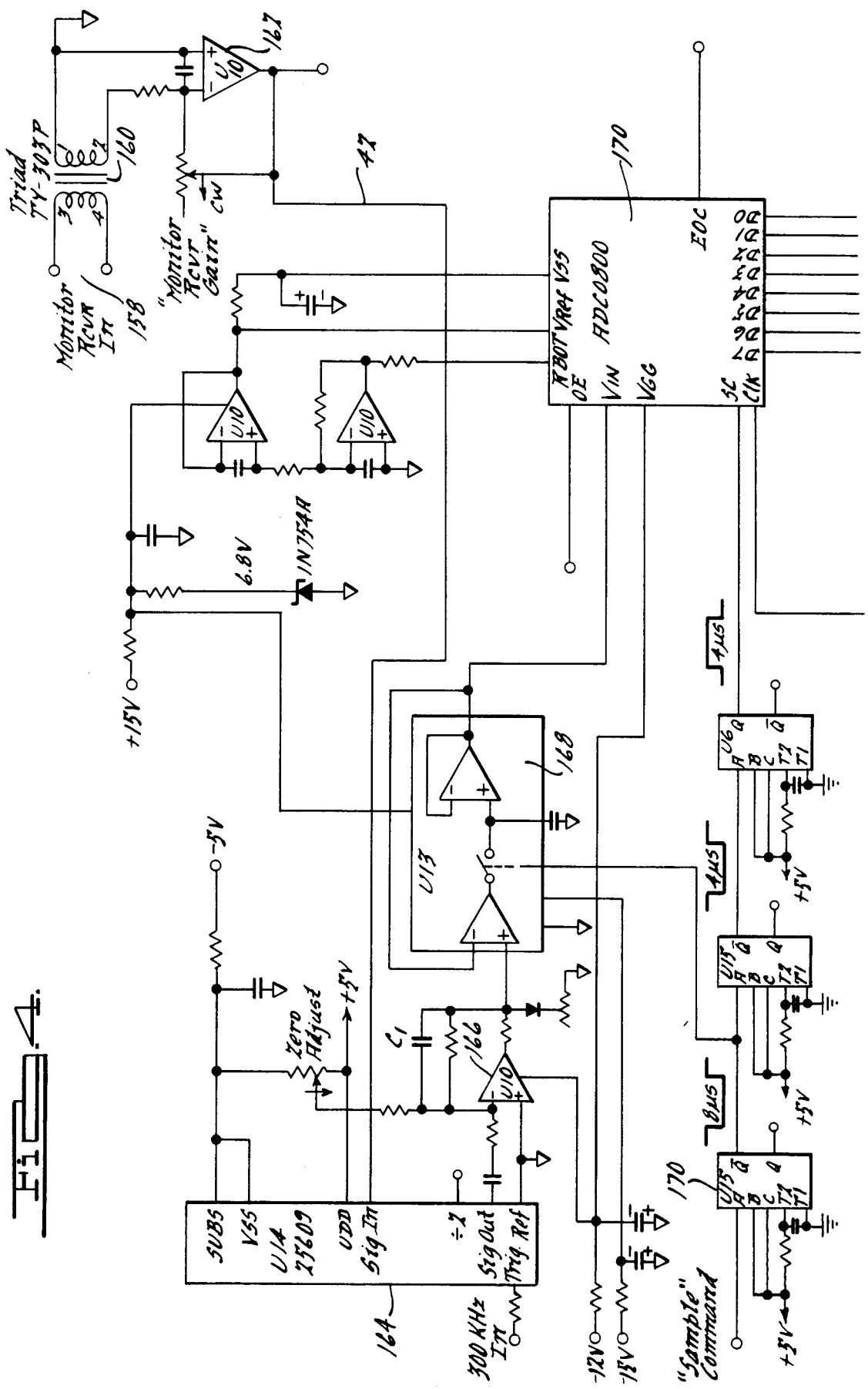
FIG. 4 is a schematic diagram of the analog to digital converter shown in FIG. 2.

Referring to FIG. 4, a schematic diagram of the A/D converter 56 is shown. Interposed between the output of the receiver 40 at port 158 is a coupling transformer 160 and an op-amp amplifier 162 for adjusting the gain of the receiver. The output of the amplifier 162 is connected to the conductor 42 which transmits the test response signals to a low pass "alias" filter 164. The output of the alias filter 164 is connected to an op-amp 166 which operates to clip the test response signals to a maximum of 5 volts. A capacitor C1 may also be connected across the op amp 166 if it is desired to interject a weighting function in the equalization process as described in the "Automatic Equalization For Simulcasting" paper identified above. Such a weighting function may be advantageous when it is desired to emphasize an equalization correction at certain frequencies rather than at the other frequencies.

The output of the op-amp 166 is connected to a sample-and-hold circuit 168 which operates to sample the test response signals at a rate of one hundred and twenty eight microseconds. The sample-and-hold circuit 168 operates in response to a pulse signal output from a flip flop 170 which has as its input a 7.8125 KHz clock signal. The output of the sample and hold circuit 168 is connected to an A/D converter circuit 170. The converter circuit 170 operates to convert each of the samples of the test response signal into an eight bit digital code at output lines d0–d7. As will be seen with reference to FIG. 5, these output lines are connected to the data bus of the equalizer computer 58.

Referring to FIG. 5, a schematic diagram of an interface circuit 172 is shown which forms part of the equalizer computer 58. It should be noted that the interface circuit 172 and the A/D converter 56 are contained on the same interface card to the equalizer computer 58, and the circuitry shown in FIG. 5 represents a continuation of the circuitry shown in FIG. 4. Thus, for example, the output lines d0–d7 from the A/D converter circuit 170 continue on FIG. 5 and are connected to the data bus of the equalizer computer 58 which is represented by the ports labelled DB0–DB7. The interface circuit 172 includes a multiply/divide circuit 174 which is also connected to the data bus of the equalizer computer 58. This multiply/divide circuit 174 is used to increase the speed at which multiplication and division calculations are processed by the equalizer computer 58.

The interface circuitry 172 also includes an impulse delay generator circuit which is generally designated by reference numeral 176. The impulse delay generator circuit 176 operates to control the time at which the trigger command signal is sent to the impulse generator 38 on conductor 60. The impulse delay generator circuit 176 is addressed from the input/output (I/O) address bus of the equalizer computer 58, and accordingly includes the necessary address decoders 178. The impulse delay generator circuit 176 includes a pair of four bit pre-settable down counters 180 and 182 which are pre-set by an appropriate eight bit digitally coded value placed upon the data bus of the equalizer computer 58. The output of the down counters 180 and 182 is directed to a NOR gate, which together with NAND gates 186–188 and flip flop 190 form a "one shot" multivibrator. This multivibrator is adapted to generate the trigger command signal on conductor 60 when the down counters 180 and 182 have reached their zero value.

The impulse delay generator 176 serves an important function according to the present invention, in that it is used to compensate for the differences in the distances between the receiver antenna 36 and each of the base stations 14–18. It should be appreciated that if the receiver antenna 36 is not located equidistantly from each of the base stations 14–18, then the time it takes for a broadcasted test signal to reach the receiver antenna 36 will be different for at least one of the base stations with respect to the other two base stations. However, since radio wave transmissions travel at a rate of 5.4 microseconds per mile, all that is needed to be known is the distance between each of the base stations and the receiver antenna 36. With those distance values stored in the equalizer computer 58, the computer can simulate an equalization of these distances by delaying the trigger command signal for the two closest base stations.

Referring to FIG. 6, a schematic diagram of another interface circuit 192 is shown which forms part of the equalizer computer 58. The interface circuit 192 includes an address circuit 194 and a clock divider circuit 196. The address circuit 194 is used to address each of the programmable equalizers 64–68 from the memory address bus of the equalizer computer 58. For example, the output port labelled "STA0" provides the necessary strobe signal to address one of the the programmable equalizers 64–68, while the output port labelled "STA1" provides the strobe signal necessary to address one of the other programmable equalizer, and so forth. The clock divider circuit 196 is used to divide the two MHz clock signal from the equalizer computer 58 into the various clock frequencies needed by the automatic equalization circuit according to the present invention.

Referring to FIG. 7, several circuits are shown, including the impulse generator 38, a portion of the phasing pulse generator 90, the mixer 76, and the bandpass filter 78. The impulse generator 38 generally comprises a "one shot" multivibrator circuit 198, which is adapted to generate a pulse signal on conductor 62 having a duration of one hundred microseconds. The conductor 62 is connected to the mixer 76, which comprises an op-amp mixer circuit 200. Also connected to this mixer circuit 200 is conductor 74 from the audio console 72 and conductor 202, which is used to designate other possible audio inputs to be transmitted. In the particular embodiment of FIG. 7, a scheduling computer contained in the audio console 72 forms part of the phasing pulse generator 90, and this computer is programmed to generate a phasing pulse of six hundred and seventy eight microseconds in duration on conductor 204. This pulse is amplified by an op-amp amplifier 206 to the amplitude required for the phasing signal. The output of the amplifier 206 is also connected to the mixer 200.

A diode circuit 208 is connected to the output of the mixer circuit 200 in order to clip the maximum voltage excursions of the output from the the mixer to a level below the amplitude level at which the audio signal will be clipped by the telephone line. This is to prevent the loss of any part of the pilot signal which is subsequently added to the audio signal before being transmitted to the base stations 14–18. The output of the mixer circuit 200 is also connected to the bandpass filter 78, which includes a low pass (3 KHz.) filter circuit 210, and high pass (300 Hz.) filter circuits 212 and 214. The output of the filter circuit 214 is connected to a brightener RC circuit 216, which is adapted to give a ten dB boost to the high frequency components (1 KHz. to 3 KHz.). The output of the RC circuit 216 is connected to a notch filter circuit 218, which is adapted to remove any components of the audio signal at a frequency of 3 KHz. This notch filter is used to insure that the pilot signal from the pilot oscillator 92 is the only signal transmitted at a frequency of 3 KHz. The output from the notch filter circuit 218 is then amplified by the op-amp amplifier 220 and subsequently sent to each of the programmable equalizers 64–68.

Referring to FIGS. 8a and b, a schematic diagram of one of the programmable equalizers is shown, specifically the programmable equalizer 64. The programmable equalizer circuit 64 is generally comprised of a programmable digital filter circuit 222 and a programmable delay circuit 224. The audio input signal input to the programmable equalizer 64 is received at input port 227. The input port 227 is connected to the output of the amplifier 220 shown in FIG. 7. However, before the programmable equalizer 64 can modify the audio signal to compensate for the transmission characteristics of the telephone line 30 with respect to the telephone lines 32 and 34, the programmable equalizer must first receive the proper address signal.

As described with reference to FIG. 6, the output of the address circuit 194 includes a "STA" strobe signal for each of the programmable equalizers 64–68 in order to address these programmable equalizers. The "STA" strobe signal input to programmable equalizer 64 is indicated at input port 228. This strobe signal is used in combination with several different signals from the memory address bus of the equalizer computer 58 to control various portions of the programmable equalizer 64. For example, the strobe signal from input port 228 is used in combination with an appropriate signal on the "MA7" line of the memory address bus at input port 230 to permit the programmable equalizer 64 to receive the control tones input from port 226. This achieved through AND gate 232 and flip flop 234, which are used to generate an enabling signal on conductor 236. This enabling signal will turn on FET transistor Q1 and permit the control tones to be amplified by op-amp 238 and be transmitted to the output side of the programmable equalizer 64 via conductor 239, as will be more fully described below.

The programmable delay circuit 224 generally comprises a latch circuit 240, a programmable divider circuit 242, and a "bucket brigade" type audio delay circuit 244. The audio delay circuit 244 is capable of delaying the audio signal for a total of four thousand and ninety six microseconds in sixteen increments each comprising two hundred and fifty six microseconds. The number of these increments and hence the delay provided by the audio delay circuit 244 is controlled by a frequency signal input on conductor 246. This frequency signal is provided from the data bus of the equalizer computer 58 via latch circuit 240, which will capture and store the appropriate four bit data word whenever both the "STA" strobe signal and a memory address signal on the "MA6" line are both received. The output of the latch circuit 240 is connected to the programmable divider circuit 242 which operates to generate the frequency signal on conductor 246.

The programmable delay circuit 224 also includes two amplifier circuits 248 and 250 which are connected to the output of the audio delay circuit 244. The output of these amplifier circuits on conductor 252 is then sent to the input of the programmable filter circuit 222 which is shown in FIG. 8a. The programmable filter circuit 222 generally comprises a transversal filter circuit 254, a low pass filter circuit 256, and a line leveler circuit 258. The operation of the transversal filter circuit 254 may best be described with reference to FIG. 15.

FIG. 15 is a simplified operational diagram of a transversal filter circuit 260. The transversal filter circuit 260 includes three delay circuits 262–266, three amplifier circuits 268–272, and an adding circuit 274. Each of the amplifier circuits 268–272 represent a "tap" to the transversal circuit 260 whose gain can be controlled over a range in values from +1 to −1. For example, if the gain of the amplifier 268 is "+1" and the gain of the other two amplifier 270–272 are both set to zero, then the input signal to the transversal circuit 260 will simply be delayed by an incremental amount determined by the delay circuit 262. However, if the gain of the amplifier circuit 270 is then adjusted to the "+0.5", then the adding circuit 272 will add the input signal which has been delayed in time by the delay circuit 262 with the input signal again after it has been delayed in time by both the delay circuits 262 and 264 and after it has been attenuated by a factor of "+0.5". From the above, it should be understood that the transversal filter circuit 260 is capable of both delaying the input signal in time and controlling its waveform.

Referring again to FIG. 8a, the transversal filter circuit 254 is a sixteen tap transversal filter which is capable of delaying the audio signal on conductor 252 for a total of two thousand and forty eight microseconds in increments of one hundred and twenty eight microseconds and controlling or modifying the waveform of the audio signal. The individual gain values for each of the taps on the transversal filter circuit 254 are provided from the data bus of the equalizer computer 58, and the sixteen taps are addressed from the memory address bus of the equalizer computer. However, it should be noted that in order to set the gain for each tap, two sets of address signals must be sent to the transversal filter circuit, the first being used to program the magnitude of the gain and the second being used to program the sign (positive or negative) of the gain.

The output from the transversal filter circuit 254 on conductor 276 is connected to the low pass filter circuit 256. The low pass filter circuit 256 operates to remove any frequency components above 5000 Hz. from the audio signal. Thus, the filter circuit 256 operates to reconstruct the audio signal after it has been processed through the signal adjustments programmed into the transversal filter circuit 254. The output of the low pass filter circuit 256 is connected to the line leveler circuit 258. The line leveler circuit 258 operates under the control of the equalizer computer 58 to selectively adjust the gain applied to the audio signal before it is transmitted over the telephone line. This line leveler circuit 258 is used for example to correct for weak telephone lines which require a gain to be applied to the audio signal beyond the dynamic range of the transversal filter circuit 254. The line leveler circuit 258 receives three gain control signals from the I/O port of the equalizer computer 58 along conductors 278-282. These gain control signals are used to turn on or off three bilateral switches 284-288. The bilateral switches 284-288 effectively control the resistance value of a resistor R1 by combining one or more resistors R2-R4 in parallel with it. It should also be noted that coupled between the low pass filter circuit 256 and the line leveler circuit 258 is a conductor 290 which is used to carry the pilot signal from the pilot oscillator 92, and the conductor 239 which is used to carry the control tones.

It should also be noted that suitable modifications may be made to the specific embodiment of the programmable equalizer 64 shown in FIGS. 8a and 8b without departing from the spirit and scope of the present invention. Thus, for example, the programmable delay circuit 224 may be replaced by one or more additional transversal filter circuits. The particular type of the transversal filter circuit 254 is a "R5404" integrated circuit manufactured by EG&G Reticon, Inc., Sunneyvale, Calif. With a plurality of these transversal filter circuits connected in series, it should be appreciated that the separate steps of first coarsely adjusting the time delay transmission characteristics by adding a flat delay, and subsequently adjusting the amplitude transmission characteristics and finely adjusting the time delay transmission characteristics, may be combined in one process step.

Additionally, it should be appreciated that since the transversal filter circuit 254 and the programmable delay circuit 224 have a finite resolution, it is not possible for the programmable equalizers 64-68 to compensate for the audio signal transmission characteristics of the telephone lines 30-34 such that the audio signals will be identically equalized. Nevertheless, it should be understood that the programmable equalizers 64-68 are capable of substantially equalizing the audio signals so as to prevent any significant distortion in the demodulated audio signal received by a mobile station in an overlapping area of reception.

Additionally, each of the programmable equalizers 64-68 may also be implemented by the programmable equalizer circuit 292 shown in FIG. 16. In this simplified block diagram, the programmable equalizer circuit 292 includes an A/D converter 294, a computer 296, and a D/A converter 298. The A/D converter 294 receives the audio signal and converts it to a sixteen bit digital code which will be accepted by the computer 296. The computer 296 is preferably a fast signal-processor type computer which has sufficient memory to store the audio signal for the greatest time delay required. For example, in order for the programmable equalizer circuit 292 to provide a time delay equivalent to the time delay provided by the programmable equalizer 64, the computer 296 must include sufficient random access memory to delay the audio signal for a total of six thousand one hundred and forty four microseconds.

As with the programmable equalizer 64-68, the programmable equalizer circuit 292 would receive the appropriate amplitude and delay commands from the equalizer computer 58. Specifically, the computer 296 would receive these command signals and cause the audio signal to be digitally delayed and filtered in response thereto. The output of the computer 296 is directed to the D/A converter 298 which will operate to convert the digital output from the computer back to an analog audio signal for transmission along a telephone line. Thus, it should be appreciated from the above that the programmable equalizers 64-68 may be implemented by various types of digital filters which may be appropriately programmed to effectuate the necessary adjustments to the audio signal transmission characteristics.

Figure 14:
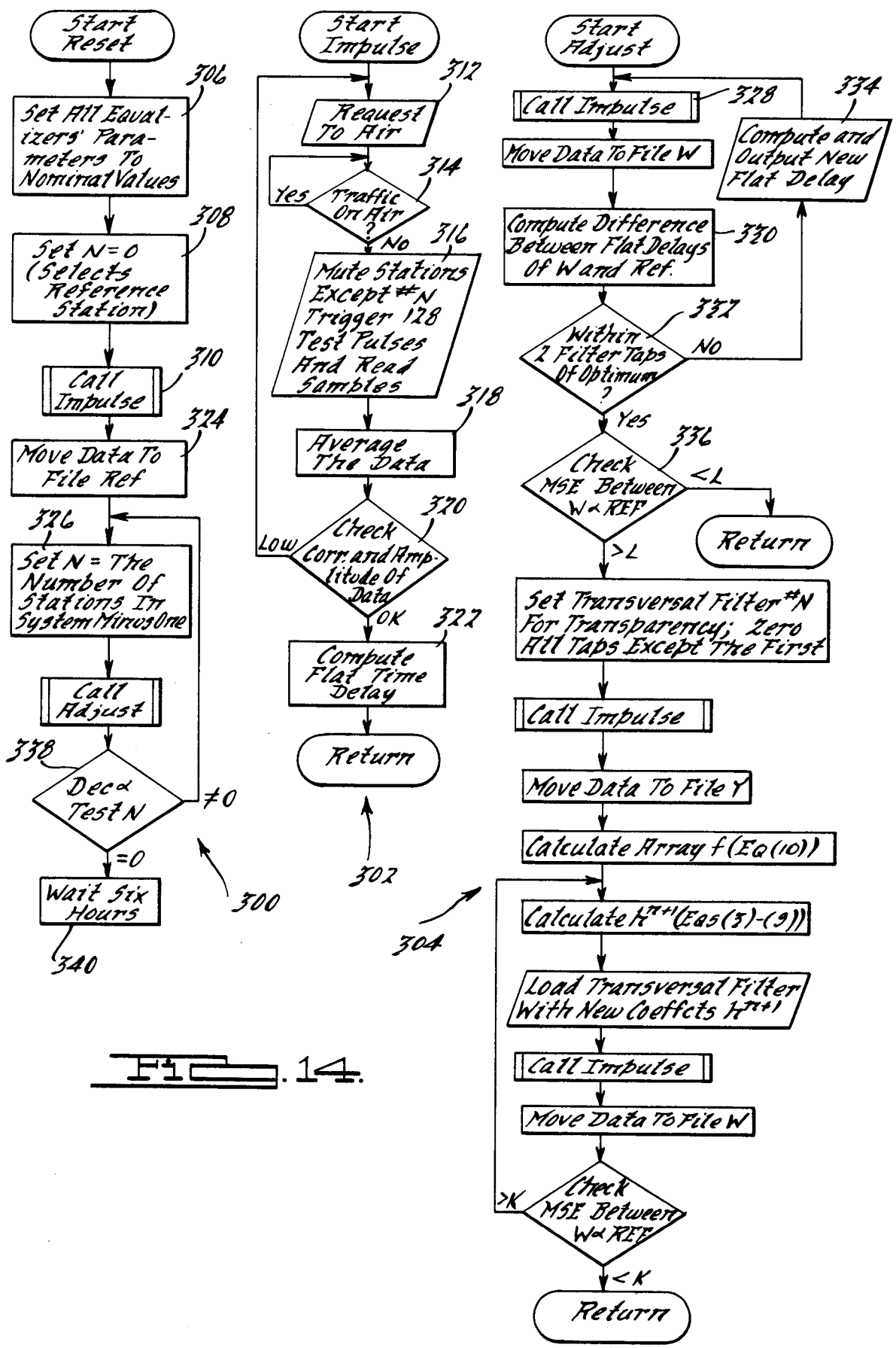
FIG. 14 is a flow chart of the computer software employed in the equalizer computer shown in FIG. 2 for achieving the automatic equalization according to the presention.

Referring to FIG. 14, an overall flow chart 300 of the computer software used in the equalization process is shown, as are the impulse subroutine 302 and adjust subroutine 304 to this flow chart. It should be noted that a listing of this software is included at the end of this detailed description and is hereby incorporated into this specification. The block 306 that indicates the equalizer computer 58 initially causes each of the programmable equalizers 64-68 to be set to their nominal values.

In one embodiment according to the present invention, these nominal values comprise a 2048 microsecond time delay for the programmable delay circuit 224 and a "+1" gain value set for the first tap on the transversal filter circuit 254 (the other taps all being set to zero). However, it should be appreciated that other nominal values may initially be selected, such as a one thousand and twenty four microsecond delay for the programmable delay circuit 224, and a "+1" gain value set for one of the central taps to the transversal filter circuit 254 (the other gain values all being set to zero).

Block 308 to the flow chart 300 indicates that the reference base station is first selected, and then a jump is made to the impulse subroutine 302 (see block 310). As indicated by block 312 and diamond 314, the impulse subroutine 302 first determines whether there is any traffic on the air. If the traffic is clear, the block 316 indicates that a set of one hundred and twenty eight test pulses are caused to be broadcasted from the reference base station and the resulting test response signals to be sampled. This set of sampled test response signals is then averaged (block 318), and then a check of this set of averaged signals is obtained. Diamond 320 indicates that the final set of averaged signals is correllated with the four sets of sub-averaged signals. A low correllation is indicative of an inconsistent measurement, as might occur if lightening struck during the test period, and therefore another set of test pulses should be broadcasted.

Additionally, the amplitude of the set of averaged test response signals is examined to determine if the full dynamic range of the A/D converter 56 is being utilized. If not, then an appropriate adjustment will be made to the line leveler circuit 258 and/or an adjustment will be made to the gain value of the transversal filter circuit 254. Block 322 indicates that the time delay caused by the transmission line from the dispatch station to the reference base station is then determined. Block 324 indicates that the data obtained during the impulse subroutine 302 is then stored in a specific location of the equalizer computer 58.

The equalizer computer 58 then selects the next base station to be tested (block 326) and calls the adjust subroutine 304. Block 328 in the adjust subroutine 304 indicates that the first task to be completed is to obtain the necessary test response data for this base station. The equalizer computer 58 then calculates the difference between the time delays of the reference base station and base station being equalized (block 330). The equalizer computer 58 then determines whether or not this difference is small enough to be corrected by the transversal filter circuit 254 (block 332). If a coarse adjustment to the time delay transmission characteristics of this base station is required, block 334 indicates that the appropriate delay value is computed and a delay command signal is sent to the programmable equalizer for this base station. This delay command signal is used to set the flat delay for this base station via the programmable delay circuit 224, so that if no further delay adjustment was made the bulk of the energy of the reference station test response would occur eight taps of the transversal filter circuit 254 after the bulk of the energy in the test response of the base station being equalized.

The equalizer computer 58 then checks the mean squared error between the two sets of averaged test response signals for the referenced base station and the base station being equalized (diamond 336). If the mean squared error is within an acceptable level, then program control is returned to the overall flow chart 300, where the next base station will be selected and the adjust sub-routine 304 repeated (diamond 338). If the mean squared error is outside of this acceptable value, then the adjust subroutine 304 causes the equalizer computer 58 to determine the gain values to be programmed into the transversal filter circuit 254 which will minimize this mean squared error. However, in order for this procedure to be more fully understood the equations identified in the adjust sub-routine 304 will now be briefly described.

Mathematically, the equalization should minimize the squared difference between the channel complex transfer functions, $$\int_{-\infty}^{\infty} W(\omega) - R(\omega)^2 Q(\omega)^2 d\omega \tag{1}$$

Where $R(\omega)$ is the test signal frequency response of the reference channel or base station, $W(\omega)$ is that of one of the other equalized base stations and $Q(\omega)$ is a weight function if one is desired.

Assuming that the transversal filter 254 performs the convolution of its 16 tap coefficients with the test signal response, the resulting equalized response may be computed as a function of the equalizer coefficients h(k).

$$w(i) = \sum_{k=0}^{15} h(k) y(i - k) \tag{2}$$

The MSE to be minimized is identically the norm of $w(i) - r(i)$. Differentiating this with respect to the tap coefficients and setting equal to zero, the following is obtained.

$$0 = \sum_{i=0}^{63} y(i - j) \left[ \sum_{k=0}^{15} h(k) y(i - k) - r(i) \right], j = 0, 1, \ldots, 15$$

Even though these 16 equations are linear in the 16 unknowns h(k), it is not numerically efficient to solve them exactly. The iterative technique of steepest descent is used. Using suprscripts to denote the results of successive iterations, and writing the variables (k) as a vector h, the resulting algorithm is $$h^{n+1} + h^n + c^n z^n, h^0 = [1,0,0 \ldots ,0]^T$$

where c is the scalar $$c^n = \frac{-(z^n, z^n)}{(Az^n, z^n)} \tag{3}$$

and (. , .) denotes the inter product defined by $$(u, v) = \sum_i u(i) v(i).$$

The vector z is computed for each iteration by $$z^n = A h^n$$

and A is the linear operator defined by $$(Az^n)(j) = \sum_{i=1}^{63} y(i - j) \left[ \sum_{k=0}^{15} z^n(k) y(i - k) - r(i) \right]$$

The steepest descent algorithm is known to always converge, and computer simulations of the above algorithm using hypothetically-real test signal responses approached the minimum MSE=the inner product $(w-r, w-r)$ after only a few iterations.

Provided that the measurement of y(k) was accurate, and that the filter taps will physically realize the convolution ideally (zero nonlinearly and offset), the converged solution is the vector of optimal tap coefficients. They may be programmed into the transversal filter 254 to realize an equalized channel response which is optimally close, for this equalizer structure, to that of the desired response. The two assumptions above, however, will be not quite true in practice. Additionally, the adjustment is based on only one measurement, totally discarding the previous tap coefficient settings which will generally still be close to optimal.

Both the convergence and the robustness of the the design can be improved by arranging the measurement to be repeated after each computational iteration of the algorithm, and the resulting response sampled and stored as w(k). Instead of solving for the tap coefficient vector h, we solve for p, defined as the perturbation or update; that is, $$h^{n+1} = h^n + p^n, h^0[1,0,0, \ldots ,0]^T. \tag{4}$$

The new response w(k) is now measured instead of computed by equation (2). The problem turns out to the be the same as the previous one with h replaced by p and r replaced by (r−w). The remainder of the algorithm is $$p^n = c^n z^n, p^0 = [0,0, \ldots ,0]^T. \tag{5}$$

where c is the same as in equation (3) but the term involving only y and r is removed from the operator A because it will be the same for each iteration and need not be recomputed;

$$(Au)(j) = \sum_{i=0}^{63} y(i-j)u(i) \quad (6)$$

where $$u(i) = \sum_{k=0}^{15} y(i-k)z(k) \quad (7)$$

$$z^n = g^n - f \quad \text{(vector equation)} \quad (8)$$

$$g^n(j) = \sum_{i=0}^{63} y(i-j)w(i) \quad (9)$$

and $$f(j) = \sum_{i=0}^{63} y(i-j)r(i). \quad (10)$$

Although y(k) is still explicitly involved, any error in its measurement is visible to the algorithm via subsequent measurements of w(k), so that the effects are reduced at each iteration. The software for calculation of equations (3)–(10) may be structured very straightforwardly as a series of calls to subroutines CORRELATE (eqs. 6, 9 and 10), CONVOLVE (eq. 7) and INNER PRODUCT (eq. 3). With the help of the multiply/divide circuit 174, the whole iteration takes generally less than two seconds of CPU time.

Finally, with respect to FIG. 14, it should be noted that block 340 indicates that the equalizer computer 58 will wait a total of six hours before repeating the procedure outlined in the flow chart 300. However, it should be noted that this repetition rate will be dependent upon the stability of the particular telephone lines employed and may be modified accordingly. The audio console 72 may also include a suitable provision for manually causing the equalization process to be instituted by the equalizer computer 58.

Referring to FIG. 11, a schematic diagram of the pilot oscillator 92 is shown. The pilot oscillator 92 includes two Schmitt trigger circuits 342 and 344 which together with a crystal oscillator 346 generate a 300 KHz. clock signal on conductor 348. The clock signal is then processed through two divide-by-ten circuits 350 and 352 to produce a 3 KHz. square wave signal on conductor 354. This square wave signal is then passed through a mechanical filter 356 which is used to convert this 3 KHz. square wave signal into a 3 KHz. sine wave signal. This sine wave signal is then amplified by op-amp amplifier 358 to produce the 3 KHz. pilot signal.

Figure 12A:
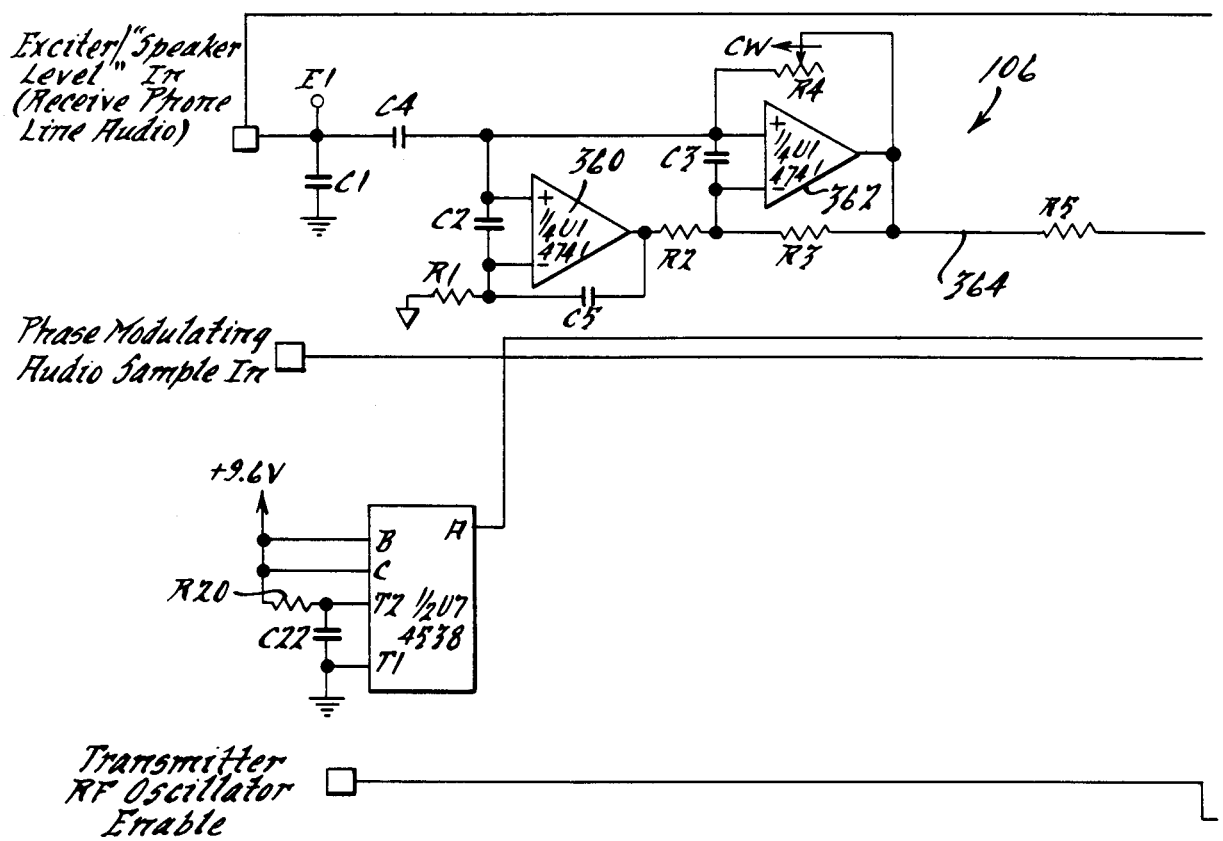
FIGS. 12a-e are schematic diagrams of the base station circuitry shown in FIG. 2.

Referring to FIGS. 12a–e, several schematic diagrams are shown for the circuitry contained at each of the base stations 14–18, which is used to generate the synchronized squelch signals. FIG. 12a illustrates the notch and bandpass filter 106, which generally comprises two op-amps that are turned to the 3 KHz. frequency of the pilot signal. The output from the filter circuit 106 on conductor 364 continues onto FIG. 12b, where it is shown to be connected to the high "Q" mechanical filter 108. The mechanical filter 108 is connected to the amplifier circuit 110, which is shown to be comprised of two op-amps 366 and 368. The output from the amplifier circuit 110 is then rectified by diode 112 and sent to the divide-by-thirty circuit 114. The divide-by-thirty circuit 114 is shown to be comprised of a programmable divider circuit 370 and flip flops 372 and 374. The programmable divider circuit 370 is adapted to provide a division by ten, while the flip flops 372–374 are adapted to provide a subsequent division by three, thereby totaling a division by thirty. The output of the flip flop 374 on conductor 376 provides a reset signal in a twelve bit counter circuit 116. In the specific embodiment described herein, this reset signal has a frequency of 100 Hz. However, it should be appreciated that if a squelch signal is to be generated at a different frequency, the divide-by-thirty circuit 114 may be suitably modified to produce a reset signal of the necessary frequency.

Figure 12B:
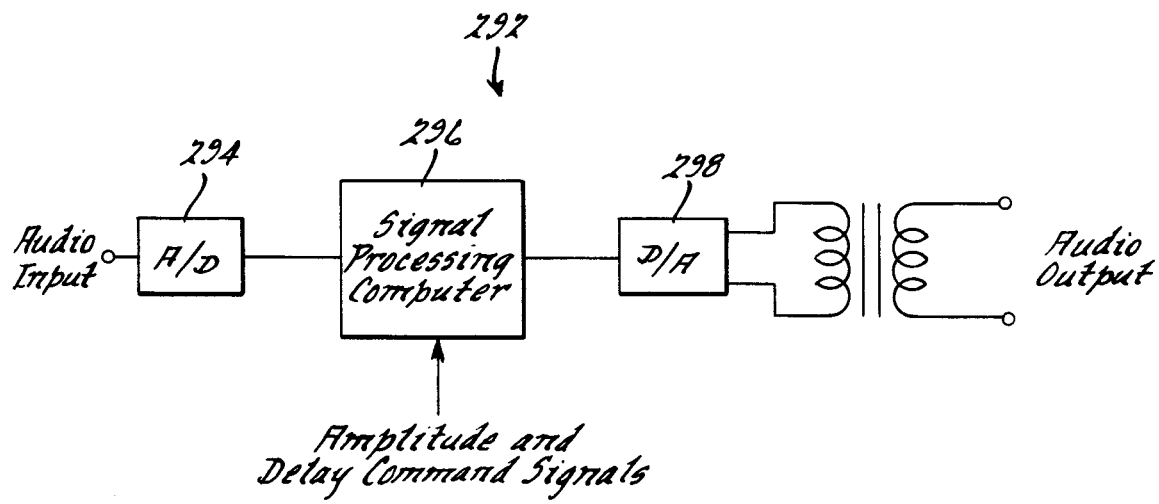
Figure 12B:
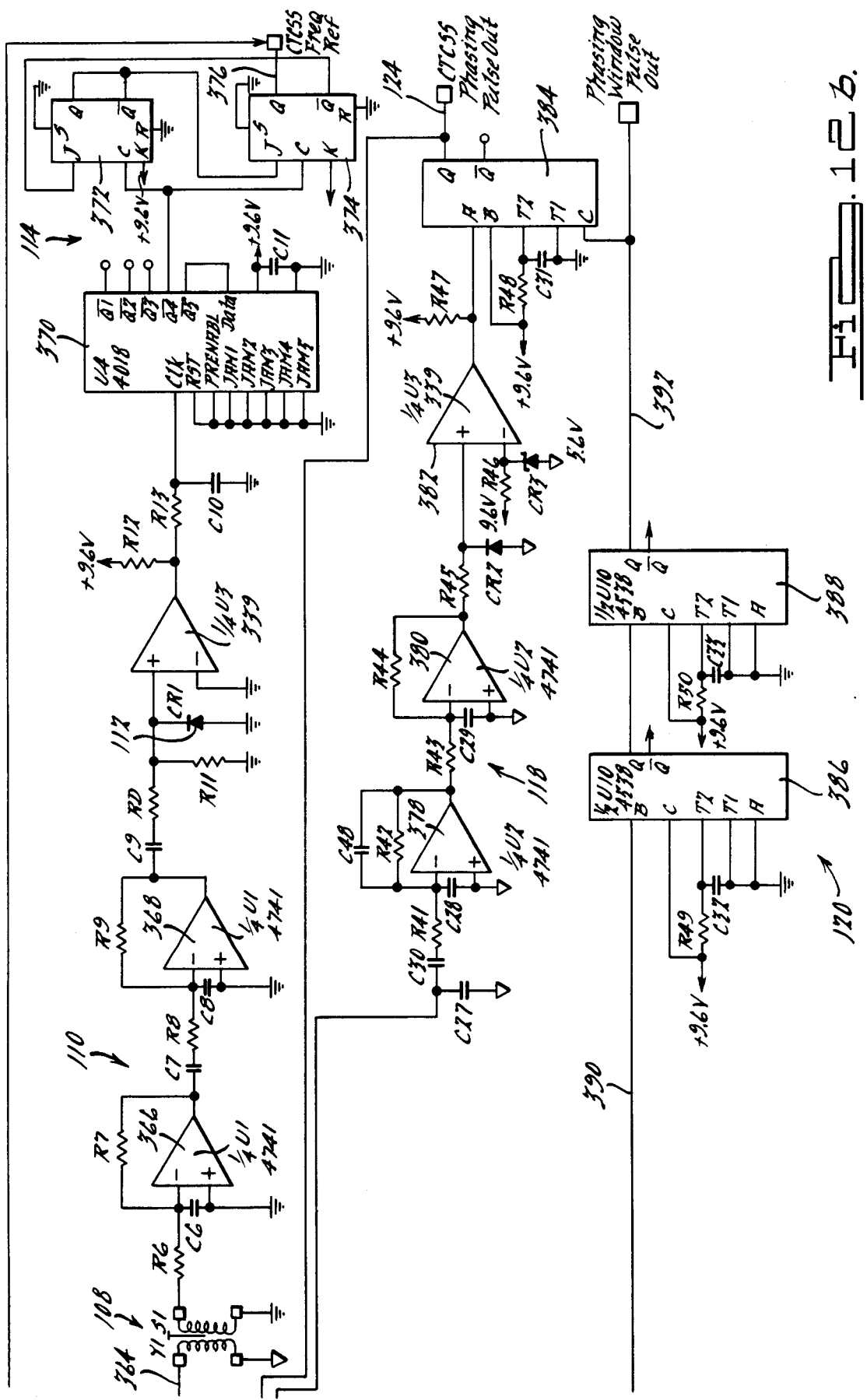

FIG. 12b also illustrates the phasing pulse detector circuit 118 and the phasing window generator circuit 120. The phasing pulse detector circuit 118 includes an op-amp 378 which is coupled to filter out any RF frequency components of the audio signal. The phasing pulse detector circuit 118 also includes an op-amp 380 for amplifying the audio signal and a comparator 382 for comparing the amplified audio signal with a 5.6 volt reference signal. The output from the comparator 382 is connected to a "one shot" multivibrator circuit 384 which includes the AND gate 122 internally. The multivibrator circuit 384 is adapted to produce the strobe signal output to conductor 124 whenever the phasing pulse is detected.

The phasing window generator 120 is shown in FIG. 12b to be comprised of two "one shot" multivibrator circuits 386 and 388 connected in series. When the 1950 Hz. control tone signal is received by the base station transmitter circuitry 94, an indicator signal will be sent to the phasing window generator 120 via conductor 390. Upon receipt of this signal, the multivibrator circuit 386 will produce a 100 millisecond pulse, and after this pulse the multivibrator circuit 388 will produce a 22 millisecond pulse on conductor 392, which is connected to the internal AND gate of the multivibrator circuit 384.

Figure 12C:
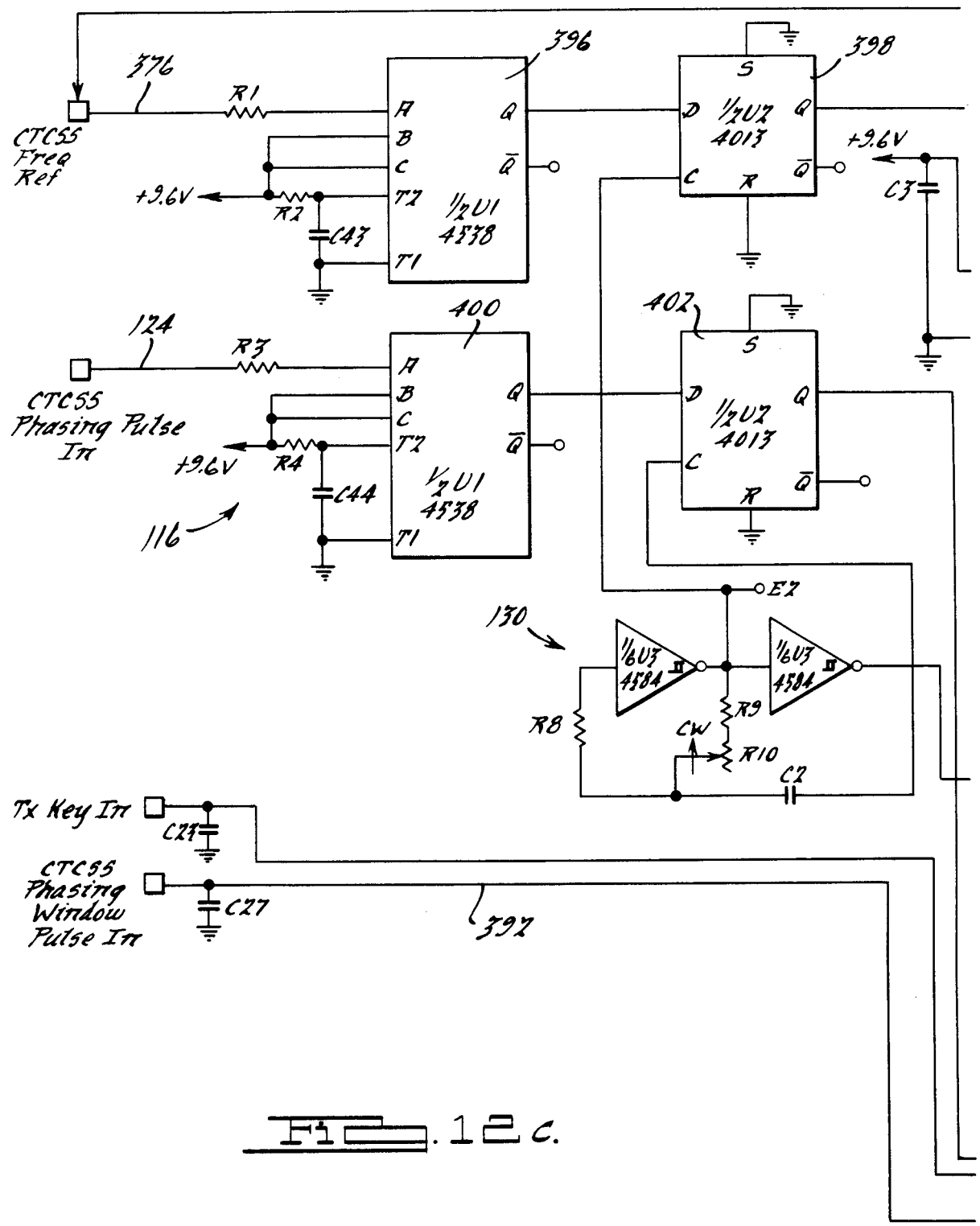
Figure 12D:
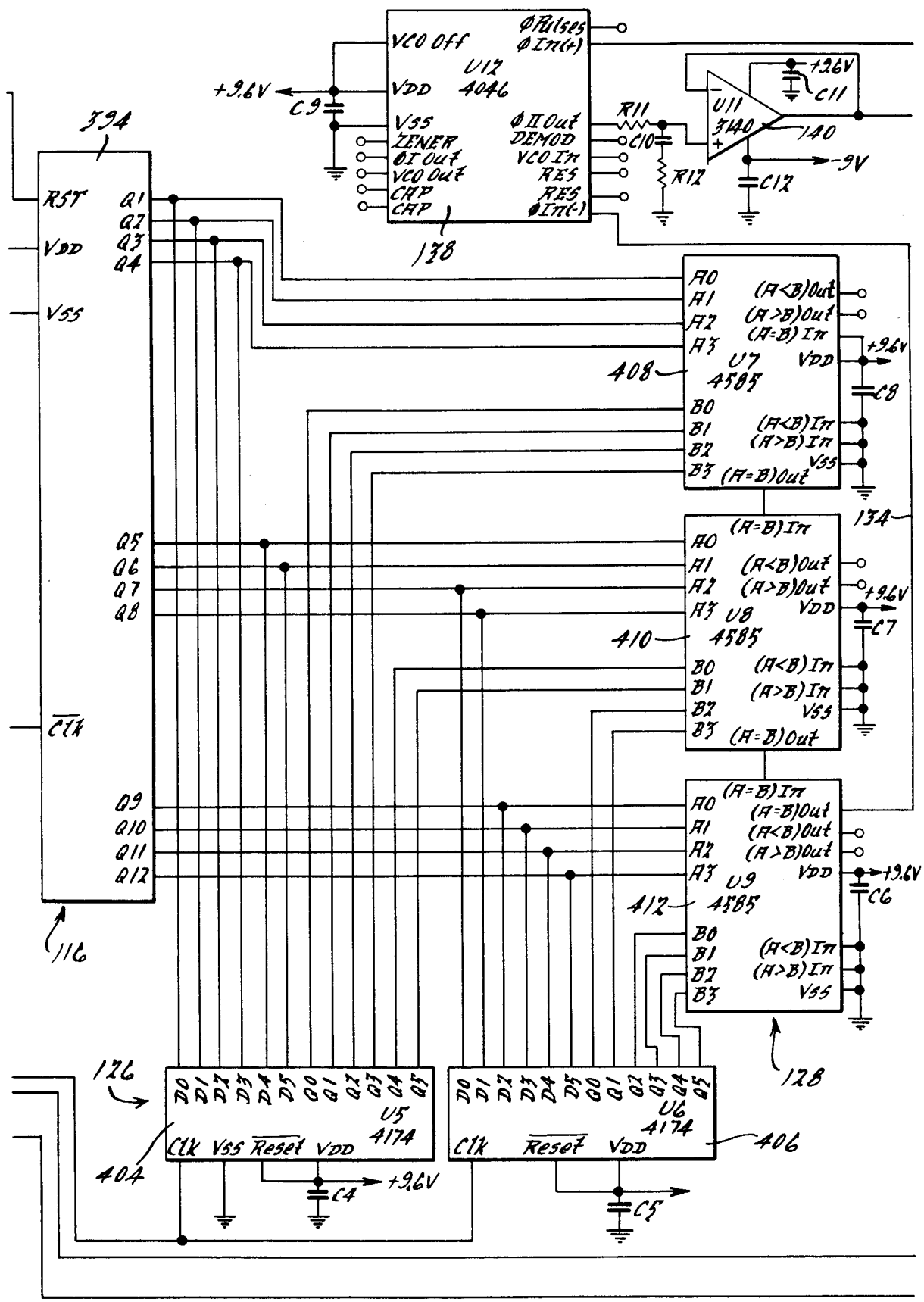
Figure 12E:
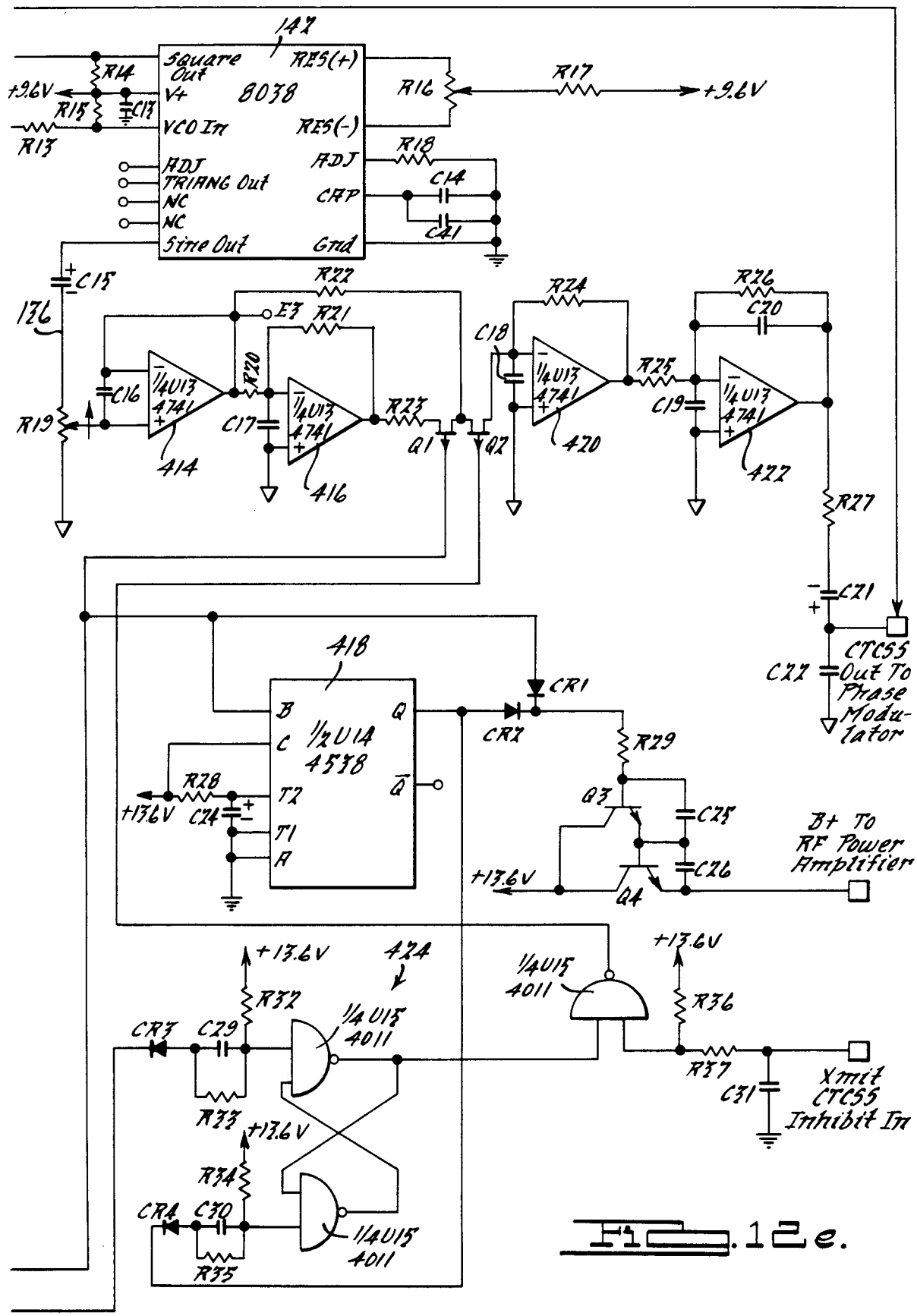

Referring to FIG. 12c, the 150 KHz. oscillator 130, as well a portion of the counter circuit 116 are shown. This portion of the counter circuit 116 is used to synchronize the oscillator 130 so that a reset signal will not be sent at the same time as a clock signal to the counter 394 shown in FIG. 12d. This achieved by the series combination of a "one shot" multivibrator 396 connected in series with a flip flop 398. Additionally, another multivibrator 400 and flip flop 402 are provided to insure that the strobe signal will not be sent to the latch circuit 126 simultaneously with a clock pulse to the counter 394.

Referring to 12d, the twelve bit output from the counter 394 is shown to be connected to the latch circuit 126 and the comparator circuit 128. The latch circuit 126 is comprised of two six bit latches 404 and 406, while the comparator circuit 128 is comprised of three four bit comparators 408–412. The output of the comparator circuit 128 on conductor 134 is connected to the polarity detect circuit 138 of the phase lock loop oscillator circuit. The output from the polarity detect circuit 138 is connected to the filter 140, which is turn connected to the voltage controlled oscillator 142 shown in FIG. 12e. The voltage controlled oscillator 142 is adapted to generate the synchronized squelch signal on conductor 136, which in this embodiment comprises a 100 Hz. sine wave.

Referring to FIG. 12c, the filter circuit 144 is shown. It should be noted that coupled between the output from the voltage controlled oscillator 142 and the filter circuit 144 is a potentiometer labeled "R19" which is used to adjust the amplitude of the synchronized squelch signal. The filter circuit 144 includes two op-amps 414 and 416 which together with FET transistors Q1 and Q2 are used to control the phase of the synchronized squelch signal. As described above, the phase of the synchronized squelch signal is reversed momentarily at the end of the audio signal to stop a mechanical reed from vibrating in the mobile stations receiving the audio signal. In order to keep the RF power amplifier and the transmitter circuitry 94 on during this reverse burst a "one shot" multivibrator circuit 418 is provided to generate a one hundred and fifty millisecond pulse signal to be sent to the transmitter circuitry 94. Before the synchronized squelch signal is transmitted to the phase modulator 104 of the transmitter circuitry 94, is again amplified via op-amp 420 and filtered by op-amp 422. Finally, the filter circuit 144 includes a flip flop circuit 424 which is adapted to inhibit the broadcasting of the synchronized squelch signal whenever paging or signaling tones are to be broadcasted.

While the above description constitutes the preferred embodiment of the present invention, it will be appreciated that the invention is susceptible to modification, variation and change without departing from the proper scope or fair meaning of the accompanying claims.

COMPUTER SOFTWARE FOR THE EQUALIZER COMPUTER
OF THE SIMULCAST COMMUNICATION SYSTEM

```
B:BOOT$$
..EQUAL-K1.0
....Equalizer Computer, 3/8/82
..1st half of 1st Kilobyte
..
ORG#0000
CHKRAM=#0375
CHKROM=#0290
UNKILL=#02B1
LEVEL=#0428
MEMOVE=#0B31
PLTEST=#03AE
EQLSTA=#0400
CHKMDU=#0390
PT2TAP=#04F0
SLEEP=#0343
ZLNLVL=#0CB0
CNT0=0
CNT1=1
STKPOI=2
PGMCNT=3
CALL=4
RETN=5
PARFOI=6
RECSTA=7
CNT2=8
CNT3=9
PT0=#0A
PT1=#0B
PT2=#0C
PT3=#0D
PASS=#0E
ACC=#0F
MAIN:    DIS, #00   ..Disable Interrupts
         LDI A.1(MAN1)  ..Load Main Psm Cntr.
         PHI PGMCNT
         LDI A.0(MAN1)
         PLO PGMCNT
         SEP PGMCNT
MAN1:    LDI A.1(LINKIN)  ..Load Call Psm. Cntr.
         PHI CALL
         LDI A.0(LINKIN)
         PLO CALL
         LDI A.1(LINKOU)  ..Load Return Psm. Cntr.
```

```
              PHI RETN
              LDI A.O(LINKOU)
              PLO RETN
              LDI #2F    ..Load Stack Pointer
              PHI STKPOI
              LDI #FF
              PLO STKPOI
              SEP CALL, A(RESET)
       MAN2:  B1 MAN2    ..Wait here if LVLSET true
       MAN3:  SEP CALL, A(CHKROM)
              GHI RECSTA
              BNZ MAN4   ..Don't equalize if ROM bad
              SEP CALL, A(CHKMDU)
              GHI RECSTA
              BNZ MAN4   ..Don't equalize if multiply/
                         ..divide unit is bad.
              SEP CALL, A(EQLIZE)
       MAN4:  SEP CALL, A(SLEEP)
              BR MAN3
       EXITA: SEP PGMCNT  .."SCRT" Linkers, see RCA
       LINKIN: SEX STKPOI     ..Publ. MPM-201C pg. 64
              GHI PARPOI
              STXD
              GLO PARPOI
              STXD
              GHI PGMCNT
              PHI PARPOI
              GLO PGMCNT
              PLO PARPOI
              LDA PARPOI
              PHI PGMCNT
              LDA PARPOI
              PLO PGMCNT
              BR EXITA
       EXITR: SEP PGMCNT
       LINKOU: GHI PARPOI
              PHI PGMCNT
              GLO PARPOI
              PLO PGMCNT
              SEX STKPOI
              INC STKPOI
              LDXA
              PLO PARPOI
              LDX
              PHI PARPOI
              BR EXITR
..
..-----SUBROUTINES-----
..
ORG#0054
..The function of each subroutine,, as viewed by
..the caller, is explained in the Dispatch Center
..Manual text, Sec. 4.20.7.
WAIT:   LDA PARPOI
        PHI CNT1
        LDA PARPOI
        PLO CNT1
        LDA PARPOI
        PHI CNTO
        LDA PARPOI
        PLO CNTO
        SEP CALL, A(DOUBLE)
   WA1: SEP CALL, A(TICK)
        BNF WA2   ..Exit when timed out
        NOP
        NOP
```

```
                NOP
                NOP
                BR   WA1
        WA2:    SEP  RETN    ..Timed out
        SETIMR: LDA  PARPOI
                PHI  CNT1
                LDA  PARPOI
                PLO  CNT1
                LDA  PARPOI
                PHI  CNT0
                LDA  PARPOI
                PLO  CNT0
                SEP  CALL, A(DOUBLE)
                SEP  RETN
        DOUBLE: GLO  CNT0
                SHL
                PLO  CNT0
                GHI  CNT0
                SHLC
                PHI  CNT0
                GLO  CNT1
                SHLC
                PLO  CNT1
                GHI  CNT1
                SHLC
                PHI  CNT1
                SEP  RETN
        TICK:   GLO  CNT0    ..CNT0.0=0?
                BNZ  TK1
                GHI  CNT0    ..CNT0.1=0?
                BNZ  TK2
                DEC  CNT1    ..CNT0=0;  Decr. CNT1
                BR   TK3
        TK1:    GLO  STKPOI  ..Kill time
                GLO  STKPOI
        TK2:    GLO  STKPOI
                GLO  STKPOI
        TK3:    DEC  CNT0    ..Decr. CNT0.  (TK3 is always
                             ..executed.  CNT0 may roll over #FF.)
                GLO  CNT0    ..Test whole CNT = CNT1&0
                BNZ  TK4
                GHI  CNT0
                BNZ  TK5
                GLO  CNT1
                BNZ  TK6
                GHI  CNT1
                BNZ  TK7
                BR   TK8
        TK4:    GLO  STKPOI  ..Kill time
                GLO  STKPOI
        TK5:    GLO  STKPOI
                GLO  STKPOI
        TK6:    GLO  STKPOI
                GLO  STKPOI
        TK7:    LDI  #FF     ..CNT not=0; Set DF
                ADI  #01
                BR   TK9
        TK8:    LDI  #00     ..CNT=0; Reset DF
                ADI  #00
        TK9:    NOP          ..Kill time
                NOP
                NOP
                NOP
                NOP
                SEP  RETN
```

```
DOGRDY: SEP CALL, A(SETIMR), #0000000A
  DRD1: SEP CALL, A(TICK)
        BNF DRD2   ..Exit after 10 msec.
        NOP
        NOP
        NOP
        NOP
        B3 DRD1    ..Loop back if Wdog. not ready
  DRD2: SEP RETN
DATDOG: LDI #FF    ..PT3 to Watchdog
        PHI PT3
        LDI #BF
        PLO PT3
        SEP CALL, A(DOGRDY)  ..Output "B.E." flag
        LDI #BE
        STR PT3
        SEP CALL, A(DOGRDY)  ..Output Event Code
        LDA PARPOI
        STR PT3
        SEP CALL, A(DOGRDY)  ..Output STA
        GLO RECSTA
        STR PT3
        SEP CALL, A(DOGRDY)  ..Output RECODE
        GHI RECSTA
        STR PT3
        SEP RETN
ORG #00F3
STATE:  LDA PARPOI  ..Push new state
        STXD
        LDI #08     ..and PIO Group Select
        STR STKPOI
        OUT 1       .."PIO" to Group Decoders
        OUT 6       ..State to Port B
        DEC STKPOI
        SEP RETN
RESET:  SEX PGMCNT
        OUT 1, #08  ..PIO Setup: Group Select
        OUT 2, #F3  ..Port B bit-prgmabble.
        OUT 2, #3F  ..B0-B5 output, B6-B7 inp.
        OUT 2, #0E  ..BSTB & BRDY as inputs
        OUT 2, #EF  ..Port A bit-prgmabble.
        OUT 2, #FF  ..A0-A7 all outputs
        OUT 2, #88  ..ASTB oupt., ARDY inpt.
        SEP CALL, A(STATE), #FF
        SEP CALL, A(DATDOG), #00
        SEP CALL, A(CHKRAM), #AA
        SEP CALL, A(CHKRAM), #55
        SEP CALL, A(UNKILL)
        SEP CALL, A(FLATEQ)
        SEP CALL, A(WAIT), #00000400  ..Pwr-up wait
        SEP RETN
FLATEQ: SEP CALL, A(ZLNLVL)
        LDI #07     ..Set for 7 stations
        PLO RECSTA
  FL01: DEC RECSTA  ..Next station = STA
        SEP CALL, A(NOMDLA)
        SEP CALL, A(UNITAP), #08
        GLO RECSTA
        BNZ FL01    ..Loop back if more stations
        SEP CALL, A(STATE), #FB
            ..EQUALIZER FLAT LED on, others off
        SEP CALL, A(DATDOG), #01
        SEP RETN
UNITAP: LDA PARPOI  ..Push Unitapnumb
        STXD
        SEP CALL, A(PT2TAP)
```

```
         LDI  #20    ..Set to zero 32 bytes
         PLO  CNTO
UTP1:    LDI  #00    ..Next tap; Zero it
         STR  PT2
         DEC  PT2
         DEC  CNTO
         GLO  CNTO
         BNZ  UTP1   ..Loop back if more bytes
         SEP  CALL, A(PT2TAP)
         INC  STKPOI ..Pop Unitapnumb
         LDN  STKPOI
         SHL         ..Double it, since 2 bytes/tap
         STR  STKPOI
         GLO  PT2    ..16-bit subtraction to offset PT2
         SM
         PLO  PT2
         GHI  PT2
         SMBI #00
         PHI  PT2
         LDI  #FF    ..Make the selected tap "unity"
         STR  PT2
         SEP  CALL, A(DMPTAP)
         SEP  RETN
NOMDLA:  GLO  RECSTA ..PT0 to Flat Delay for STA
         ADI  #80
         PLO  PT0
         LDI  #2F
         PHI  PT0
         LDI  #07    ..Set = #07 --> 2048 musec.
         STR  PT0
         SEP  CALL, A(DMPDLA)
         SEP  RETN
DMPTAP:  GLO  RECSTA ..PT1 to tap #F sign byte
                     ..in RAM for STA
         SHL
         SHL
         SHL
         SHL
         SHL
         ADI  #80
         PLO  PT1
         LDI  #00
         ADCI #2E
         PHI  PT1
         LDI  #3F    ..PT0 to tap #F sign bit
                     ..on PE card for STA
         PLO  PT0
         GLO  RECSTA
         ADI  #40
         PHI  PT0
         LDI  #20    ..Set to copy 32 bytes
         PLO  CNTO
         SEX  PT0
DTP1:    LDA  PT1    ..Next byte
         STXD
         DEC  CNTO
         GLO  CNTO
         BNZ  DTP1   ..Loop back if more bytes
         SEP  RETN
DMPDLA:  GLO  RECSTA ..PT0 to Flat Delay
                     ..in RAM for STA
         ADI  #80
         PLO  PT0
         LDI  #2F
         PHI  PT0
```

```
               GLO RECSTA   ..PT1 to Flat Delay
                            ..on PE card for STA
               ADI #40
               PHI PT1
               LDI #40
               PLO PT1
               LDN PT0    ..Copy the Flat Delay
               STR PT1
               SEP RETN
       EQLIZE: SEP CALL, A(UNKILL)  ..Clean slate of bad sta's
               SEP CALL, A(GETREF)
               GHI RECSTA   ..Exit if only 1 sta. left
                            ..with still no reference
               BNZ EQL2
         EQL1: LDI #0B   ..PT3 to the number of base
                         ..stations in this system
               PHI PT3
               LDI #F0
               PLO PT3
               INC RECSTA   ..Next STA
               GLO RECSTA   ..Does this STA exist in sys?
               SEX PT3
               SD
               SMI #01
               BNF EQL2   ..Exit if not
               SEP CALL, A(EQLSTA)
               BR EQL1
         EQL2: SEP RETN
       GETREF: LDI #00   ..First, try STA=0
               PLO RECSTA
         GRF1: SEP CALL, A(DATDOG), #02
               SEP CALL, A(PLTEST)
               GHI RECSTA
               BNZ GRFN   ..Br if "PL" broke
               SEP CALL, A(LEVEL)   .."PL" OK.
               GHI RECSTA   ..Test OK?
               BZ GRF3   ..Br if test OK
         GRFN: INC RECSTA   ..No good; Try next STA
               LDI #0B   ..PT3 to the number of base
                         ..stations in this system
               PHI PT3
               LDI #F0
               PLO PT3
               SEX PT3   ..More than 1 sta. left?
               GLO RECSTA
               SD
               SMI #02
               BDF GRF1
         GRF2: SEP CALL, A(DATDOG), #03   ..Only 1 left
               SEP RETN
         GRF3: SEP CALL, A(MEMOVE), #2E00, #40, #2E40
                         ..Test OK
               SEP CALL, A(DATDOG), #07
               SEP RETN
       END
               b800t$$
               ..>EQUAL-K1.1
               ..Equalizer Computer, 3/8/82
               ..2nd half of 1st Kolobyte
               ..
               ORG#0200
               DATDOG=#00C9
               CKTONE=#0B50
               SAMPLE=#0934
               SETIMR=#006B
               TICK=#0084
```

```
AVGSUB=#08B0
CKSAMP=#0A59
STATE=#00F3
WAIT=#0054
CNT0=0
CNT1=1
STKPOI=2
PGMCNT=3
CALL=4
RETN=5
PARPOI=6
RECSTA=7
CNT2=8
CNT3=9
PT0=#0A
PT1=#0B
PT2=#0C
PT3=#0D
PASS=#0E
ACC=#0F
TSTSTA: LDI  #09   ..Set for 9 tries
        PLO  CNT3
  TSA1: SEP  CALL, A(IMPULS)  .. Next try
        GHI  RECSTA
        BNZ  TSA2
        SEP  RETN   ..Test successful
  TSA2: DEC  CNT3   ..Test No good
        GLO  CNT3
        BZ   TSA3
        SEP  CALL, A(WAIT), #00001400
        BR   TSA1   .. Try again
  TSA3: SEP  CALL, A(DATDOG), #11
        SEP  RETN
IMPULS: SEP  CALL, A(NPLKEY)
        BN4  IMPULS..Try again if lost ECA
        SEP  CALL, A(CHKSQL)
        GHI  RECSTA
        BNZ  IMP1
        SEP  CALL, A(SAMPLE)
        SEP  CALL, A(UNKEY)
        GHI  RECSTA  ..Check if SAMPLE was aborted
        BNZ  IMPULS  ..Try again if yes
        SEP  CALL, A(STATE), #EF
        .. COMPUTING LED on, others off
        SEP  CALL, A(AVGSUB)
        SEP  CALL, A(CKSAMP)
        SEP  CALL, A(STATE), #FF  ..All LED's off
        SEP  RETN
  IMP1: SEP  CALL, A(UNKEY)  ..Base monitor
                    ..receiver didn't unsquelch
        SEP  RETN
 UNKEY: SEP  CALL, A(UNMUTE)
        SEX  PGMCNT  ..PIO Group Select
        OUT  1, #08
        SEX  STKPOI  ..Read in LED states
        INP  6
        ORI  #0B   ..Set TRANSMITTING, TRQ and
                   ..IRQ = False
        STR  STKPOI
        OUT  6
        DEC  STKPOI
        SEP  RETN
UNMUTE: LDI  #08   ..Set for 8 stations
        PLO  CNT0
        LDI  #80   ..PT0.0 to PE cards' mute gates
        PLO  PT0
```

```
              LDI  #2F    ..PT1.1 to Station Killed Flags
              PHI  PT1
     UNM1:    DEC  CNT0   ..Next station
              GLO  CNT0
              ADI  #88    ..PT1.0 to Klld. Flag, this sta.
              PLO  PT1
              LDN  PT1    ..Is station killed?
              BNZ  UNM2
              GLO  CNT0   ..No, then unmute it
              ADI  #40    ..PT0.1 to this sta's FE card
              PHI  PT0
              LDI  #00
              STR  PT0
     UNM2:    GLO  CNT0   ..Yes, try next station
              BNZ  UNM1
              SEP  RETN
    NFLKEY:   SEP  CALL, A(STATE), #FE   ..Set IRQ = true
      NPK1:   BN4  NPK1   ..Wait here for Scheduler ECA
              SEP  CALL, A(STATE), #F6
                          ..Set IRQ and TRANSMITTING = true
              SEP  CALL, A(MUTE)
              SEP  RETN
    ORG#0290
    CHKROM:   LDI  #0C    ..Point to top of 3KB ROM + 1 B.
                          ..Comment out the next three instructions
                          ..to activate CHKROM after final assembly
              LDI  #00
              PHI  RECSTA
              SEP  RETN
              ..
              PHI  PT0
              LDI  #00
              PLO  PT0
              PHI  RECSTA  ..Zero RECODE
              SEX  PT0
     COM1:    DEC  PT0    ..Next byte
              GHI  RECSTA
              XOR
              PHI  RECSTA
              GLO  PT0    ..Test both bytes of PT0
                          ..to see if done with ROM
              BNZ  COM1
              GHI  PT0
              BNZ  COM1
              GHI  RECSTA  ..Done with whole ROM
              XRI  #FF    ..Complement checksum
              PHI  RECSTA
              BZ   COM2   ..Checksum = 0? (should be)
              SEP  CALL, A(DATDOG), #13  ..Chksm. not= 0
     COM2:    SEP  RETN
    UNKILL:   LDI  #2F    ..PT0 to Klld. Flag for station 7
              PHI  PT0
              LDI  #8F
              PLO  PT0
              LDI  #08    ..Set for 8 stations
              PLO  CNT0
              SEX  PT0
     UNK1:    LDI  #00    ..Next station
              STXD        ..Killed Flag = 0
              DEC  CNT0
              GLO  CNT0
              BNZ  UNK1
              SEP  CALL, A(UNMUTE)
              SEP  RETN
    KILSTA:   LDI  #2F    ..PT0 to Killed Flag for STA
              PHI  PT0
```

```
            GLO  RECSTA
            ADI  #88
            PLO  PT0
            LDI  #80    ..PT1 to PE Card Mute Gate
            PLO  PT1
            GLO  RECSTA ..for STA
            ADI  #40
            PHI  PT1
            LDI  #01    ..Output Mute = true
            STR  PT1    ..to PE Card
            STR  PT0    ..and Killed Flag in RAM
            SEP  CALL, A(DATDOG), #16
            SEP  RETN
ORG#0300
MUTE:       LDI  #08    ..Set for 8 stations
            PLO  CNT0
            LDI  #80    ..PT0.0 to PE cards Mute Gates
            PLO  PT0
            GLO  RECSTA ..Push STA
            STR  STKPOI
            SEX  STKPOI
    MUT1:   DEC  CNT0   ..Next station
            GLO  CNT0
            SD          ..This station = STA?
            BZ   MUT2   ..Skip ahead if yes
            GLO  CNT0   ..No, then mute it
            ADI  #40       ..PT0.1 to this PE card
            PHI  PT0
            LDI  #01
            STR  PT0
    MUT2:   GLO  CNT0
            BNZ  MUT1   ....Loop back if more stations
            SEP  CALL, A(WAIT), #00000400
                 ..for guard-tone detectors to decay and
                 ..unkey the muted transmitters and
                 ..allow the base monitor rcvr RF
                 ..squelch to restabilize.

SEP  RETN
CHKSQL:     LDI  #03    ..Set for 3 tests of the
                        ..RCVR SQUELCHED input line
            PLO  CNT2
            SEX  PGMCNT ..PIO Group Select
            OUT  1, #08
            SEX  STKPOI
    CSQ1:   SEP  CALL, A(WAIT), #00000001  ..Next test
            INP  6      ..Input RCVR SQUELCHED
            SHL
            SHL
            BNF  CSQ2   ..Exit if RCVR SQLCHD. = true
            DEC  CNT2
            GLO  CNT2
            BNZ  CSQ1   ..Loop back if 3 tests not done
            LDI  #00    ..OK, unsquelched all 8 times
            PHI  RECSTA
            SEP  RETN
    CSQ2:   SEP  CALL, A(DATDOG), #04
                 ..Receiver was squelched, no good
            LDI  #01
            PHI  RECSTA
            SEP  RETN
SLEEP:      SEP  CALL, A(STATE), #DF
                 ..Set SLEEPING=true, other LED's false
            SEP  CALL, A(SETIMR), #01499700
                        ..(6 hours)
```

```
SLP1:   SEP CALL, A(TICK)
        BNF SLP2       ..Exit if time out
        SEX PGMCNT     ..PIO Group Select
        OUT 1, #08
        SEX STKPOI
        INP 6          ..Input WAKEUP (Switch)
        INP 6
        SHL
        BDF SLP1       ..Loop back if WAKEUP = False
SLP2:   SEP CALL, A(WAIT), #00000200  ..Debounce
        SEP RETN
ORG#0375
CHKRAM: SEX PT2
        LDI #2F        ..Point to near-top of the
                       ..RAM (don't touch Stack)
        PHI PT2
        LDI #EF
        PLO PT2
        LDI #0F        ..Set for #0FF0 bytes
        PHI CNT3
        LDI #F0
        PLO CNT3
CAM1:   LDN PARPOI     ..Next byte, set test byte
        STR PT2        ..Write to RAM
        XOR            ..Read it back & check
        BNZ CAM2       ..Jump out if RAM error found
        DEC PT2
        DEC CNT3
        GHI CNT3
        BNZ CAM1       ..Loop back if more RAM
        GLO CNT3
        BNZ CAM1
        INC PARPOI     ..All RAM is OK
        LDI #00
        PHI RECSTA
        SEP CALL, A(DATDOG), #14
        SEP RETN
CAM2:   INC PARPOI     ..RAM error has been found
        GHI PT2        ..A.1(bad byte) to RECODE
        PHI RECSTA
        SEP CALL, A(DATDOG), #15
        SEP RETN
PLKEY:  SEP CALL, A(STATE), #FD
               ..Set TRQ = true, other LED's = false
PLK1:   BN4 PLK1       ..Wait here for Scheduler ECA
        SEP CALL, A(STATE), #F5
               ..Set TRQ and TRANSMITTING LED's true
        SEP CALL, A(MUTE)
        SEP RETN
PLTEST: LDI #03        ..Set for 3 tries
        PLO CNT3
PLT0:   SEP CALL, A(PLKEY)  ..Next try
        SEP CALL, A(CHKSQL)
        GHI RECSTA
        BNZ PLT1
        SEP CALL, A(SAMPPL)
        SEP CALL, A(UNKEY)
        SEP CALL, A(CKTONE)
        GHI RECSTA
        BNZ PLT1
        SEP RETN
PLT1:   SEP CALL, A(UNKEY)  ..Base monitor
                       ..receiver didn't unsquelch
                       ..or "PL" encoder broke
        SEP CALL, A(WAIT), #00001400
        DEC CNT3
```

```
        GLO CNT3
        BNZ PLT0
        GHI RECSTA    ..failed 3 times
        SMI #03
        BNZ PLT2      ..Br if Problem was No-unsquelch
        SEP CALL, A(KILSTA)   ..Problem was No "PL"
PLT2:   SEP RETN
SAMPPL: SEP RETN
END
b800t$$
..>EQUAL-k2.0
..Equalizer Computer, 3/29/82
..1st half of 2nd kilobyte
..
ORG#0400
DMPLLV=#0CC8
DMPTAP=#0176
COST=#0AC0
PLTEST=#03AE
STPDSC=#0C00
YANDF=#0B00
STATE=#00F3
DATDOG=#00C9
TSTSTA=#0200
ADJTAP=#0682
DIVS2C=#0845
CORREL=#0600
DMPDLA=#0196
CNT0=0
CNT1=1
STKPOI=2
PGMCNT=3
CALL=4
RETN=5
PARPOI=6
RECSTA=7
CNT2=8
CNT3=9
PT0=#0A
PT1=#0B
PT2=#0C
PT3=#0D
PASS=#0E
ACC=#0F
EQLSTA: SEP CALL, A(DATDOG), #08
        SEP CALL, A(PLTEST)
        GHI RECSTA
        BNZ EQS1      ..Abort if "PL" encoder broke
        SEP CALL, A(LEVEL)
        SEP CALL, A(STATE), #FF   ..All LED's off
        GHI RECSTA
        BNZ EQS1      ..Abort if untestable
        SEP CALL, A(DELAY)
        SEP CALL, A(STATE), #FF   ..All LED's off
        GHI RECSTA
        BNZ EQS1      ..Abort if Flat Delay could
                      ..not be adjusted
        SEP CALL, A(TAPS)
        SEP CALL, A(STATE), #FF   ..All LED's off
EQS1:   SEP RETN
ORG#0428
LEVEL:  LDI #0A       ..Set for 10 check/adjusts;
        STXD          ..Push Count
        SEP CALL, A(TSTSTA)
        GHI RECSTA
        BNZ LVL3      ..Exit if Test was aborted
```

```
LVL1:   SEP CALL, A(STATE), #EF
                ..Next check/adjust
                ..COMPUTING LED on, others off
        SEP CALL, A(CHKLVL)
        GHI RECSTA
        BZ LVL3   ..Exit if Level OK
        IRX       ..Decrement (chk./adj.) Count
        LDX
        SMI #01
        STXD
        BZ LVL2   ..Exit if 10 check/adjusts done
        SEP CALL, A(ADJLVL)
        SEP CALL, A(TSTSTA)
        GHI RECSTA
        BNZ LVL3  ..Exit if Test was aborted
        DEC CNT3
        BR LVL1   ..Go back & recheck adjusted
                            ..Level
LVL2:   SEP CALL, A(DATDOG), #0E
                ..Level not adjustable to tolerance
        LDI #01
        PHI RECSTA
LVL3:   IRX   ..Pop Count
        SEP RETN
CHKLVL: SEP CALL, A(FINDPK), #2E00, #40
                                ..of w(k)
        GHI RECSTA  ..Test absolute peak found
        SMI #50
        BNF CLV1
        GHI RECSTA  ..Abs pk > #4F
        SMI #74
        BNF CLV2
        LDI #06   ..Abs pk > #73
        PHI RECSTA ..#06 to RECODE
        SEP CALL, A(DATDOG), #06
        SEP RETN
CLV1:   LDI #03   ..Abs pk < #50:
        PHI ACC      ..#0368/(Abs pk) to RECODE
        LDI #68
        PLO ACC
        SEP CALL, A(DIVS2C)
        SEP CALL, A(DATDOG), #05
        SEP RETN
CLV2:   LDI #00   ..#4F > (Abs pk) > #74
        PHI RECSTA
        SEP CALL, A(DATDOG), #18
        SEP RETN
ADJLVL: SEX PGMCNT  ..MDU I/O Group Select
        OUT 1, #01
        SEX STKPOI
        SEP CALL, A(PT2TAP)
        LDI #10   ..Set to check 16 taps
            ..for possible overflow
        PLO CNT0
ALV1:   SEP CALL, A(MULTAP)  ..Next tap
        BDF ALV3  ..Abort if an overflow
        DEC PT2   ..No overflow; Skip sign byte
        DEC PT2   ..PT2 to next (old) mastd.
        DEC CNT0
        GLO CNT0
        BNZ ALV1  ..Loop back if more taps
        SEP CALL, A(PT2TAP)  ..No possible overflow
        ..on any tap; Set for scaling taps
        LDI #10  ..16 of them
        PLO CNT0
ALV2:   SEP CALL, A(MULTAP)  ..Next tap
```

```
              GLO PASS    ..Store scaled tap coefficient
              STR PT2
              DEC PT2    ..Skip sign byte
              DEC PT2    ..PT2 to next (old) mastd.
              DEC CNT0
              GLO CNT0
              BNZ ALV2   ..Loop back if more taps
              SEP CALL, A(DMPTAP)
              SEP RETN
     ALV3:    SEP CALL, A(ADDLLV)
              SEP RETN
     ADDLLV:  GLO RECSTA  ..PT2 to Line Leveler Gain for STA
              ADI #90
              PLO PT2
              LDI #2F
              PHI PT2
              LDN PT2    ..Get, increment & re-store
              ADI #01
              STR PT2
              SMI #08    ..Check for overflow
              BNZ ADE1
              LDI #07    ..Overflow; Saturate at 7
              STR PT2
     ADE1:    LDN PT2    ..Store LLGain for DATDOG
              PHI RECSTA
              SEP CALL, A(DMPLLV)
              SEP CALL, A(DATDOG), #19
              SEP RETN
     MULTAP:  LDI #72    ..Push "Divide" command
              STXD
              LDI #08    ..Push the constant #08
              STXD
              LDI #70    ..Push "Reset" command
              STXD
              LDI #79    ..Push "Multiply" command
              STXD
              LDN PT2    ..Push old tap magnitude
              STXD
              GHI RECSTA ..Push Factor
              STXD
              LDI #70    ..Push "Reset" command
              STR STKPOI
              OUT 7      .."Reset" to Control Res.
              OUT 5      ..Factor to Res. Z
              OUT 4      ..old tap magnitude to Res. Y
              OUT 7      .."Multiply" to Control Res.
              OUT 7      .."Reset" to Control Res.
              OUT 4      ..Constant #08 to Res. X
              OUT 7      .."Divide" to Control Res.
              DEC STKPOI ..Input Divide Overflow flag
              INP 7
              SHR        ..To DF
              INP 5      ..Input quotient
              PLO PASS   ..To PASS.0
              SEP RETN
     ORG#04F0
     PT2TAP:  GLO RECSTA
              SHL
              SHL
              SHL
              SHL
              ADI #9F
              PLO PT2
              LDI #00
              ADCI #2E
```

```
                PHI PT2
                SEP RETN
ORG#0500
FINDPK:         LDA PARPOI    ..PTO to bottom entry of
                              ..the array to be searched
                PHI PT0
                LDA PARPOI
                PLO PT0
                LDA PARPOI    ..Set dimension (number of
                              ..array entires) to be searched
                PLO CNT0
                LDI #00       ..Initialize Absolute Peak = 0
                PHI RECSTA
   FPK1:        LDN PT0       ..Next entry, test sign bit
                SHL
                LDN PT0
                BNF FPK2      ..Skip ahead if positive
                SDI #00       ..Entry negative, so negate
   FPK2:        STR STKPOI    ..Test magtd. of this entry
                GHI RECSTA
                SM
                BDF FPK3      ..Skip ahead if this magtd.
                              ..not > Abs. Pk.
                LDN STKPOI    ..This magtd. > Abs. Pk.
                              ..so, replace Abs. Pk.
                PHI RECSTA
                GHI PT0       ..Put its address in ACC
                PHI ACC
                GLO PT0
                PLO ACC
   FPK3:        DEC CNT0
                INC PT0
                GLO CNT0
                BNZ FPK1      ..Loop back if more entries
                SEP RETN
DELAY:          LDI #03       ..Set for 3 check/adjusts
                STXD          ..Push Count
   DLA1:        SEP CALL, A(STATE), #EF
                              ..Next Check/adjust
                          ..COMPUTING LED on, others off
                SEP CALL, A(CHKDLA)
                GHI RECSTA
                BZ DLA4       ..Exit if Flat Delay is OK
                IRX           ..Decrement (chk./adj.) Count
                LDX
                SMI #01
                STXD
                BZ DLA3       ..Exit if Flat Delay is still
                              ..not OK after 3 check/adjusts
                SEP CALL, A(ADJDLA)   ..Flat Delay not OK
                SEP CALL, A(TSTSTA)
                GHI RECSTA
                BNZ DLA3      ..Exit if Test was aborted
                DEC CNT3
                BR DLA1       ..Go back & recheck Flat Delay
   DLA2:        SEP CALL, A(DATDOG), #0F
   DLA3:        LDI #01
                PHI RECSTA
   DLA4:        IRX           ..Pop Count
                SEP RETN
CHKDLA:         SEP CALL, A(CORREL), #40   ..Calc x(k)
                , #29C0, #2E00, #2E40, #20
                SEP CALL, A(FINDPK), #29C0, #40
                              ..Calc P(x); to RECODE
                GLO ACC
                SDI #FF
```

```
            PHI RECSTA
            SEP CALL, A(DATDOG), #0A
            GHI RECSTA   ..Calc & push H
            SHR
            SMI #10
            STR STKPOI
            BDF CDL1    ..Test sign of H, skip ahead
                                ..if > or = 0
            SDI #00     ..H < 0, so negate it
    CDL1:   SDI #01     ..Test if H is within
                                ..deadband of +/- 1 unit
            BDF CDL2
            LDN STKPOI  ..Outside deadband, put
                                ..H in RECODE
            PHI RECSTA
            SEP RETN
    CDL2:   LDI #00     ..Within deadband, so zero it
            PHI RECSTA
            SEP RETN
  ADJDLA:   GLO RECSTA  ..PTO to Flat Delay = F(STA)
            ADI #80
            PLO PTO
            LDI #2F
            PHI PTO
            SEX PTO
            GHI RECSTA  ..Calc & push F' = F + H
            ADD
            STR STKPOI
            BZ ADL1     ..Test and skip up if 0
            SHL         ..Test and skip up if < 0
            BDF ADL1
            LDN STKPOI  ..Positive, test if > #F
            ANI #F0
            BNZ ADL2
            LDN STKPOI  .. 0 < F' < #10; OK, set it
            BR ADL3
    ADL1:   LDI #01     ..F' < 1, So saturate at #01
            BR ADL3
    ADL2:   LDI #0F     ..F' > #F; So saturate at #0F
    ADL3:   STR PTO     ..Store F' in RAM,
            PHI RECSTA  ..and in RECODE
            SEP CALL, A(DMPDLA)
            SEP CALL, A(DATDOG), #0B
            SEP RETN
    TAPS:   LDI #18     ..Set for 24 adj./chks.; Push Count
            STXD
            SEP CALL, A(STATE), #EF
                ..COMPUTING LED on, others off
            SEP CALL, A(COST)
            GHI RECSTA
            STXD        ..Push J
            BZ TAP5     ..Exit if "cost"=J=0
            SMI #01
            BZ TAP5     ..Exit if J = 1
            SMI #01
            BZ TAP5     ..Exit if J = 2
            SEP CALL, A(YANDF)   .. J > 2; Adjust
            GHI RECSTA
            BNZ TAP4    ..Exit if unable to set y
    TAP1:   SEP CALL, A(STATE), #EF
                ..Next Check/Adjust
                ..COMPUTING LED on, others off
            IRX         ..Get J again
            LDX
            SMI #10
            DEC STKPOI
```

```
            BDF  TAP2    ..Skip up if J > #0F ("high")
            SEP  CALL, A(ADJTAP)  ..Cost low; Only
               ..do 1 iteration before retesting.
            BR   TAP3
     TAP2:  SEP  CALL, A(STPDSC)  ..Cost high: Do 5
               ..iterations with simulated impulse
               ..response after each.
     TAP3:  SEP  CALL, A(TSTSTA)
            GHI  RECSTA
            BNZ  TAP4    ..Exit if Test was aborted
            SEP  CALL, A(STATE), #EF
               ..COMPUTING LED on, others off
            SEP  CALL, A(COST)
            GHI  RECSTA
            BZ   TAP5    ..Exit if J=0 after adjustment
            IRX          ..Push new J
            STR  STKPOI
            IRX          ..Decrement (chk./adj.) Count
            LDX
            SMI  #01
            STXD
            DEC  STKPOI
            BNZ  TAP1    ..Adjust/check again if it
                         ..hasn't been done 8 times yet
            SEP  CALL, A(DATDOG), #10  ..After 8
                         ..adjust/checks, still J not = 0
     TAP4:  IRX          ..Pop J
            IRX          ..Pop Count
            LDI  #01
            PHI  RECSTA
            SEP  RETN
     TAP5:  IRX          ..Pop J
            IRX          ..Pop Count
            LDI  #00
            PHI  RECSTA
            SEP  RETN
END
BOOT$$
..>EQUAL-K2.1
..Equalizer Computer, 3/29/82
..2nd half of 2nd Kilobyte
..
ORG#0600
DATDOG=#00C9
DMPTAP=#0176
INNPRD=#0C20
INPARA=#0D00
MULS2C=#0800
PASACC=#0D57
PT2YSC=#0D50
DIVS2C=#0845
UNDFLO=#0AF5
STEPSZ=#0A00
SATRAT=#09B0
WAIT=#0054
CNT0=0
CNT1=1
STKPOI=2
PGMCNT=3
CALL=4
RETN=5
PARPOI=6
RECSTA=7
CNT2=8
CNT3=9
PT0=#0A
```

```
PT1=#0B
PT2=#0C
PT3=#0D
PASS=#0E
ACC=#0F
CORREL:  LDA PARPOI    ..Set for M output entries
         PLO CNT1
         LDA PARPOI    ..PT2 to c(#3F)
         PHI PT2
         LDA PARPOI
         PLO PT2
  COR1:  DEC CNT1      ..Next j; Initialize
         LDI #00
         PHI ACC
         PLO ACC
         LDA PARPOI    ..PT0 to a(#3F)
         PHI PT0
         LDA PARPOI
         PLO PT0
         LDA PARPOI    ..PT1 to b(#3F)
         PHI PT1
         LDA PARPOI
         PLO PT1
         SEX PARPOI    ..Calc Q-j
         GLO CNT1
         SD
         SEX STKPOI
         DEC PARPOI    ..PARPOI back to a(#3F)
         DEC PARPOI
         DEC PARPOI
         DEC PARPOI
         BDF COR2      ..Skip up if j < Q+1
         SDI #00       ..j>Q; So add (j-Q) to PT0
         STR STKPOI
         GLO PT0
         ADD
         PLO PT0
         GHI PT0
         ADCI #00
         PHI PT0
         BR COR3
  COR2:  STR STKPOI    ..j<Q+1; So add (Q-j) to PT1
         GLO PT1
         ADD
         PLO PT1
         GHI PT1
         ADCI #00
         PHI PT1
  COR3:  LDI #40       ..Set for Dimension of inner
                       ..product = #40 - Absvalue(Q-j)
         SM
         PLO CNT0
         SEP CALL, A(INNPRD), #FF
         SEP CALL, A(SATRAT)
         GHI RECSTA    ..Store c(j)
         STR PT2
         INC PT2
         GLO CNT1
         BNZ COR1      ..Loop back if j>0
         INC PARPOI    ..Pass up parms.
         INC PARPOI
         INC PARPOI
         INC PARPOI
         INC PARPOI
         SEP RETN
SUBARA:  LDA PARPOI    ..Set for M elements
```

```
              PLO CNT0
              LDA PARPOI    ..PT2 to c(#3F)
              PHI PT2
              LDA PARPOI
              PLO PT2
              LDA PARPOI    ..PT1 to a(#3F)
              PHI PT1
              LDA PARPOI
              PLO PT1
              LDA PARPOI    ..PT0 to b(#3F)
              PHI PT0
              LDA PARPOI
              PLO PT0
      SUB1:   LDN PT1       ..Next entry, j
              SHL
              BDF SUB2      ..Test sign of a(j)
              LDI #00       ..a(j)>-1;
              STXD          ..Push a(j).1 = #00
              BR SUB3
      SUB2:   LDI #FF       ..a(j)<0;
              STXD          ..Push a(j).1 = #FF
      SUB3:   LDA PT1       ..Push a(j).0
              STR STKPOI
              LDN PT0
              SHL
              BDF SUB4      ..Test sign of b(j)
              LDI #00       ..b(j)>-1;
              PHI ACC       ..Put b(j).1 = #00
              BR SUB5
      SUB4:   LDI #FF       ..b(j)<0;
              PHI ACC       ..Put b(j).1 = #FF
      SUB5:   LDA PT0       ..16-bit subtraction:
              SD
              PLO ACC
              INC STKPOI
              GHI ACC
              SDB
              PHI ACC
              SEP CALL, A(SATRAT)
              GHI RECSTA
              STR PT2       ..Store c(j)
              INC PT2
              DEC CNT0
              GLO CNT0
              BNZ SUB1      ..Loop back if more entries
              SEP RETN
    ADJTAP:   SEP CALL, A(CORREL), #10   ..Calc g(k)
              , #2920, #2980, #2E00, #00
              SEP CALL, A(SUBARA), #10   ..Calc z(k)
              , #2910, #2920, #2930
              SEP CALL, A(CONVYZ)        ..Calc u(k)
              SEP CALL, A(CORREL), #10   ..Calc a(k)
              , #28C0, #2980 ,#28D0, #00
              SEP CALL, A(INPARA)        ..Calc (z,z)
              , #2910, #2910, #10
              SEP CALL, A(UNDFLO)
              ..Multiply. (z,z) by scale factor #10=gamma
              ..implemented by a loop of 4 left-shifts:
              LDI #00
              STR STKPOI
              LDI #04              ..Set to SHL 4 times
              PLO CNT2
    AJT1:     GLO ACC       ..Next shift
              SHL
              PLO ACC
              GHI ACC
              SHLC
```

```
               PHI  ACC
               LDN  STKPOI
               SHLC
               STR  STKPOI
               DEC  CNT2
               GLO  CNT2
               BNZ  AJT1          ..Loop back if more
                                  ..shifts
               LDI  #28    ..Store #10*(z,z) (3 bytes);
                           ..PT2 to Work Area in RAM
               PHI  PT2
               LDI  #AF
               PLO  PT2
               SEX  PT2
               LDN  STKPOI
               STXD
               GHI  ACC
               STXD
               GLO  ACC
               STXD
               SEP  CALL, A(INPARA)   ..Calc (a,z)
               , #2910, #28C0, #10
               SEP  CALL, A(UNDFLO)
               SEP  CALL, A(STEPSZ)
               SEP  CALL, A(UNSCAL)
               GHI  RECSTA  ..Calc c = -#10*(z,z)/(a,z)
               SDI  #00
               PHI  RECSTA
               SEP  CALL, A(PERTRB)
               SEP  CALL, A(DMPTAP)
               SEP  RETN
       PERTRB: GHI  RECSTA  ..Push c
               STXD
               LDI  #10    ..Set for 16 taps, h(j)
               PLO  CNT1
               GLO  RECSTA  ..PT0 to sign byte of h(#F)
               SHL
               SHL
               SHL
               SHL
               SHL
               ADI  #80
               PLO  PT0
               LDI  #00
               ADCI #2E
               PHI  PT0
               SEP  CALL, A(PT2YSC)
               LDI  #29    ..PT1 to z(#F)
               PHI  PT1
               LDI  #10
               PLO  PT1
               LDI  #28    ..PT3 to t(#F)
               PHI  PT3
               LDI  #B0
               PLO  PT3
               INC  STKPOI  ..to c
         PTB1: LDX          ..Next tap:
               PHI  RECSTA  ..Load c as one multip-
                                      ..licand
               DEC  STKPOI
               LDA  PT1    ..Load z(j) as the other
                                      ..multiplicand
               PLO  PASS
               SEP  CALL, A(MULS2C)
               ..Calc p(j); Load c*z(j) as dividend
               SEP  CALL, A(PASACC)
```

```
       LDI #20
       PHI RECSTA  ..Divide by twice gamma
       SEP CALL, A(DIVS2C)
       LDI #02     ..Double
       PLO PASS
       SEP CALL, A(MULS2C)
       GLO PASS    ..Push p(j)
       STXD
       GHI PASS
       STR STKPOI
          ..Sign byte = #01 interpreted h(j)<0
          ..Sign byte = #00 interpreted h(j)>0
PTB3:  LDA PT0     ..Test sign of h(j)
       SHR
       LDN PT0     ..Load h(j) magnitude
       BNF PTB4    ..Skip ahead if h(j)>0
       SDI #00     ..h(j)<0, negate magnitude
PTB4:  PLO ACC     ..h(j).0 to ACC.0
       DEC PT0     ..Get sign of h(j) again
       LDN PT0
       SHR
       BDF PTB5
       LDI #00     ..h(j)>0; h(j).1=#00 to ACC.1
       PHI ACC
       BR PTB6
PTB5:  LDI #FF     ..h(j)<0, h(j).1=#FF to ACC.1
       PHI ACC
PTB6:  INC STKPOI
          .. At this point, h(j) is a signed 2's-
          .. complement 16-bit number in ACC and
          .. p(j) is a signed 2's-complement 16-
          .. bit number on the stack. The next
          .. step is a 16-bit addition of them:
       GLO ACC
       ADD
       PLO ACC
       STXD
       GHI ACC
       ADC
       PHI ACC
       STXD
       LDI #02     ..Calc t(j) = h'(j)/2/yscale
          ..(with yscale normalized to 127=#7F)
       PHI RECSTA
       SEP CALL, A(DIVS2C)
       LDI #7F
       PLO PASS
       SEP CALL, A(MULS2C)
       SEP CALL, A(PASACC)
       LDN PT2     ..load yscale
       PHI RECSTA
       SEP CALL, A(DIVS2C)
       GHI RECSTA  ..Store t(j)
       STR PT3
       INC STKPOI
       LDXA        ..Test bit 9 of sum
       PHI ACC
       LDXA
       PLO ACC
       GHI ACC
       ANI #FE
       BNZ PTB7
       LDI #00     ..b9=0, so h'(j)>0
       STR PT0     ..Update sign byte
       GHI ACC
       BZ PTB9     ..Skip ahead if no overflow
```

```
            LDI  #FF      ..h'(j)>#FF; Saturate it
            PLO  ACC
            BR   PTB9
    PTB7:   LDI  #01      ..b9=1, so h'(j)<0
            STR  PT0
            GHI  ACC
            XRI  #FF      ..Complement
            BZ   PTB8     ..Skip ahead if no overflow
            LDI  #FF      ..h'(j)<-#FF; Saturate it
            PLO  ACC
            BR   PTB9
    PTB8:   GLO  ACC      ..Negate h'(j).0 to get magtd.
            SDI  #00
            PLO  ACC
    PTB9:   INC  PT0      ..Update tap magnitude
            GLO  ACC
            STR  PT0
            INC  PT0      ..PT0 to next tap, sign byte
            INC  PT3      ..PT3 to t(j-1)
            DEC  CNT1
            GLO  CNT1
            BNZ  PTB1     ..Loop back if more taps
            SEP  RETN
    CONVYZ: LDI  #40      ..Set for 64 output entries
            PLO  CNT1
            LDI  #28      ..PT2 to u(#3F)
            PHI  PT2
            LDI  #D0
            PLO  PT2
    CON1:   DEC  CNT1     ..Next i; Test
            GLO  CNT1
            SMI  #10
            BNF  CON2
            GLO  CNT1     ..i>#F, PT1 to y(i-#F)
            SDI  #CE
            PLO  PT1
            LDI  #00
            SDBI #29
            PHI  PT1
            LDI  #29      ..PT0 to z(#F)
            PHI  PT0
            LDI  #10
            PLO  PT0
            PLO  CNT0     ..Set inner product dimension
                          ..    = #10
            BR   CON3
    CON2:   LDI  #29      ..i<#10; PT1 to y(0)
            PHI  PT1
            LDI  #BF
            PLO  PT1
            GLO  CNT1     ..PT0 to z(i)
            SDI  #1F
            PLO  PT0
            LDI  #00
            SDBI #29
            PHI  PT0
            GLO  CNT1     ..Set inner product dimension
                          ..    = i+1
            PLO  CNT0
            INC  CNT0
    CON3:   SEP  CALL, A(INNPRD), #00
            SEP  CALL, A(SATRAT)
            GHI  RECSTA
            STR  PT2      ..Store u(i)
            INC  PT2
            GLO  CNT1
```

```
                BNZ  CON1     ..Loop back if i>0
                SEP  RETN
UNSCAL:         SEP  CALL, A(PT2YSC)
                LDN  PT2
                PLO  PASS
                SEP  CALL, A(MULS2C)
                SEP  CALL, A(PASACC)
                LDI  #7F
                PHI  RECSTA
                SEP  CALL, A(DIVS2C)
                SEP  RETN
END
B800T$$
                ..>EQUAL-K3.0
..Equalizer Computer, 3/29/82
..1st half of 3rd Kilobyte
..
ORG#0800
STATE=#00F3
DATDOG=#00C9
CNT0=0
CNT1=1
STKPOI=2
PGMCNT=3
CALL=4
RETN=5
PARPOI=6
RECSTA=7
CNT2=8
CNT3=9
PT0=#0A
PT1=#0B
PT2=#0C
PT3=#0D
PASS=#0E
ACC=#0F
MULS2C:         GHI  RECSTA   ..Test sign of a
                SHL
                BNF  MUL1
                LDI  #FF      ..a<0; Set SIGNFLAG = #FF
                STR  STKPOI
                GHI  RECSTA   ..Calc Absval(a)
                SDI  #00
                BR   MUL2
    MUL1:       LDI  #00      ..a>0; Set SIGNFLAG = #00
                STR  STKPOI
                GHI  RECSTA
    MUL2:       DEC  STKPOI   ..Push SIGNFLAG
                STR  STKPOI   ..Push Absval(a)
                INC  STKPOI   ..STKPOI to SIGNFLAG
                GLO  PASS
                SHL           ..Test sign of b
                BNF  MUL3
                LDX           ..b<0; Complement SIGNFLAG
                XRI  #FF
                STR  STKPOI
                GLO  PASS     ..Calc Absval(b)
                SDI  #00
                BR   MUL4
    MUL3:       GLO  PASS     ..b>0
    MUL4:       DEC  STKPOI
                DEC  STKPOI
                STXD          ..Push Absval(b)
                LDI  #7C      ..Push "Reset" command
                STXD
                LDI  #01      ..Push MDU I/O Group Select
```

```
              STR STKPOI
              OUT 1    .."MDU" to I/O Group Decoders
              OUT 7    .."Reset" to Control Res.
              OUT 4    ..Absval(b) to Res. X
              OUT 5    ..Absval(a) to Res. Z
              DEC STKPOI
              SEX PGMCNT  .."Multiply" command to
                             ..Control Res.
              OUT 7, #79
              SEX STKPOI
              INP 6    ..c to PASS
              PHI PASS
              INP 5
              PLO PASS
              INC STKPOI   ..Recall SIGNFLAG
              LDN STKPOI
              SHL
              BNF MUL5  ..Exit if c>0
              GLO PASS  ..c<0: Negate result
              SDI #00
              PLO PASS
              GHI PASS
              SDBI #00
              PHI PASS
      MUL5:   SEP RETN
      DIVS2C: GHI RECSTA   ..Test sign of a
              SHL
              BNF DIV1
              LDI #FF  ..a<0; Set SIGNFLAG = #FF
              STR STKPOI
              GHI RECSTA  ..Calc Absval(a)
              SDI #00
              BR DIV2
      DIV1:   LDI #00 ..a>0; Set SIGNFLAG = #00
              STR STKPOI
              GHI RECSTA
      DIV2:   DEC STKPOI  ..Push SIGNFLAG
              STR STKPOI  ..Push Absval(a)
              INC STKPOI  ..STKPOI to SIGNFLAG
              GHI ACC
              SHL   ..Test sign of b
              BNF DIV3
              LDX   ..b<0; Complement SIGNFLAG
              XRI #FF
              STR STKPOI
              GLO ACC  ..Calc Absval(b)
              SDI #00
              PLO ACC
              GHI ACC
              SDBI #00
              PHI ACC
      DIV3:   DEC STKPOI  ..STKPOI to Dividend.0
              DEC STKPOI
              GLO ACC  ..Push Dividend
              STXD
              GHI ACC
              STXD
              LDI #7C  ..Push "Reset" command
              STXD
              LDI #01  ..Push MDU I/O Group Select
              STR STKPOI
              OUT 1    .."MDU" to I/O Group Decoders
              OUT 7    .."Reset" to Control Res.
              OUT 6    ..Dividend.1 to Res. Y
              OUT 5    ..Dividend.0 to Res. Z
              OUT 4    ..Divisor to Res. X
```

```
        DEC STKPOI
        SEX PGMCNT    .."Divide" command to
                      ..Control Reg.
        OUT 7, #72
        SEX STKPOI
        INP 7    ..Test for Hardware Overflow
        SHR
        BNF DIV4
        LDI #7F    ..Hardware Overflow; Saturate c
        PHI RECSTA
        BR DIV7
DIV4:   INP 5    ..No Hardware Overflow;
                      ..Input Quotient
DIV5:   PHI RECSTA    ..Store Quotient
        SHL    ..Test for 2's-complement overflow
        BNF DIV6
        LDI #7F    ..Quotient > #7F; Saturate
        PHI RECSTA
        BR DIV7           ..& skip rounding
DIV6:   GHI RECSTA    ..Test if Quotient = #7F
        XRI #7F
        BZ DIV7    ..Skip rounding if yes!
        INP 6    ..Input and push Remainder
        DEC STKPOI
        INP 4    ..Input and halve Divisor
        SHR
        INC STKPOI    ..STKPOI to Remainder
        SM    ..Calc ROUND = (Divisor/2)-Remainder
        BDF DIV7
        GHI RECSTA    ..ROUND < 0;
        ADI #01    ..Round Quotient upward
        PHI RECSTA
DIV7:   INC STKPOI    ..Recall SIGNFLAG
        LDN STKPOI
        BZ DIV8    ..Skip ahead if c > 0
        GHI RECSTA    .. c < 0; Negate result
        SDI #00
        PHI RECSTA
DIV8:   SEP RETN
ORG#03B0
AVGSUB: LDI #40    ..Set for 64 Times
        PLO CNT1
        ..Subaverage = s(l,k);
          .. l=Subaverage index, k=Time index
        LDI #2E    ..PT1 TO w(#00)
        PHI PT1
        LDI #3F
        PLO PT1
        LDI #2D    ..PT0 to s(#3,#00)
        PHI PT0
        LDI #00
        PLO PT0
AVS1:   LDI #04    ..Next k; Set for 4 Subaverages
        PLO CNT0
        LDI #00    ..Initialize total in ACC = 0
        PHI ACC
        PLO ACC
AVS2:   SEX PT0    ..Next l; Add to ACC
        GLO ACC
        ADD
        PLO ACC
        GHI ACC
        ADCI #00
        PHI ACC
        LDN PT0    ..Test sign of s(l,k)
        SHL
```

```
              BNF  AVS3    ..Skip ahead if s(1,k) > 0
              GHI  ACC     ..s(1,k) < 0; Create
              ADI  #FF     ..& add s(1,k).1=#FF
              PHI  ACC
       AVS3:  GLO  PT0     ..PT0 to s(1-1,k)
              ADI  #40
              PLO  PT0
              GHI  PT0
              ADCI #00
              PHI  PT0
              DEC  CNT0
              GLO  CNT0
              BNZ  AVS2    ..Loop back if more Staurses.
              LDI  #04     ..Load divisor for averaging
              PHI  RECSTA
              SEP  CALL, A(DIVS2C)
              GHI  RECSTA
              STR  PT1     ..Store w(k)
              DEC  PT1     ..PT1 to w(k+1)
              GLO  PT0     ..PT0 to s(#F,k+1)
              SMI  #FF
              PLO  PT0
              GHI  PT0
              SMBI #00
              PHI  PT0
              DEC  CNT1
              GLO  CNT1
              BNZ  AVS1    ..Loop back if more Times
              SEP  RETN
ORG#0900
SUBAVG:       LDI  #40     ..Set for 64 Times
              PLO  CNT1
              ..Raw Sample = q(m,k);
                   .. m=Impulse index, k=Time index
              LDI  #20     ..PT0 to q(#1F,#3F)
              PHI  PT0
              LDI  #00
              PLO  PT0
       SBA1:  LDI  #20     ..Next k; Set for 32 Impulses
              PLO  CNT0
              LDI  #00     ..Initialize total in ACC = 0
              PHI  ACC
              PLO  ACC
       SBA2:  SEX  PT0     ..Next m; Add to ACC
              GLO  ACC
              ADD
              PLO  ACC
              GHI  ACC
              ADCI #00
              PHI  ACC
              LDA  PT0     ..Test sign of q(m,k)
                           .. & PT0 to q(m-1,k)
              SHL
              BNF  SBA3    ..Skip ahead if q(m,k) > 0
              GHI  ACC     ..q(m,k) < 0; Create
              ADI  #FF     ..& add q(m,k).1=#FF
              PHI  ACC
       SBA3:  DEC  CNT0
              GLO  CNT0
              BNZ  SBA2    ..Loop back if more Impulses
              LDI  #20     ..Load divisor for averaging
              PHI  RECSTA
              SEP  CALL, A(DIVS2C)
              GHI  RECSTA
              STR  PT3     ..Store s(1,k)
              DEC  PT3     ..PT3 to s(1,k-1)
```

```
                DEC CNT1
                GLO CNT1
                BNZ SBA1    ..Loop back if more Times
                SEP RETN
ORG#0934
SAMPLE: LDI #04     ..Set for 4 sets
                        ..of 32 impulses
                PLO CNT2
                LDI #2D     ..PT3 to s(#00,#3F)
                PHI PT3
                LDI #FF
                PLO PT3
   SAM1:    SEP CALL, A(SAMP32)
                GHI RECSTA  ..Exit if SAMP32 aborted
                BNZ SAM2
                SEP CALL, A(STATE), #E6  ..Set IRQ,
                        ..TRANSMTNG. & COMPTNG. = true
                SEP CALL, A(SUBAVG)
                SEP CALL, A(STATE), #F6  ..Set IRQ
                        .. & TRANSMITTING = true
                DEC CNT2
                GLO CNT2
                BNZ SAM1    ..Loop back if more sets of 32
                LDI #00     ..Done, not aborted
                PHI RECSTA
   SAM2:    SEP RETN
   SAMP32:  SEX PGMCNT  ..IPT I/O Group Select
                OUT 1, #02
                GLO RECSTA  ..PT0 to RPD factor for STA
                        ..in ROM (RPD = Radio Propaga-
                        ..tion Delay, see Sec. 4.20.5.1)
                ADI #F8
                PLO PT0
                LDI #0B
                PHI PT0
                LDI #FF     ..PT1 to A/D Converter
                PHI PT1
                PLO PT1
                LDI #28     ..PT2 to q(#00,#00) + #20 loc'ns
                PHI PT2
                LDI #1F
                PLO PT2
                LDI #20     ..Set for 32 Impulses
                PLO CNT1
   S32A:    SEX PT0     ..Next impulse;
                OUT 2   ..Trigger Impulse Generator
                DEC PT0
                LDI #4F     ..Load timer to tick off 1.9
                        ..milsec., the group delay of the MAC,
                        ..a PE card at minimum Flat Delay (F=1),
                        ..a fast phone line,
                        ..a Micor xmtr and the base monitor rcvr.
                PLO CNT0
   S32G:    DEC CNT0    ..Wait loop, (24 musec./lap)
                GLO CNT0
                BNZ S32G
                LDI #41     ..Set for 64 Times, + 1 to start the
                        ..1st sample while 1 byte garbage is read in
                PLO CNT0
   S32C:    SEQ     ..Start Sample/Hold/Conversion
                LDN PT1     ..Read in previous sample
                XRI #7F     ..Convert from complementary
                        ..offset binary output of ADC0800 chip
                        ..to signed 2's-complement
                STR PT2     ..Store previous sample
                REQ     ..End of Start S/H/C pulse
```

```
            GLO PT2    ..PT2 to q(m,k+1)
            SMI #20
            PLO PT2
            GHI PT2
            SMBI #00
            PHI PT2
            PHI PT2    ..Wait til sample period = 128 musec.
            PHI PT2       ..(=16 instruction cycles)
            DEC CNT0
            GLO CNT0
            BNZ S32C   ..Loop back if more Times
            BN4 S32F   ..Check ECA (from Scheduler)
            DEC CNT1   ..Still Clear-to-Air; Continue
            GLO CNT1
            BZ  S32E   ..Exit if 32 Impulses done
            GLO PT2    ..PT2 to q(m+1,#00) + #20 loc'ns
            ADI #1F
            PLO PT2
            GHI PT2
            ADCI #08
            PHI PT2
            BR  S32A   ..Loop back for next Impulse
    S32E:   LDI #00    ..Completed without loss of ECA
            PHI RECSTA
            SEP RETN
    S32F:   LDI #01    ..Lost ECA; Abort
            PHI RECSTA
            SEP RETN
ORG#09B0
SATRAT: GHI ACC    ..Test sign of ACC
            SHL
            BDF SAT2
            GHI ACC    .. ACC > -1
            BNZ SAT1
            GLO ACC    .. -1 < ACC < #100
            SHL
            BDF SAT1
            BR  SAT4   .. -1 < ACC < #80
    SAT1:   LDI #7F    .. ACC > #7F;  Saturate
            BR  SAT5
    SAT2:   GHI ACC    .. ACC < 0
            XRI #FF
            BNZ SAT3
            GLO ACC    .. -#101 < ACC < 0
            SHL
            BNF SAT3
            BR  SAT4   .. -#81 < ACC < 0
    SAT3:   LDI #80    .. ACC < -#80; Saturate
            BR  SAT5
    SAT4:   GLO ACC    .. -#81 < ACC < #80; (OK!)
    SAT5:   PHI RECSTA ..Result to RECODE
            SEP RETN
END
BOOT$$
..>EQUAL-K3.1
..Equalizer Computer, 3/29/82
..2nd half of 3rd Kilobyte
..
ORG#0A00
STATE=#00F3
DATDOG=#00C9
DIVS2C=#0845
DMPTAP=#016F
INNPRD=#0C20
INFARA=#0D00
MULS2C=#0800
SUBARA=#0643
```

```
TESTY=#0D10
CORREL=#0600
SATRAT=#09B0
CNT0=0
CNT1=1
STKPOI=2
PGMCNT=3
CALL=4
RETN=5
PARPOI=6
RECSTA=7
CNT2=8
CNT3=9
PT0=#0A
PT1=#0B
PT2=#0C
PT3=#0D
PASS=#0E
ACC=#0F
STEPSZ: LDI #28    ..PT0 to #10*(z,z) = Numerator
                   ..      = NMR, > 0, in RAM
        PHI PT0
        LDI #AF
        PLO PT0
        LDI #00    ..Push SIGNFLAG = #00
        STR STKPOI
        GHI ACC    ..Test sign of (a,z) (in ACC)
        ANI #80
        BZ  SSZ1   ..Skip ahead if (a,z) > 0
        GLO ACC    ..(a,z) < 0; Negate
        SDI #00
        PLO ACC
        GHI ACC
        SDBI #00
        PHI ACC
        LDI #FF    .. & set SIGNFLAG = #FF
        STR STKPOI
 SSZ1:  DEC STKPOI ..Save SIGNFLAG
        GHI ACC    ..Test magnitude of (a,z)
        BNZ SSZ2
        LDN PT0    ..Absval(a,z) < #100;
                   ..Test magnitude of NMR
        BNZ SSZ4   ..Skip division if an
                   ..overflow is guaranteed!
        GLO ACC    .. NMR < #1000; Ignore the
                   ..zero highest-order byte of
                   ..both dividend and divisor
        STXD       ..Push operands for dividing
        DEC PT0
        LDN PT0
        STXD
        DEC PT0
        LDN PT0
        STXD
        BR  SSZ3   ..Skip up to Division
 SSZ2:  GHI ACC    ..Absval(a,z) > #FF; Ignore
                   ..the lowest-order byte of
                   ..both dividend and
                   ..divisor
        STXD       ..Push operands for dividing
        LDN PT0
        STXD
        DEC PT0
        LDN PT0
        STXD
 SSZ3:  LDI #70    ..Push "Reset" Command
        STXD
```

```
              LDI #01   ..Push MDU I/O Group Select
              STR STKPOI
              OUT 1     .."MDU" to I/O Group Decoders
              OUT 7     .."Reset" to Control Res.
              OUT 5     ..Dividend.0 to Res. Z
              OUT 6     ..Dividend.1 to Res. Y
              OUT 4     ..Divisor to Res. X
              DEC STKPOI
              SEX PGMCNT .."Divide" command to
                           ..Control Res.
              OUT 7, #72
              SEX STKPOI
              INP 7     ..Test hardware overflow
              BNZ SSZ4  ..Skip ahead if hware. ovrflw.
              INP 5     ..Test if Quotient > #7F
              ANI #80
              BNZ SSZ4  ..Skip ahead if "Yes"
              LDN STKPOI ..Quotient < #80; (OK!)
              PHI RECSTA
              BR SSZ5
       SSZ4:  LDI #7F   ..Quotient > #7F; Saturate
              PHI RECSTA
       SSZ5:  INC STKPOI
              LDN STKPOI ..Recall SIGNFLAG
              BZ SSZ6   ..Exit if positive
              GHI RECSTA ..Negative; Negate Quotient
              SDI #00
              PHI RECSTA
       SSZ6:  SEP RETN
      CKSAMP: LDI #00   ..Iniliz. LOCORCNT=0; Push
              STXD
              SEP CALL, A(INPARA) ..Calc Energy
              , #2E00, #2E00, #40
              LDI #0A   ..Calc & push CT
                          ..(= Correlation Threshold)
              PHI RECSTA
              SEP CALL, A(DIVS2C)
              LDI #09
              PLO PASS
              SEP CALL, A(MULS2C)
              GHI PASS
              PHI ACC
              GLO PASS
              PLO ACC
              SEP CALL, A(SATRAT)
              GHI RECSTA
              STXD
              LDI #04   ..Set for check of 4
                          .. Subaverages
              PLO CNT2
              LDI #2D   ..PT1 to s(#00,#3F)
              PHI PT1
              LDI #FF
              PLO PT1
       CKS1:  LDI #2E   ..Next Subaverage;
                          ..PT0 to w(#3F)
              PHI PT0
              LDI #00
              PLO PT0
              LDI #40   ..Set inner product
                          .. dimension = 64
              PLO CNT0
              SEP CALL, A(INNPRD), #00
              SEP CALL, A(SATRAT)
              IRX       ..Test correlation of this subavrg.
              GHI RECSTA
              SM
```

```
            BDF CKS2   ..Skip ahead if correlation
                       .. > or = CT
            IRX   ..Correlation < CT;
            LDX
            ADI #01         ..Increment LOCORCNT
            STXD
     CKS2:  DEC STKPOI
            DEC CNT2
            GLO CNT2
            BNZ CKS1   ..Loop back if more Sbavrses.
            IRX   ..Done; Pop CT
            IRX   ..Pop LOCORCNT
            LDX
            PHI RECSTA
            BZ CKS3    ..Exit if correlation > or =
                       .. CT for all 16 Subaverases
            SEP CALL, A(DATDOG), #09  ..Correlation
                       .. < CT, for > 0 Sbavrses.
     CKS3:  SEP RETN
ORG#0AC0
COST:       SEP CALL, A(SUBARA), #40  ..Calc e(k)
            , #2940, #2E00, #2E40
            SEP CALL, A(SCALER)
            SEP CALL, A(INPARA), #2940, #2940, #40
                       ..Calc Cost
            SEP CALL, A(SATRAT)
            SEP CALL, A(DATDOG), #12
            GHI RECSTA ..Subtract off cost "zero"
                       ..threshold
            SMI #04
            BDF CST1   ..Skip ahead if RECODE>1
            LDI #00    ..RECODE<4; Set J=0
     CST1:  PHI RECSTA ..Store J
            SEP RETN
ORG#0AF5
UNDFLO: GLO ACC   ..Exit if ACC.0 not=0
            BNZ UNF1
            GHI ACC   ..Exit if ACC.1 not=0
            BNZ UNF1
            LDI #01   ..ACC contains #0000; Set = 1
            PLO ACC
     UNF1:  SEP RETN
ORG#0B00
YANDF:      SEP CALL, A(MEMOVE), #2E00, #40, #2860
            SEP CALL, A(TESTY)
            GHI RECSTA
            BNZ YAF2   ..Exit if test was aborted
            SEP CALL, A(MEMOVE), #2E00, #40, #2980
            SEP CALL, A(MEMOVE), #2860, #40, #2E00
            SEP CALL, A(CORREL), #10  ..Calc f(k)
            , #2980, #2980, #2E40, #00
            SEP CALL, A(DATDOG), #0D
            LDI #00
            PHI RECSTA
     YAF2:  SEP RETN
MEMOVE: LDA PARPOI
            PHI PT1
            LDA PARPOI
            PLO PT1
            LDA PARPOI
            PLO CNT0
            LDA PARPOI
            PHI PT2
            LDA PARPOI
            PLO PT2
```

```
MMV1:   LDA PT1    ..Next byte; Move it
        STR PT2
        INC PT2
        DEC CNT0
        GLO CNT0
        BNZ MMV1   ..Loop backc if more bytes
        SEP RETN
ORG#0B50
CKTONE: LDI #00
        PHI RECSTA
        SEP RETN
ORG#0B90
CHKMDU: LDI #55    ..Check a multiply
        PHI RECSTA
        LDI #D6
        PLO PASS
        SEP CALL, A(MULS2C)
        GLO PASS   ..Check Product = c
        XRI #0E
        BNZ CMU1   ..Skip up if c.0 wrong
        GHI PASS
        XRI #F2
        BNZ CMU1   ..Skip up if c.1 wrong
        LDI #01    ..Check an overflow divide
        PLO ACC
        LDI #00
        PHI ACC
        PHI RECSTA
        SEP CALL, A(DIVS2C)
        GHI RECSTA ..Check quotient
        XRI #7F
        BNZ CMU1   ..Skip up if quotient wrong
        LDI #00    ..All OK
        PHI RECSTA
        SEP RETN
CMU1:   LDI #01    ..Something wrong
        PHI RECSTA
        SEP CALL, A(DATDOG), #17
        SEP RETN
ORG#0BC0
SCALER: LDI #40    ..Set to magnify 64 error entries
        PLO CNT0
        LDI #29    ..PT0 to e(#3F)
        PHI PT0
        LDI #40
        PLO PT0
SCR1:   LDI #02    ..Load #02 as multiplicand
        PHI RECSTA
        LDN PT0    ..Load e(j) as other
        PLO PASS
        SEP CALL, A(MULS2C)
        GHI PASS   ..Saturate product
        PHI ACC
        GLO PASS
        PLO ACC
        SEP CALL, A(SATRAT)
        GHI RECSTA ..Re-store magnified e(j)
        STR PT0
        INC PT0    ..PT0 to e(j-1)
        DEC CNT0
        GLO CNT0
        BNZ SCR1   ..Loop back if more entries
        SEP RETN
..Number of base stations in system:
ORG#0BF0
,#03
```

..Radio Propagation Delay Factors for
..Aarbor, Novi & Guardian
ORG#0BF8
,#00, #1C, #5A
END
B800T$$
..>EQUAL-K4.0
..Equalizer Computer, 6/23/82
..1st half of 4th Kilobyte
..
ORG#0C00
ADJTAP=#0682
LEVEL=#0428

DMPTAP=#0176
MULS2C=#0800
PT2TAP=#04F0
SATRAT=#09B0
UNITAP=#0143
CNT0=0
CNT1=1
STKPOI=2
PGMCNT=3
CALL=4
RETN=5
PARPOI=6
RECSTA=7
CNT2=8
CNT3=9
PT0=#0A
PT1=#0B
PT2=#0C
PT3=#0D
PASS=#0E
ACC=#0F

```
STPDSC: LDI #06    ..Set for 6 iterations
        STXD       ..Push ITRCNT
  SDS1: SEP CALL, A(ADJTAP)  ..Next iteration
        IRX        ..Pop ITRCNT
        LDX        ..Decrement it
        SMI #01
        BZ SDS2    ..Jump out if 6 iterations done
        STXD       ..More to do; Push ITRCNT
        SEP CALL, A(CHNSIM)
        BR SDS1
  SDS2: SEP RETN
ORG#0C20
INNPRD: LDI #00    ..Initialize IP=0 (3 bytes)
        STXD
        STXD
        STXD
        GLO CNT0   ..Exit if M=0 ("sum 0 terms!")
        BZ IPR6
  IPR1: DEC CNT0   ..Next term in sum
        LDA PT0    ..Load multiplicands
                   ..& incr. index of b
        PHI RECSTA
        LDN PT1
        PLO PASS
        LDN PARPOI ..Test DIRECTION parameter
        BZ IPR2
        INC PT1    ..DIRN. not=0; Incmt. index of a
        BR IPR3
  IPR2: DEC PT1    ..DIRN. = 0;
                   ..Decrement index of a
  IPR3: SEP CALL, A(MULS2C)
        GHI PASS   ..Create 3rd byte of PASS
```

```
                SHL
                BNF IPR4
                LDI #FF    ..PASS<0; 3rd byte = #FF
                BR IPR5
        IPR4:   LDI #00    ..PASS>0; 3rd byte = #00
        IPR5:   PHI RECSTA ..new "PASS.2" to RECODE
                INC STKPOI ..STKPOI to IP.0
                INC STKPOI
                INC STKPOI
                GLO PASS   ..3-byte addition
                ADD
                STXD
                GHI PASS
                ADC
                STXD
                GHI RECSTA
                ADC
                STXD
                GLO CNT0
                BNZ IPR1   ..Loop back if more terms
        IPR6:   INC PARPOI ..Bypass DIRECTION parm.
                INC STKPOI ..IP/#100 to ACC
                LDA STKPOI
                PHI ACC
                LDA STKPOI
                PLO ACC
                SEP RETN
      CHNSIM:   LDI #40    ..Set for 64 output entries
                PLO CNT1
                LDI #2E    ..PT2 to w(#3F)
                PHI PT2
                LDI #00
                PLO PT2
        CSM1:   DEC CNT1   ..Next i; Test
                GLO CNT1
                SMI #10
                BNF CSM2
                GLO CNT1   ..i>#F, PT1 to Y(i-#F)
                SDI #CE
                PLO PT1
                LDI #00
                SDBI #29
                PHI PT1
                LDI #28    ..PT0 to t(#F)
                PHI PT0
                LDI #B0
                PLO PT0
                LDI #10    ..Set inner product dimension
                PLO CNT0          .. = #10
                BR CSM3
        CSM2:   LDI #29    ..i<#10; PT1 to Y(0)
                PHI PT1
                LDI #BF
                PLO PT1
                GLO CNT1   ..PT0 to t(i)
                SDI #BF
                PLO PT0
                LDI #00
                SDBI #28
                PHI PT0
                GLO CNT1   ..Set inner product dimension
                                 .. = i+1
                PLO CNT0
                INC CNT0
        CSM3:   SEP CALL, A(INNPRD), #00
                SEP CALL, A(SATRAT)
```

```
                LDI #02    ..Double result (because t is
                           ..scaled to 128 but INNPRD scales by 256)
                PLO PASS
                SEP CALL, A(MULS2C)
                GHI PASS
                PHI ACC
                GLO PASS
                PLO ACC
                SEP CALL, A(SATRAT)
                GHI RECSTA
                STR PT2    ..Store w(i)
                INC PT2
                GLO CNT1
                BNZ CSM1   ..Loop back if i>0
                SEP RETN
ORG#0CB0
ZLNLVL:         LDI #03    ..Set for 3 stations
                PLO RECSTA
                LDI #92    ..PT2 to LLGain(STA2)
                PLO PT2
                LDI #2F
                PHI PT2
    ZLV1:       LDI #00    ..Next station
                STR PT2    ..Store LLGain(STA) = 0
                DEC PT2
                DEC RECSTA
                GLO RECSTA
                BNZ ZLV1   ..Loop back if more stations
                SEP CALL, A(DMPLLV)
                SEP RETN
ORG#0CC8
DMPLLV:         SEX PGMCNT ..PIO Group Select
                OUT 1, #08
                SEX STKPOI
                LDI #2F    ..PT2 to LLGain(STA0)
                PHI PT2
                LDI #90
                PLO PT2
                LDN PT2
                STR STKPOI ..Push LLGain(STA0)
                INC PT2    ..PT2 to LLGain(STA1)
                LDN PT2
                SHL
                SHL
                SHL
                OR         ..Composite LLGains for STA0&1
                STR STKPOI ..& push resulting byte
                INC PT2    ..PT2 to LLGain(STA2)
                LDN PT2
                RSHR
                RSHR
                RSHR
                OR         ..Composite LLGains for STA0-2
                STR STKPOI ..Push the resulting byte
                OUT 4      ..& output to Port A
                DEC STKPOI
                SEX PGMCNT
                BDF DLV1   ..CHeck MSb(LLGain(STA2))
                OUT 2, #88 ..It = 0; Output ASTB = 0
                SEP RETN
    DLV1:       OUT 2, #A8 ..It = 1; Output ASTB = 1
                SEP RETN
ORG #0D00
INPARA:         LDA PARPOI ..PT1 to a(#F)
                PHI PT1
                LDA PARPOI
```

```
                PLO PT1
                LDA PARPOI   ..PT0 to b(#F)
                PHI PT0
                LDA PARPOI
                PLO PT0
                LDA PARPOI   ..Set innprd. dimension
                PLO CNT0
                SEP CALL, A(INNPRD), #FF
                SEP RETN
ORG #0D10
TESTY:          SEP CALL, A(SAVTAP)
                SEP CALL, A(UNITAP), #00
                SEP CALL, A(LEVEL)
                SEP CALL, A(YSCALE)
                SEP CALL, A(RESTAP)
                SEP RETN
SAVTAP:         SEP CALL, A(PT2TAP)
                LDI #7F      ..PT1 to temporary tap area
                PLO PT1
                LDI #2F
                PHI PT1
                LDI #20      ..Set to save 32 bytes
                PLO CNT0
    STP1:       LDN PT2      ..Next byte; Transfer
                STR PT1
                DEC PT2
                DEC PT1
                DEC CNT0
                GLO CNT0
                BNZ STP1     ..Loop back if more bytes
                SEP RETN
RESTAP:         SEP CALL, A(PT2TAP)
                LDI #7F      ..PT1 to temporary tap area
                PLO PT1
                LDI #2F
                PHI PT1
                LDI #20      ..Set to restore 32 bytes
                PLO CNT0
    RTP1:       LDN PT1      ..Next byte; Transfer
                STR PT2
                DEC PT1
                DEC PT2
                DEC CNT0
                GLO CNT0
                BNZ RTP1     ..Loop back if more bytes
                SEP CALL, A(DMPTAP)
                SEP RETN
ORG#0D50
PT2YSC:         LDI #28
                PHI PT2
                LDI #AC
                PLO PT2
                SEP RETN
PASACC:         GLO PASS
                PLO ACC
                GHI PASS
                PHI ACC
                SEP RETN
YSCALE:         SEP CALL, A(PT2TAP)
                LDN PT2
                SHR          ..Change normalizing from #FF to #7F
                STXD
                SEP CALL, A(PT2YSC)
                INC STKPOI
                LDN STKPOI
                STR PT2
                SEP RETN
    END
```

```
->BssB
->
->bfCheck$-01t$$

? CAN'T FIND "Check"

->bfCHeck$-01t$$
        BDF DLV1   ..CHeck MSb(LLGain(STA2))

->sCH$Ch$-01t$$
        BDF DLV1   ..Check MSb(LLGain(STA2))

->j$$

REWIND TAPES ,THEN TYPE ANY KEY
->o$$
WRITE=0

->y$$

TAPE OUT=0
MCDS TAPE EDITOR VERSION 0.0

->jju$$

*j
HUH?

*J
REWIND TAPES ,THEN TYPE ANY KEY
*A
MCDS ASSEMBLER VER.0.0
READ?
WRITE?1
PRESS PLAY ON READ TAPE
TYPE ANY KEYH
H,L,U,J?H
0690 ADJTAP
0428 LEVEL
0176 DMPTAP
0800 MULS2C
04F0 PT2TAP
09B0 SATRAT
0143 UNITAP
0000 CNT0
0001 CNT1
0002 STKPOI
0003 PGMCNT
0004 CALL
0005 RETN
0006 PARPOI
0007 RECSTA
0008 CNT2
0000 MAIN
0009 MAN1
001E MAN2
0020 MAN3
002F MAN4
0034 EXITA
0035 LINKIN
0044 EXITR
0045 LINKOU
0054 WAIT
005F WA1
006A WA2
006B SETIMR
```

```
0077 DOUBLE
0084 TICK
008D TK1
008F TK2
0091 TK3
00A0 TK4
00A2 TK5
00A4 TK6
00A6 TK7
00AC TK8
00B0 TK9
00B6 DOGRDY
00BD DRD1
00C8 DRD2
00C9 DATDOG
00F3 STATE
00FC RESET
0129 FLATEQ
012F FL01
0143 UNITAP
014B UTP1
0168 NOMDLA
0176 DMPTAP
018F DTP1
0196 DMPDLA
01A7 EQLIZE
01B0 EQL1
01C3 EQL2
01C4 GETREF
01C7 GRF1
01D7 GRFN
01E5 GRF2
01EA GRF3

REWIND TAPES ,THEN TYPE ANY KEY
PRESS PLAY ON READ TAPE
RECORD ON WRITE TAPE
TYPE ANY KEY TO START PASS2

DONE!

H,L,U,J?U
*
HUH?

*J
REWIND TAPES ,THEN TYPE ANY KEY
*E
MCDS TAPE EDITOR VERSION 0.0
0200 TSTSTA
0203 TSA1
020A TSA2
0217 TSA3
021C IMPULS
0269 IMP1
026C UNKEY
027A UNMUTE
0283 UNM1
0292 UNM2
0296 NPLKEY
029A NPK1
0290 CHKROM
029C COM1
02B0 COM2
02B1 UNKILL
02BB UNK1
```

```
02C6 KILSTA
0300 MUTE
0309 MUT1
0315 MUT2
0320 CHKSQL
0327 CSQ1
033B CSQ2
0343 SLEEP
034E SLP1
035C SLP2
0375 CHKRAM
0382 CAM1
0398 CAM2
03A0 PLKEY
03A4 PLK1
03AE PLTEST
03B1 PLT0
03C7 PLT1
03DD PLT2
03DE SAMPPL
```

REWIND TAPES , THEN TYPE ANY KEY
PRESS PLAY ON READ TAPE
RECORD ON WRITE TAPE
TYPE ANY KEY TO START PASS2

DONE!

H,L,U,J?J
REWIND TAPES , THEN TYPE ANY KEY
H,L,U,J?A
H,L,U,J?
*A
MCDS ASSEMBLER VER.0.0
READ?
WRITE?1
PRESS PLAY ON READ TAPE
TYPE ANY KEYH
H,L,U,J?H

```
0CC8 DMPLLV
0176 DMPTAP
0AC0 COST
03AE PLTEST
0C00 STPDSC
0B00 YANDF
00F3 STATE
000D PT3
000E PASS
000F ACC
0400 EQLSTA
0425 EQS1
0428 LEVEL
0431 LVL1
044E LVL2
0455 LVL3
0457 CHKLVL
046F CLV1
047D CLV2
0485 ADJLVL
048F ALV1
04A0 ALV2
04AF ALV3
04B3 ADDLLV
04C5 ADE1
04CF MULTAP
04F0 PT2TAP
0500 FINDPK
```

```
0509 FPK1
0510 FPK2
051B FPK3
0521 DELAY
0524 DLA1
0541 DLA2
0545 DLA3
0548 DLA4
054A CHKDLA
056C CDL1
0573 CDL2
0577 ADJDLA
058F ADL1
0593 ADL2
0595 ADL3
059F TAPS
05BB TAP1
05CB TAP2
05CE TAP3
05EC TAP4
05F2 TAP5
```

REWIND TAPES ,THEN TYPE ANY KEY
PRESS PLAY ON READ TAPE
RECORD ON WRITE TAPE
TYPE ANY KEY TO START PASS2

DONE!

H,L,U,J?J
REWIND TAPES ,THEN TYPE ANY KEY
H,L,U,J?
*A
MCDS ASSEMBLER VER.0.0
READ?
WRITE?1
PRESS PLAY ON READ TAPE
TYPE ANY KEYH
H,L,U,J?H

```
00F3 STATE
00C9 DATDOG
0000 CNT0
000E PASS
000F ACC
0600 CORREL
0606 COR1
0629 COR2
0631 COR3
0648 SUBARA
0656 SUB1
065F SUB2
0662 SUB3
066D SUB4
0670 SUB5
0682 ADJTAP
06B6 AJT1
06EC PERTRB
070F PTB1
072A PTB3
0731 PTB4
073C PTB5
073F PTB6
0773 PTB7
0780 PTB8
0784 PTB9
078E CONVYZ
0797 CON1
```

```
07AF CON2
07C1 CON3
07CF UNSCAL

REWIND TAPES ,THEN TYPE ANY KEY
PRESS PLAY ON READ TAPE
RECORD ON WRITE TAPE
TYPE ANY KEY TO START PASS2

DONE!

H,L,U,J?U
*J
REWIND TAPES ,THEN TYPE ANY KEY
*A
MCDS ASSEMBLER VER.0.0
READ?
WRITE?1
PRESS PLAY ON READ TAPE
TYPE ANY KEYH
H,L,U,J?H
0CC8 DMPLLV
0176 DMPTAP
0AC0 COST
03AE FLTEST
0C00 STPDSC
0B00 YANDF
00F3 STATE
00C9 DATDOG
0200 TSTSTA
0682 ADJTAP
0845 DIVS2C
0600 CORREL
0196 DMPDLA
0000 CNT0
0001 CNT1
0002 STKPOI
0003 PGMCNT
080C MUL1
0810 MUL2
0820 MUL3
0821 MUL4
0844 MUL5
0845 DIVS2C
0851 DIV1
0855 DIV2
0868 DIV3
0887 DIV4
0888 DIV5
0891 DIV6
08A2 DIV7
08AA DIV8
08B0 AVGSUB
08BF AVS1
08C6 AVS2
08D6 AVS3
0900 SUBAVG
0909 SBA1
0910 SBA2
0920 SBA3
0934 SAMPLE
093D SAM1
0955 SAM2
0956 SAMP32
096D S32A
0973 S32B
097A S32C
```

```
099E  S32E
09A2  S32F
09B0  SATRAT
09BD  SAT1
09C1  SAT2
09CC  SAT3
09D0  SAT4
09D1  SAT5

REWIND TAPES ,THEN TYPE ANY KEY
PRESS PLAY ON READ TAPE
RECORD ON WRITE TAPE
TYPE ANY KEY TO START PASS2
0A00  STEPSZ
0A19  SSZ1
0A2A  SSZ2
0A31  SSZ3
0A4D  SSZ4
0A50  SSZ5
0A58  SSZ6
0A59  CKSAMP
0A82  CKS1
0A9C  CKS2
0AAB  CKS3
0AC0  COST
0AE3  CST1
0AF5  UNDFLO
0AFE  UNF1
0B00  YANDF
0B30  YAF2
0B31  MEMOVE
0B3B  MMV1
0B50  CKTONE
0B90  CHKMDU
0BB6  CMU1
0BC0  SCALER
0BC9  SCR1

REWIND TAPES ,THEN TYPE ANY KEY
PRESS PLAY ON READ TAPE
RECORD ON WRITE TAPE
TYPE ANY KEY TO START PASS2

DONE!

H,L,U,J?U
*J
REWIND TAPES ,THEN TYPE ANY KEY
*E
MCDS TAPE EDITOR VERSION 0.0

->100<A>$$

->EOF!BF MDU $-OLT$$

? CAN'T FIND " MDU "

->BFMDU$-OLT$$
MDU=2      ..Pointer to MDU

->LFMDU$$

->-OLT$$
..MDU I/O Decoder test

->LFMDU$-OLT$$
..MDU Test
->LFMDU$-OLT$$
        OUT 1, #01   ..MDU Group Select
```

```
->BFMDU$-OLT$$
MDU=2      ..Pointer to MDU

->KT$$
DOG=3      ..Pointer to Watchdog
0C03 SDS1
0C12 SDS2
0C20 INNFRD
0C28 IPR1
0C33 IPR2
0C34 IPR3
0C3F IPR4
0C41 IPR5
0C51 IPR6
0C58 CHNSIM
0C61 CSM1
0C7B CSM2
0C8D CSM3
0CB0 ZLNLVL
0CB9 ZLV1
0CC8 DMPLLV
0CEA DLV1
0D00 INPARA
0D10 TESTY
0D21 SAVTAP
0D2D STP1
0D36 RESTAP
0D42 RTP1
0D50 PT2YSC
0D57 PASACC
0D5C YSCALE REWIND TAPES ,THEN TYPE ANY KEY
PRESS PLAY ON READ TAPE
RECORD ON WRITE TAPE
TYPE ANY KEY TO START PASS2

DONE!

H,L,U,J?J
REWIND TAPES ,THEN TYPE ANY KEY J
H,L,U,J?J
REWIND TAPES ,THEN TYPE ANY KEY
H,L,U,J?E
H,L,U,J?1
H,L,U,J?0
H,L,U,J?
*E
MCDS TAPE EDITOR VERSION 0.0

->100<A>$$

->EOF!BFEDE$-OLT$$
LDX; XRI #DE; LBZ EDE

->ILDX; XRI #20; LBZ E20
LDX; XRI #21; LBZ E21
LDX; XRI #22; LBZ E22
LDX; XRI #23; LBZ E23
$-6L7T$$
LDX; XRI #12; LBZ E12
LDX; XRI #19; LBZ E19
LDX; XRI #20; LBZ E20
LDX; XRI #21; LBZ E21
LDX; XRI #22; LBZ E22
LDX; XRI #23; LBZ E23
LDX; XRI #DE; LBZ EDE
```

I claim:

1. A simulcast communication system, comprising:
a plurality of base stations for simultaneously broadcasting an audio signal;
a dispatch station for transmitting said audio signal to said base stations along telephone lines;
test signal means for generating test signals to be transmitted from said dispatch station to said base stations in a predetermined sequence;
receiver means for receiving test response signals, each of said test response signals representing a test signal broadcasted from one of said base stations;
digital processing means for determining the audio signal transmission characteristics required to equalize each of said base stations from said test response signals; and
programmable equalization means for substantially equalizing the audio signal transmission characteristics from said dispatch station to each of said base stations in response to said digital processing means;
said programmable equalization means including programmable filter means for substantially equalizing the amplitude and time delay transmission characteristics of said audio signal transmitted from said dispatch station to each of said base stations.

2. The simulcast communication system according to claim 1, wherein said programmable filter means includes programmable delay circuit means for providing a coarse adjustment to the time delay transmission characteristics of said audio signal transmitted from said dispatch station to at least one of said base stations.

3. The simulcast communication system according to claim 2, wherein said programmable filter means further includes programmable digital filter circuit means adjusting the amplitude transmission characteristics and for providing a fine adjustment to the time delay transmission characteristics of said audio signal transmited from said dispatch station to at least one of said base stations.

4. The simulcast communication system according to claim 3, wherein one of said base stations is designated as a reference base station, and said digital processing means operates to equalize the other of base stations to said reference base station.

5. The simulcast communication system according to claim 4, wherein said digital processing means includes converter means for sampling each of said test response signals at predetermined times and for producing a set of sequential digital sample signals for each of said test response signals which is representative of the amplitudes of said test response signals at said predetermined times.

6. The simulcast communication system according to claim 5, wherein said digital processing means further includes microcomputer means for storing at least one set of said sample signals from said reference base station and at least one set of sample signals from one other of said base stations, for cross-correlating said stored sets of sample signals and generating a delay command signal for causing said programmable delay circuit means to coarsely adjust the time delay transmission characteristics of said other base station to the time delay transmission characteristics of said reference base station, and for generating a plurality of amplitude command signals for causing said programmable digital filter circuit means to substantially equalize the amplitude transmission characteristics of said other base station to the amplitude transmission characteristics of said reference base station and to finely adjust the time delay transmission characteristics of said other base station to the time delay transmission characteristics of said reference base station by minimizing the squared error between said stored sets of sample signals.

7. The simulcast communication system according to claim 6, wherein said microcomputer means includes memory means for storing a predetermined number of said sets of sample signals, and programming means for causing a plurality of said test signals to be generated and broadcasted from each of said base stations, and for causing a corresponding plurality of said sets of sample signals from each of said base stations to be averaged.

8. The simulcast communication system according to claim 1, wherein said test signal is a pulse signal.

9. The simulcast communication system according to claim 1, wherein said programmable filter circuit means comprises a transversal filter for each of said base stations.

10. A simulcast communication system, comprising:
a plurality of base stations for simultaneously broadcasting an audio signal;
a dispatch station for transmitting said audio signal to said base stations along telephone lines;
pilot signal means associated with said dispatch station for generating a pilot signal to be transmitted to each of said base stations with said audio signal;
phasing signal means associated with said dispatch station for generating a phasing signal to be transmitted to each of said base stations prior to said audio signal;
detection means associated with each of said base stations for detecting said pilot signal, and for detecting the occurrence of said pushing signal; and
synchronizing means associated with each of said base stations and responsive to said detected pilot and phasing signals, for generating a substantially synchronized squelch signal at each of said base stations.

11. The simulcast communication system according to claim 10, wherein said pilot signal means comprises an oscillator circuit which generates said pilot signal at a predetermined frequency.

12. The simulcast communication system according to claim 11, wherein each of said detection means includes first detector circuit means for producing a reset signal in response to said pilot signal, the frequency of said reset signal being proportionally related to the frequency of said pilot signal.

13. The simulcast communication system according to claim 12, wherein each of said detection means also includes second detector circuit means for producing a strobe signal in response to said phasing signal.

14. The simulcast communication system according to claim 13, wherein each of said synchronization means includes counter circuit means for producing a count signal at a predetermined rate in response to said reset signal, latching circuit means for storing said count signal in response to said strobe signal, comparator circuit means for producing a sync signal in response to a comparison between said count signal produced by said counter circuit means and said count signal stored in said latching circuit means, and oscillator circuit means for generating said synchronized squelch signal in response to said sync signal.

15. In a communication system having a plurality of base stations, a dispatch station, and a receiver associated with said dispatch station, automatic equalization means for enabling an audio signal transmitted from said dispatch station to each of said base stations along telephone lines to be simultaneously broadcasted from said base stations, comprising:

first circuit means associated with said dispatch station for substantially equalizing the audio transmission characteristics from said dispatch station to each of said base stations in response to at least one test signal which is sequentially transmitted from said dispatch station to each of said base stations, broadcasted from each of said base stations, and received at said dispatch station by said receiver; and second circuit means for generating a substantially synchronized squelch signal at each of said base stations in response to a pilot signal and a phasing signal; said dispatch station transmitting said pilot signal to each of said base stations with said equalized audio signal and said phasing signal to each of said base stations prior to said equalized audio signal.

16. The invention according to claim 15, wherein said first circuit means comprises:

test signal means for generating said at least one test signal, said at least one test signal being transmitted from said dispatch station to said base stations in a predetermined sequence;

digital processing means for determining the audio signal transmission characteristics required to equalize such between said dispatch station and each of said base stations from test response signals received by said receiver, each of said test response signals representing a test signal broadcasted from one of said base stations; and programmable equalization means for substantially equalizing the audio signal transmission characterics from said dispatch station to each of said base stations in response to said digital processing means.

17. The invention according to claim 16, wherein said dispatch station includes:

pilot signal means for generating said pilot signal;

phasing signal means for generating said phasing signal;

and said second circuit means includes:

detection means associated with each of said base stations for detecting said pilot signal, and for detecting the occurrence of said phasing signal; and synchronization means associated with each of said base stations and responsive to said detected pilot and phasing signals, for generating said synchronized squelch signal at each of said base stations.

18. The invention according to claim 17 wherein said communication system provides for audio communication between said dispatch station and a plurality of mobile stations through said base stations.

19. A method of equalizing the audio signal transmission characteristics from a dispatch station to a plurality of base stations in a communication system where said audio signal is transmitted from said dispatch station to each of said base stations along telephone lines, comprising the steps of:

generating test signals and transmitting said test signals from said dispatch station to said base stations in a predetermined sequence;

broadcasting said transmitted test signals from said base stations in said predetermined sequence;

receiving test response signals, each of which represents a test signal broadcasted from one of said base stations;

determining the audio signal transmission characteristics required to equalize the audio signal transmission characteristics from said dispatch station to each of said base stations from said test response signals; and adjusting the audio signal transmission characteristics from said dispatch station to at least one of said base stations in order to equalize the audio signal transmission characteristics from said dispatch station.

20. A method of generating a synchronized squelch signal to be simultaneously broadcasted from a plurality of base stations in a communication system where an audio signal is transmitted from a dispatch station to each of said base stations along telephone lines, comprising the steps of:

generating a pilot signal and transmitting said pilot signal to each of said base stations with said audio signal;

generating a phasing signal and transmitting said phasing signal to each of said base stations at the beginning of said audio signal; and generating a substantially synchronized squelch signal at each of said base stations in response to said pilot and phasing signals.

21. A simulcast communication system, comprising:

a plurality of base stations for simultaneously broadcasting an audio signal;

a dispatch station for transmitting said audio signal to said base stations along telephone lines;

test signal means for generating at least one test signal to be transmitted from said dispatch station to each of said base stations in a predetermined sequence;

receiver means for receiving test response signals, each of said test response signals representing a test signal broadcasted from one of said base stations;

digital processing means for determining the audio signal transmission characteristics required to equalize each of said base stations from said test response signals; and programmable equalization means for substantially equalizing the audio signal transmission characteristics from said dispatch station to each of said base stations in response to said digital processing means, wherein one of said base stations is designated as a reference base station and the audio signal transmission characteristics from said dispatch station to the other of said base stations are equalized to the audio signal transmission characteristics from said dispatch station to said reference base station.

* * * * *

UNITED STATES PATENT AND TRADEMARK OFFICE
CERTIFICATE OF CORRECTION

PATENT NO. : 4,516,269
DATED : May 7, 1985
INVENTOR(S) : Jerome V. Krinock

It is certified that error appears in the above-identified patent and that said Letters Patent is hereby corrected as shown below:

Column 2, line 14; "distored" should be --distorted--

Column 2, line 28; "receive" should be --receiver--

Column 3, line 47; after "generating" insert --a--

Column 4, line 24; "presention" should be --present invention--

Column 5, line 55; "respose" should be --response--

Column 8, line 56; "staions" should be --stations--

Column 9, line 45; after "producing" insert --a--

Column 9, line 45-46; "preferrably" should be --preferably--

Column 11, line 16; "and" should be --an--

Column 13, line 13; delete "the" (second occurrence)

Column 13, line 61; after "This" insert --is--

Column 14, line 38; "amplifier" should be --amplifiers--

Column 16, line 54; "correllated" should be --correlated--

Column 16, line 55; "correllation" should be --correlation--

Column 18, line 9; "suprscripts" should be --superscripts--

Column 18, line 12; "$h^{n-1} + h^n + c^n z^n, h^o = [1,0,0...,0]^T$" should be --$h^{n-1} = h^n + c^n z^n, h^o = [1,0,0...,0]^T$--

UNITED STATES PATENT AND TRADEMARK OFFICE
CERTIFICATE OF CORRECTION

PATENT NO. : 4,516,269

DATED : May 7, 1985

INVENTOR(S) : Jerome V. Krinock

It is certified that error appears in the above-identified patent and that said Letters Patent is hereby corrected as shown below:

Column 18, line 52; delete "the" (fourth occurrence)

Column 19, line 62; "turned" should be --tuned--

Column 20, line 30; "to" should be --on--

Column 20, line 45; after "well" insert --as--

Column 106, line 35; "pushing" should be --phasing--

Column 108, line 29-30; "at the beginning of" should be --prior to--

Signed and Sealed this

Fifteenth Day of April 1986

[SEAL]

Attest:

DONALD J. QUIGG

Attesting Officer

Commissioner of Patents and Trademarks